US011428278B2

(12) United States Patent
Daikoku et al.

(10) Patent No.: US 11,428,278 B2
(45) Date of Patent: Aug. 30, 2022

(54) REVERSE INPUT BLOCKING CLUTCH AND ACTUATOR

(71) Applicant: NSK LTD., Tokyo (JP)

(72) Inventors: Yuya Daikoku, Kanagawa (JP); Hirotaka Kishida, Kanagawa (JP); Hiroki Hashiguchi, Kanagawa (JP); Toshirou Toyoda, Gunma (JP)

(73) Assignee: NSK LTD., Tokyo (JP)

( * ) Notice: Subject to any disclaimer, the term of this patent is extended or adjusted under 35 U.S.C. 154(b) by 15 days.

(21) Appl. No.: 17/053,902

(22) PCT Filed: Apr. 26, 2019

(86) PCT No.: PCT/JP2019/018027
§ 371 (c)(1),
(2) Date: Nov. 9, 2020

(87) PCT Pub. No.: WO2019/216280
PCT Pub. Date: Nov. 14, 2019

(65) Prior Publication Data
US 2021/0277964 A1    Sep. 9, 2021

(30) Foreign Application Priority Data

May 7, 2018 (JP) .............................. JP2018-089021
Jun. 11, 2018 (JP) .............................. JP2018-111199
(Continued)

(51) Int. Cl.
*F16D 45/00* (2006.01)
*F16D 43/18* (2006.01)
(Continued)

(52) U.S. Cl.
CPC ............. *F16D 45/00* (2013.01); *F16D 43/18* (2013.01); *F16H 25/2252* (2013.01); *F16H 25/2266* (2013.01); *F16D 41/084* (2013.01)

(58) Field of Classification Search
CPC ........ F16D 45/00; F16D 43/18; F16D 43/211; F16D 43/02; F16D 43/26; F16D 41/084;
(Continued)

(56) References Cited

U.S. PATENT DOCUMENTS 1,575,038 A   3/1926 Clas
1,617,745 A   2/1927 Cousinard
(Continued)

FOREIGN PATENT DOCUMENTS

JP    3-249435 A    11/1991
JP    2004-84918 A    3/2004
(Continued)

OTHER PUBLICATIONS

International Search Report for PCT/JP2019/018027 dated Jul. 30, 2019 (PCT/ISA/210).
(Continued)

*Primary Examiner* — David R Morris
(74) *Attorney, Agent, or Firm* — Sughrue Mion, PLLC

(57) ABSTRACT

A reverse input blocking clutch includes an input member, an output member, a pressed member, and an engaging member. When a rotational torque is inputted to the input member, the engaging member moves in a direction away from a pressed surface of the pressed member due to engagement with the input member, and transmits the rotational torque inputted to the input member to the output member due to engagement with the output member; and when rotational torque is reversely inputted to the output member, moves in the direction closer to the pressed surface based on engagement with the output member, and by being pressed against the pressed surface does not transmit the rotational torque reversely inputted to the output member to the input member, or transmits only part thereof to the input member due to engagement with the input member.

35 Claims, 72 Drawing Sheets

(30) Foreign Application Priority Data

Aug. 10, 2018 (JP) .............................. JP2018-151015
Jan. 23, 2019 (JP) .............................. JP2019-008976

(51) Int. Cl.
*F16H 25/22* (2006.01)
*F16D 41/08* (2006.01)

(58) Field of Classification Search
CPC .... F16D 41/069; F16D 41/10; F16H 25/2252; F16H 25/2266; F16H 25/2204
See application file for complete search history.

(56) References Cited

U.S. PATENT DOCUMENTS

| | | | |
|---|---|---|---|
| 2,359,010 A | | 9/1944 | Smith |
| 3,051,282 A | | 8/1962 | Greene |
| 3,261,437 A | | 7/1966 | Kramm |
| 3,435,706 A | * | 4/1969 | Humphreys .......... F16H 49/001 74/640 |
| 10,597,926 B2 | * | 3/2020 | Shirai .................... F16D 41/10 |
| 2012/0098367 A1 | | 4/2012 | Mizutani et al. |
| 2019/0093415 A1 | * | 3/2019 | Shirai ................... E05F 15/697 |
| 2021/0262532 A1 | * | 8/2021 | Toyoda ................. F16D 43/26 |

FOREIGN PATENT DOCUMENTS

| | | |
|---|---|---|
| JP | 2004-144124 A | 5/2004 |
| JP | 2004-182063 A | 7/2004 |
| JP | 2007-232095 A | 3/2006 |
| JP | 2008-75804 A | 4/2008 |
| JP | 2009-108889 A | 5/2009 |
| JP | 2011-27252 A | 2/2011 |
| JP | 2013-148118 A | 8/2013 |
| JP | 2017-20612 A | 1/2017 |
| JP | 2017-214943 A | 12/2017 |
| WO | 2013/058278 A1 | 4/2013 |
| WO | 2017/159600 A1 | 9/2017 |

OTHER PUBLICATIONS

Extended European Search Report dated Nov. 19, 2021 in European Application No. 19799519.4.

* cited by examiner other side in the axial direction one side in the axial direction axial direction

REVERSE INPUT BLOCKING CLUTCH AND ACTUATOR

CROSS REFERENCE TO RELATED APPLICATIONS

This application is a National Stage of International Application No. PCT/JP2019/018027 filed Apr. 26, 2019, claiming priority based on Japanese Patent Application No. 2018-089021 filed May 7, 2018, Japanese Patent Application No. 2018-111199 filed Jun. 11, 2018, Japanese Patent Application No. 2018-151015 filed Aug. 10, 2018, and Japanese Patent Application No. 2019-008976 filed Jan. 23, 2019.

TECHNICAL FIELD

The present invention relates to a reverse input blocking clutch that transmits rotational torque inputted to an input member to an output member, however, completely blocks and does not transmit rotational torque that is reversely inputted to an output member to an input member, or transmits only part to the input member and blocks the remaining part. The present invention also relates to an actuator provided with this reverse input blocking clutch.

BACKGROUND ART

The reverse input blocking clutch includes an input member connected to an input side mechanism such as a drive source or the like, and an output member connected to an output side mechanism such as a reduction mechanism or the like, and has a function of transmitting rotational torque inputted to the input member to the output member, and completely blocks and does not transmit rotational torque reversely inputted to the output member to the input member, or transmits only part to the input member and blocks the remaining part.

The reverse input blocking clutch is roughly classified into a locking type and a free type according to the difference in the mechanism for blocking the rotational torque that is reversely inputted to the output member. The locking type reverse input blocking clutch is provided with a mechanism for preventing or suppressing the rotation of the output member when rotational torque is reversely inputted to the output member. On the other hand, the free type reverse input blocking clutch is provided with a mechanism for causing the output member to idle when a rotational torque is inputted to the output member. Whether to use the locking type reverse input blocking clutch or the free type reverse input blocking clutch is appropriately determined depending on the application or the like of the device incorporating the reverse input blocking clutch.

JP 2004-084918A, JP 2007-232095A, and the like describe a locking type reverse input blocking clutch. The reverse input blocking clutch described in these publications includes a mechanism that, when a rotational torque is reversely inputted to the output member, moves rolling bodies arranged in a wedge-shaped space between the inner and outer members toward the narrower side of the wedge-shaped space in the radial direction, and prevents the output member from rotating by becoming firm between the inner member and the outer member.

Actuators powered by electric motors are used in automobile power windows, a wire winding mechanism for an electric-powered parking brake device, a caliper extrusion mechanism for an electric-powered disc brake device, a cam phase conversion mechanism for a variable valve timing device for an engine, a belt CVT pulley drive mechanism, a lifting device and the like for nursing equipment, other industrial winches, hoists, cranes, various positioning devices and the like. By providing the reverse input blocking clutch described above in such an actuator, transmission of rotational torque from the input member to the output member is performed efficiently, so the size of the electric motor may be reduced, and the transmission of the rotational torque that is reversely inputted to the output member may be blocked by the reverse input blocking clutch, so there is an advantage in that the power consumption of the electric motor may be reduced. An actuator including a reverse input blocking clutch is disclosed in, for example, JP 2004-144124A and the like.

CITATION LIST

Patent Literature

[Patent Literature 1] JP 2004-084918A
[Patent Literature 2] JP 2007-232095A
[Patent Literature 3] JP 2004-144124A

SUMMARY OF INVENTION

Technical Problem

In a conventional reverse input blocking clutch, when a rotation torque is reversely inputted to the output member, rolling bodies bite into the narrow width portion of a wedge-shaped space in the radial direction; however, this biting force becomes a magnitude corresponding to the rotational torque reversely inputted to the output member. Therefore, in a case where this biting force becomes large, there is a possibility that after that, even when torque is inputted to the input member, it will become difficult to release a state in which rolling bodies have bitten into the narrow width portion in the radial direction of a wedge-shaped space, or in other words, a state in which rotation of the output member is prevented.

An object of the present invention is to provide a reverse input blocking clutch capable of easily releasing a state in which rotation of an output member is prevented or suppressed, and an actuator provided with such a reverse input blocking clutch.

Solution to Problem

The first aspect of the present invention relates to an actuator including a reverse input blocking clutch. The actuator of the first aspect includes a rotational linear motion conversion mechanism, and a reverse input blocking clutch having a locking mechanism.

In particular, in the actuator of the first aspect, the rotational linear motion conversion mechanism includes a screw shaft having a male-side engaging portion on an outer circumferential surface thereof and a nut having a female-side engaging portion on an inner circumferential surface thereof, and the male-side engaging portion and the female-side engaging portion are engaged with each other directly or via a plurality of intermediate engaging members;

the locking mechanism includes a pressed member, an input engaging portion, an output engaging portion, and an engaging member;

the pressed member has a cylindrical pressed surface on an inner circumferential surface thereof;

the input engaging portion has a center axis of rotation that is coaxial with a center axis of the pressed surface, and is arranged on the inner side in the radial direction of the pressed surface;

the output engaging portion has a center axis of rotation that is coaxial with the center axis of the pressed surface, and is arranged on the inner side in the radial direction of the pressed surface and further on the inner side in the radial direction than the input engaging portion;

the engaging member is arranged on the inner side in the radial direction of the pressed surface, and when a rotational torque is inputted to the input engaging portion, moves in a direction away from the pressed surface due to the engagement with the input engaging portion and transmits the rotational torque inputted to the input engaging portion to the output engaging portion due to engagement with the output engaging portion; whereas, when rotational torque is reversely inputted to the output engaging portion, the engaging member moves in a direction close to the pressed surface due to engagement with the output engaging portion, and by being pressed against the pressed surface, does not transmit the rotational torque that is reversely inputted to the output engaging portion to the input engaging portion, or transmits part of the rotational torque that is reversely inputted to the output engaging portion due to the engagement with the input engaging portion and blocks the remaining part;

the locking mechanism is arranged at a portion where the output engaging portion is connected to the nut so as to be able to transmit torque, the portion being separated in the axial direction from the female-side engaging portion around the screw shaft; and the inner diameter dimension of the output engaging portion is smaller than the outer diameter dimension of a range in the axial direction in which the female-side engaging portion exists in the nut.

The engaging member is preferably configured by a pair of engaging members, and the output engaging portion is arranged so as to be sandwiched from both sides in the radial direction by the pair of engaging members.

The engaging member preferably has a pressing surface that is pressed against the pressed surface, and the pressing surface has a radius of curvature that is smaller than that of the pressed surface and is configured by a pair of arc-shaped convex surfaces separated from each other in the circumferential direction.

The actuator of the first aspect may further include a reduction mechanism for increasing rotational torque that is inputted to the input engaging portion.

In this case, preferably the output portion of the reduction mechanism is connected to the input engaging portion so as to be able to transmit torque, and the reduction mechanism and the locking mechanism are arranged around the screw shaft so as to be adjacent to each other in the axial direction.

The actuator of the first aspect may further include an electric motor that is a generating source of rotational torque that is inputted to the input engaging portion.

The actuator of the first aspect may adopt a configuration in which the rotational linear motion conversion mechanism is a ball screw mechanism;

the male-side engaging portion is a male-side spiral groove;

the female-side engaging portion is a female-side spiral groove;

each of the intermediate engaging members is a ball; and by arranging each of the balls between the male-side spiral groove and the female-side spiral groove, the male-side spiral groove and the female-side spiral groove engage with each other via each of the balls.

Alternatively, the actuator of the first aspect may adopt a configuration in which the rotational linear motion conversion mechanism is a planetary roller screw mechanism;

the male-side engaging portion is a male screw portion;

the female-side engaging portion is a female screw portion;

each of the intermediate engaging members is a planetary roller having a roller screw portion on the outer circumferential surface thereof; and by each roller screw portion of the planetary roller engaging with both the male screw portion and the female screw portion, the male screw portion and the female screw portion engage with each other via each of the planetary rollers.

A second aspect of the present invention relates to a reverse input blocking clutch. The reverse input blocking clutch of the second aspect includes:

a pressed member having a cylindrical concave-shaped pressed surface having a center axis;

an input member having an input engaging portion arranged on an inner side in a radial direction of the pressed surface and having a center axis of rotation that is coaxial with the central axis of the pressed surface;

an output member having an output engaging portion arranged further on the inner side in the radial direction of the pressed surface than the input engaging portion and having a center axis of rotation that is coaxial with the pressed surface; and an engaging member having a first portion arranged on the inner side in the radial direction of the pressed surface at a position located in the radial direction between the input engaging portion and the output engaging portion, and a pair of second portions arranged at positions on both sides in a circumferential direction from a position located in the radial direction between the input engaging portion and the output engaging portion.

In the reverse input blocking clutch of the second aspect, the engaging member being configured so that in a case where rotational torque is inputted to the input member, the engaging members moves in a direction away from the pressed surface due to the first portion engaging with the input engaging portion, and by the first portion engaging with the output engaging portion, transmits the rotational torque that is inputted to the input member to the output member; and in a case where rotational torque is reversely inputted to the output member, the engaging member moves in a direction toward the pressed surface due to the first portion engaging with the output engaging portion, and by the pair of second portions being pressed against the pressed surface, does not transmit the rotational torque that is reversely inputted to the output member to the input member, or transmits a part of the rotational torque that is reversely inputted to the output member, to the input member, and blocks a remaining part thereof.

Particularly, in the reverse input blocking clutch of the second aspect, in a case where rotational torque is reversely inputted to the output member, a pair of contact portions where the pair of second portions and the pressed surface come in contact are positioned at a side closer to the center axis of the pressed surface than a specified portion with respect to a direction of a bisector of tangent lines of the pressed surface at each contact portion of the pair of contact portions, and the specified portion is a portion of the first portion with which the input engaging portion engage when a rotational torque is input to the input member.

Preferably, the specified portion is taken to be a portion of the first portion where the output engaging portion engages in a case where rotational torque is reversely inputted to the output member, and the pair of contact portions are positioned at a side closer to the center axis of the pressed surface.

Construction may be adopted in which the engaging member, on the inner side in the radial direction of the pressed surface, does not have a portion arranged on the outer side in the radial direction of the input engaging portion.

Preferably, the pressed surface has a diametrical direction; the input engaging portion is configured by a pair of input engaging portions arranged at two positions on opposite sides in the diametrical direction of the pressed surface; the engaging member is configured by a pair of engaging members; and the output engaging portion is arranged so as to be sandwiched from both sides in the radial direction by the pair of input engaging portions and the pair of engaging members.

Preferably, each portion of the pair of second portions has a pressing surface that is pressed against the pressed surface, and the pressing surface is configured by an arc-shaped convex surface having a radius of curvature smaller than that of the pressed surface.

Preferably, an intermediate member is arranged in at least one of a portion between the pair of second portions and the pressed member, a portion between the input engaging portion and the first portion of the engaging member, and a portion between the output engaging portion and the first portion of the engaging member.

The intermediate member may be composed of a gap adjusting member that is arranged in a portion between the pair of second portions and the pressed member, is held by the pressed member, and is provided with the pressed surface.

The intermediate member may be composed of a gap adjusting member that is arranged in a portion between the pair of second portions and the pressed member and is held by the pair of second portions of the engaging member. Note that the gap adjusting member may also include a friction material that is attached or adhered to the engaging member.

The intermediate member may be composed of a gap adjusting member that is arranged in at least one of a portion between the input engaging portion and the first portion of the engaging member, and a portion between the output engaging portion and the first portion of the engaging member.

The gap adjusting member may be held by any one of the input engaging portion, the output engaging portion, and the engaging member.

In this case, the reverse input blocking clutch of the second aspect further includes a guide member for guiding displacement of the engaging member, and the gap adjusting member is held by the guide member.

Alternatively, the gap adjusting member may be composed of a coiled spring.

In the reverse input blocking clutch of the second aspect, the gap adjusting member may be configured by at least one material selected from metal, ceramic, synthetic resin, and rubber.

Alternatively, the gap adjusting member may be configured by a coating material.

The intermediate member may be composed of a lubricant that is arranged in a portion between the pair of second portions and the pressed member, and that lubricates contact portions between the pressed surface and the pair of second portions.

Preferably, the lubricant is composed of traction oil or traction grease.

Preferably, at least one surface of the pressed surface and the pressing surface has a fine uneven shape.

A third aspect and a fourth aspect of the present invention relates to a reverse input blocking clutch. The reverse input blocking clutch of the third aspect and fourth aspect includes:

a pressed member having a pressed surface;

an input member having a center axis of rotation and at least one input engaging portion;

an output member having a center axis of rotation that is coaxial with the center axis of rotation of the input member, and an output engaging portion; and at least one engaging member having at least one pressing surface that faces the pressed surface, an engaging member side input engaging portion that engages with the input engaging portion, and an engaging member side output engaging portion that engages with the output engaging portion.

In the reverse input blocking clutch of the third aspect and fourth aspect, the engaging member is configured so that when a rotational torque is inputted to the input member, the engaging member, due to engagement between the input engaging portion and the engaging member side input engaging portion, displaces so as to separate the pressing surface from the pressed surface, and by causing the output engaging portion to engage with the engaging member side output engaging portion, transmits the rotational torque inputted to the input member to the output member; and when a rotational torque is reversely inputted to the output member, the engaging member, due to engagement between the output engaging portion and the engaging member side output engaging portion, displaces so as to press the pressing surface against the pressed surface, causing the pressing surface to frictionally engage with the pressed surface.

In particular, in the reverse input blocking clutch of the third aspect and the fourth aspect, an intermediate member is arranged in at least any one of a portion between the engaging member and the pressed member, a portion between the input engaging portion and the engaging member side input engaging portion, and a portion between the output engaging portion and the engaging member side output engaging portion.

Examples of the intermediate member include a gap adjusting member, a lubricant that lubricates the contact portion between the pressed surface and the pressing surface, and particularly, traction oil or traction grease, a convex portion provided on the outer side in the radial direction of the engaging member, an elastic body composed of a roller or a ball, and the like.

More specifically, in the reverse input blocking clutch of the third aspect, the intermediate member may be composed of a gap adjusting member that is arranged in a portion between the pressing surface and the pressed member, is held by the pressed member, and is provided with the pressed surface.

The intermediate member may be composed of a gap adjusting member that is arranged in a portion between the engaging member and the pressed surface, is held by the engaging member, and is provided with the pressing surface.

The intermediate member may be composed of a gap adjusting member that is arranged in at least one of a portion between the input engaging portion and the engaging member side input engaging portion, and a portion between the output engaging portion and the engaging member side output engaging portion. In this case, the gap adjusting member may be held by any one of the input engaging portion, the output engaging portion, and the engaging member.

The reverse input blocking clutch of the third aspect may further include a guide member for guiding displacement of the engaging member, and in this case, the gap adjusting member may be held by the guide member.

The gap adjusting member may be composed of a coil-shaped spring that is arranged in at least one of a portion between the input engaging portion and the engaging member side input engaging portion, and a portion between the output engaging portion and the engaging member side output engaging portion.

The gap adjusting member may be configured by at least one material selected from metal, ceramic, synthetic resin, and rubber.

Alternatively, the gap adjusting member may also be configured by a coating material.

In the reverse input blocking clutch of the fourth aspect, the intermediate member may be composed of a lubricant that is arranged in a portion between the engaging member and the pressed member, and that lubricates a contact portion between the pressed surface and the pressing surface.

Preferably, the lubricant is composed of traction oil or traction grease.

In the reverse input blocking clutch of the fourth embodiment, preferably the pressed member has an inner circumferential surface having a circular shape when viewed from the axial direction with the pressed surface being provided on the inner circumferential surface, and the engaging member has an outer side portion in the radial direction facing the inner circumferential surface with the pressing surface being provided on the outer side portion in the radial direction.

In this case, the engaging member may have a convex portion having an outer side surface in the radial direction in at least one location in the circumferential direction of the outer side portion in the radial direction that protrudes outward in the radial direction as compared with portions adjacent in the circumferential direction, and the pressing surface may be provided on the outer side surface in the radial direction.

Preferably, the pressing surface is configured by a convex surface having an arc shape when viewed from the axial direction, and the radius of curvature of the pressing surface is smaller than the radius of curvature of the pressed surface.

The pressing surface may have a crowning shape.

In the reverse input blocking clutch of the fourth aspect, a configuration may be adopted in which the pressed member has an inner circumferential surface having a circular shape when viewed from the axial direction, and the pressed surface is provided on the inner peripheral surface;

the engaging member comprises an engaging member main body having the engaging member side input engaging portion and the engaging member side output engaging portion, and at least one pressing body, with the pressing surface being provided on the at least one pressing body; and the engaging member main body has an outer side portion in the radial direction facing the inner circumferential surface, and a holding recess portion provided in at least one location in the circumferential direction of the outer side portion in the radial direction and open to the outer side in the radial direction, with the pressing body being held in the holding recess portion.

In this case, the engaging member main body may include a groove in the outer side portion in the radial direction extending over the entire length in the axial direction, and the holding recess portion may be configured by the groove.

The pressed member may include a guide groove extending over the entire circumference of the inner circumferential surface; the pressed surface may be configured by the inner surface of the guide groove; and a portion of the pressing body that protrudes outward in the radial direction from the holding recess portion may be arranged on the inner side of the guide groove.

The pressing body may be composed of a roller or a ball.

In this case, preferably a part of the roller or ball and more than half of the roller or ball is arranged on the inner side of the holding recess portion, and the opening width of the outer side in the radial direction of the holding recess portion is smaller than a diameter of the roller or ball.

The pressed member may have a protrusion over the entire circumference of a part in the axial direction of the inner circumferential surface thereof, and the pressed surface may be configured by the inner side surface in the radial direction of the protrusion.

The pressed surface may be configured by a convex surface having an arc-shaped cross-sectional shape.

Preferably, at least one surface of the pressed surface and the pressing surface has a fine uneven shape.

Alternatively, the reverse input blocking clutch of the fourth aspect may adopt a configuration in which the pressed member has an inner circumferential surface having a circular shape when viewed from the axial direction, with the pressed surface being provided on the inner peripheral surface;

the engaging member has an outer side portion in the radial direction facing the inner circumferential surface, with the pressing surface being provided on the outer side portion in the radial direction;

the intermediate member is configured by a convex portion that is provided in at least one location in the circumferential direction of the outer side portion in the radial direction, that protrudes outward in the radial direction compared with adjacent portions in the circumferential direction, and that has an outer side surface in the radial direction; and the pressing surface is provided on the outer side surface in the radial direction.

The pressing surface may be configured by a convex surface having an arc shape when viewed from the axial direction, and in this case, preferably the radius of curvature of the pressing surface is smaller than the radius of curvature of the pressed surface.

Preferably, the pressing surface has a crowning shape.

The reverse input blocking clutch of the fourth aspect may adopt a configuration in which the pressed member has an inner circumferential surface having a circular shape when viewed from the axial direction, with the pressed surface being provided on the inner peripheral surface;

the engaging member main body has an outer side portion in the radial direction facing the inner circumferential surface, and a holding recess portion that is provided in at least one location in the circumferential direction of the outer side portion in the radial direction, and that opens to the outer side in the radial direction;

the intermediate member is configured by at least one pressing body held in the holding recess portion; and the pressing surface is provided on the at least one pressing body.

The engaging member may include a groove in the outer side portion in the radial direction extending over the entire length in the axial direction, and the holding recess portion may be configured by the groove.

The pressed member may include a guide groove extending over the entire circumference of the inner circumferential surface; the pressed surface may be configured by the inner surface of the guide groove; and a portion of the pressing body that protrudes outward in the radial direction from the holding recess portion may be arranged on the inner side of the guide groove.

The pressing body may be composed of a roller or a ball.

In this case, preferably a part of the roller or ball and more than half of the roller or ball is arranged on the inner side of the holding recess portion, and the opening width of the outer side in the radial direction of the holding recess portion is smaller than a diameter of the roller or ball.

The pressed member may have a protrusion over the entire circumference of a part in the axial direction of the inner circumferential surface thereof, and the pressed surface may be configured by the inner side surface in the radial direction of the protrusion.

In this case, preferably the pressed surface is configured by a convex surface having an arc-shaped cross-sectional shape.

The reverse input blocking clutch of the second aspect, the third aspect, and the fourth aspect may be applied to an actuator. In other words, the actuator of the present invention also includes an actuator that includes a rotational linear motion conversion mechanism and a reverse input blocking clutch, in which the reverse input blocking clutch is configured by the reverse input blocking clutch of any one of aspect 2, aspect 3 and aspect 4.

In this case, the rotational linear motion conversion mechanism includes a screw shaft having a male-side engaging portion on an outer circumferential surface thereof and a nut having a female-side engaging portion on an inner circumferential surface thereof, and the male-side engaging portion and the female-side engaging portion are engaged with each other directly or via a plurality of intermediate engaging members. Moreover, the output engaging portion is connected to the nut so as to be able to transmit torque, and is arranged around the screw shaft at a portion separated in an axial direction from the female-side engaging portion. Furthermore, the inner diameter dimension of the output engaging portion is smaller than the outer diameter dimension of a range in the axial direction in which the female-side engaging portion exists in the nut.

The actuator may further include a reduction mechanism for increasing rotational torque that is inputted to the input engaging portion.

In this case, the output portion of the reduction mechanism is connected to the input engaging portion so as to be able to transmit torque, and the reduction mechanism and the reverse input blocking clutch are arranged around the screw shaft so as to be adjacent to each other in the axial direction.

The actuator may further include an electric motor that is a generating source of rotational torque that is inputted to the input engaging portion.

The actuator may adopt a configuration in which
the rotational linear motion conversion mechanism is a ball screw mechanism;
the male-side engaging portion is configured by a male-side spiral groove;
the female-side engaging portion is configured by a female-side spiral groove;
the intermediate engaging members are configured by balls; and
by arranging the balls between the male-side spiral groove and the female-side spiral groove, the male-side spiral groove and the female-side spiral groove engage with each other via the balls.

Alternatively, the actuator may adopt a configuration in which
the rotational linear motion conversion mechanism is a planetary roller screw mechanism;
the male-side engaging portion is configured by a male screw portion;
the female-side engaging portion is configured by a female screw portion;
the intermediate engaging members are configured by planetary rollers respectively having a roller screw portion on an outer circumferential surface thereof; and
by the roller screw portion of each of the planetary rollers engaging with both the male screw portion and the female screw portion, the male screw portion and the female screw portion engage with each other via the planetary rollers.

Advantageous Effects of Invention

With the present invention, it is possible to easily release a state in which rotation of the output engaging portion, which is an output member, is prevented or suppressed.

DESCRIPTION OF EMBODIMENTS

Figure 1:
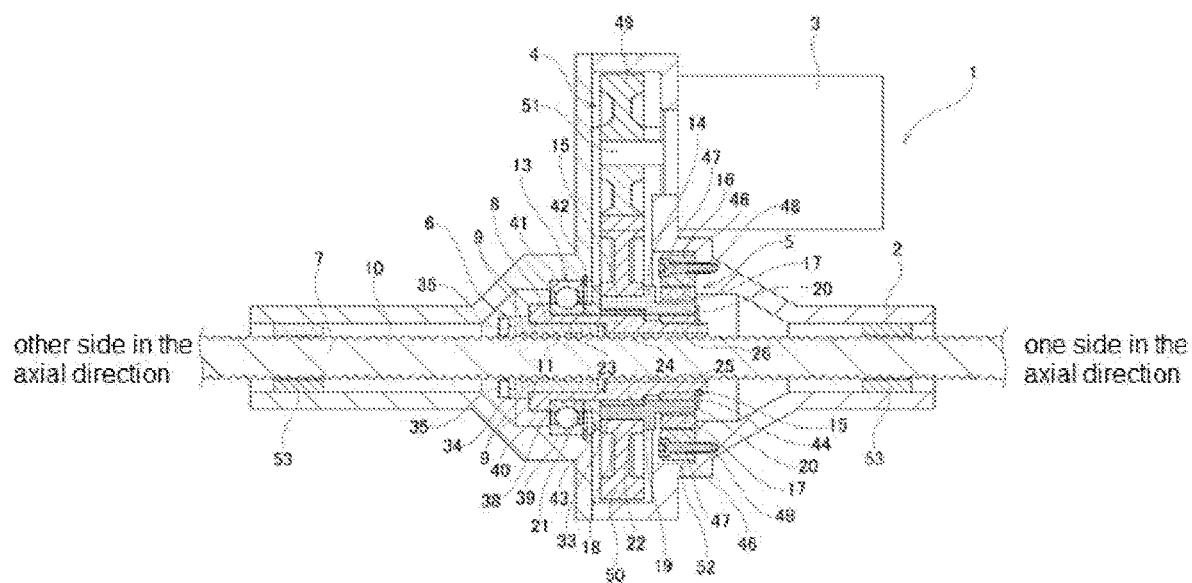
FIG. 1 is a cross-sectional view of an actuator according to a first example of an embodiment of a first aspect of the present invention.

First Example of Embodiment of First Aspect

A first example of an embodiment of a first aspect of the present invention will be described with reference to FIGS. 1 to 11. In the first aspect of the present invention, a reverse input blocking clutch is applied to an actuator.

This first aspect of the present invention relates to an actuator including a reverse input blocking clutch. The actuator 1 of this first example of an embodiment of the first aspect includes a ball screw mechanism 6 that is a rotational linear motion conversion mechanism, and a reverse input blocking clutch 5 having a locking mechanism 52.

In particular, in the actuator 1 of this first example of an embodiment of the first aspect, the rotational linear motion conversion mechanism (ball screw mechanism 6) has a screw shaft (ball screw shaft 7) having a male-side engaging portion (male-side spiral groove 10) on the outer circumferential surface; and a nut 8 having a female-side engaging portion (female-side spiral groove 11) on the inner circumferential surface, and the male-side engaging portion and the female-side engaging portion are engaged directly or via a plurality of intermediate engaging members.

The locking mechanism 52 includes a pressed member 16, an input engaging portion 20, an output engaging portion 26, and an engaging member 17.

The pressed member 16 has a cylindrical pressed surface 28 on the inner circumferential surface. The input engaging portion 20 has a center axis of rotation O coaxial with the center axis O of the pressed surface 28, and is arranged on the inner side in the radial direction of the pressed surface 28. The output engaging portion 26 has a center axis of rotation O that is coaxial with the central axis O of the pressed surface 28, and is arranged on the inner side in the radial direction of the pressed surface 28, and further on the inner side in the radial direction than the input engaging portion 20.

The engaging member 17 is arranged on the inner side in the radial direction of the pressed surface 28, and when a rotational torque is inputted to the input engaging portion 20, moves in a direction away from the pressed surface 28 based on the engagement with the input engaging portion 20 and transmits the rotational torque inputted to the input engaging portion 20 to the output engaging portion 26 due to engagement with the output engaging portion 26; however, when rotational torque is reversely inputted to the output engaging portion 26, the engaging member 17 moves in a direction close to the pressed surface 28 due to engagement with the output engaging portion 26, and by being pressed against the pressed surface 28, does not transmit the rotational torque that is reversely inputted to the output engaging portion 26 to the input engaging portion 20, or transmits part of the rotational torque that is reversely inputted to the output engaging portion 26 to the input engaging portion 20 due to the engagement with the input engaging portion 20 and blocks the remaining portion.

The locking mechanism 52 is arranged at a portion where the output engaging portion 26 is connected to the nut 8 so as to be able to transmit torque, the portion being separated in the axial direction from a range in the axial direction (female-side engaging portion) where the female-side spiral groove 11 exists around the screw shaft 7.

The inner diameter of the output engaging portion 26 is smaller than the outer diameter of the range in the axial direction in which the female-side spiral groove 11 exists in the nut 8.

In the following, the specific configuration of the actuator 1 of this first example of an embodiment of the first aspect will be described in detail. The actuator 1 of this example includes a housing 2, an electric motor 3 as a drive source supported by the housing 2, a reduction mechanism 4, a reverse input blocking clutch 5, and a ball screw mechanism 6 that are all housed inside the housing 2.

The actuator 1 is configured so as to transmit rotational motion of the electric motor 3 to the ball screw mechanism 6 via the reverse input blocking clutch 5 after being reduced (increased) by the reduction mechanism 4, and then after converting the rotational motion to linear motion by the ball screw mechanism 6, outputs that linear motion. Moreover, the reverse input blocking clutch 5 is a lock type reverse input blocking clutch that has a reverse input blocking function that transmits all of the rotational torque inputted to the input portion on the electric motor 3 side to the output portion on the ball screw mechanism 6 side; however, does not transmit rotational torque that is reversely inputted to the output portion to the input portion, or transmits only part and blocks the remaining portion.

Figure 2:
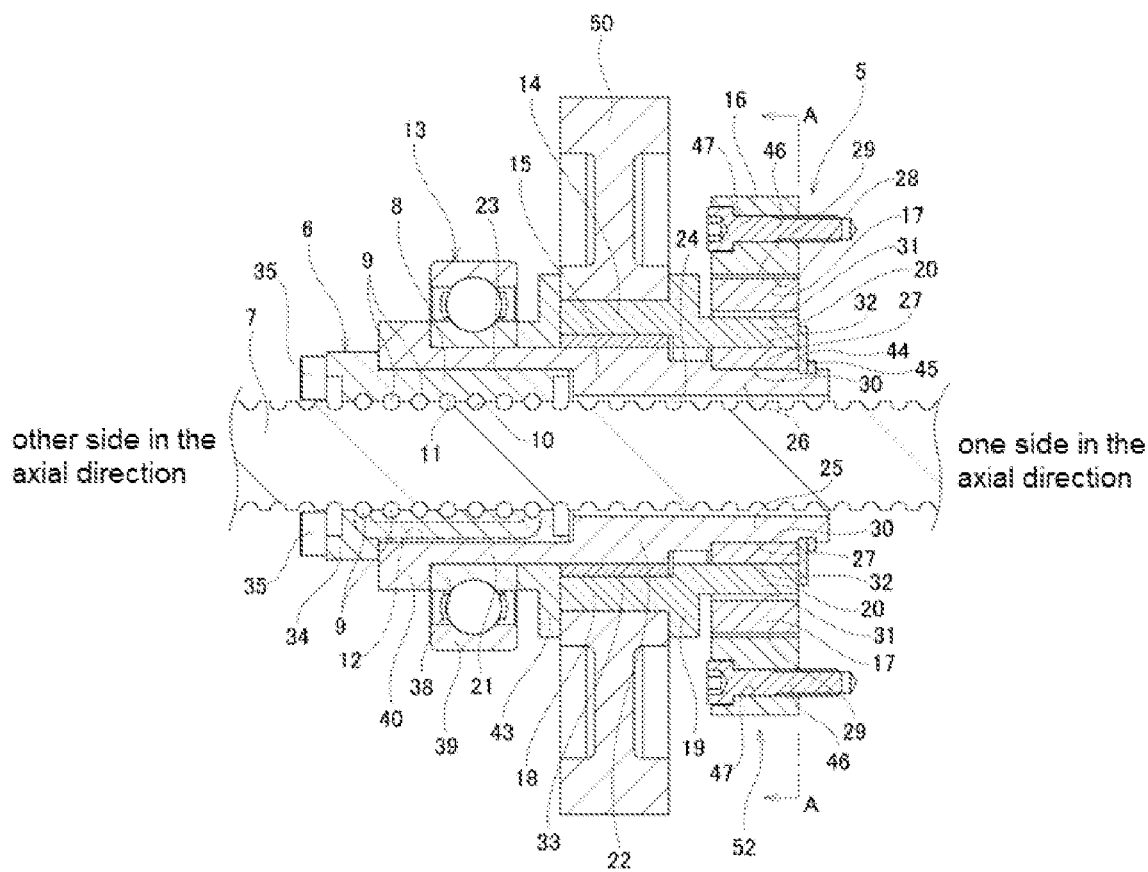
FIG. 2 is an enlarged view of the central portion of FIG. 1 excluding the housing.
Figure 3:
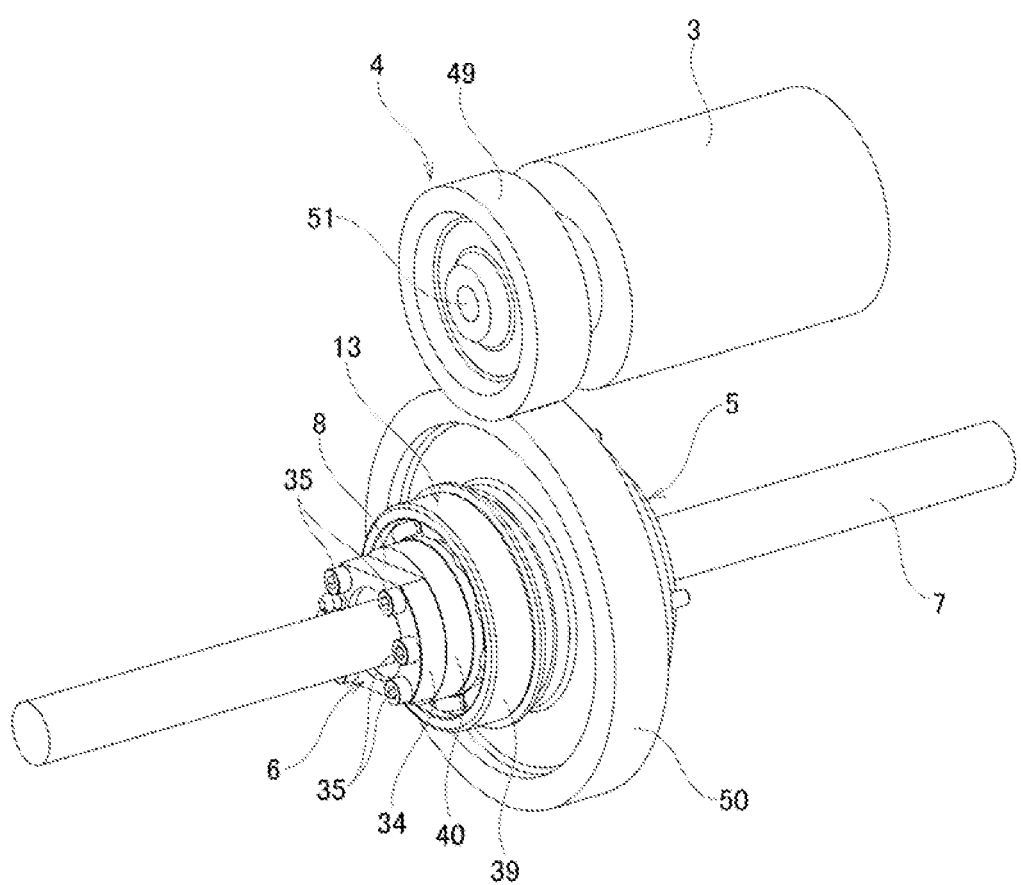
FIG. 3 is a perspective view illustrating the actuator with the housing omitted according to the first example of an embodiment of the first aspect.
Figure 4:
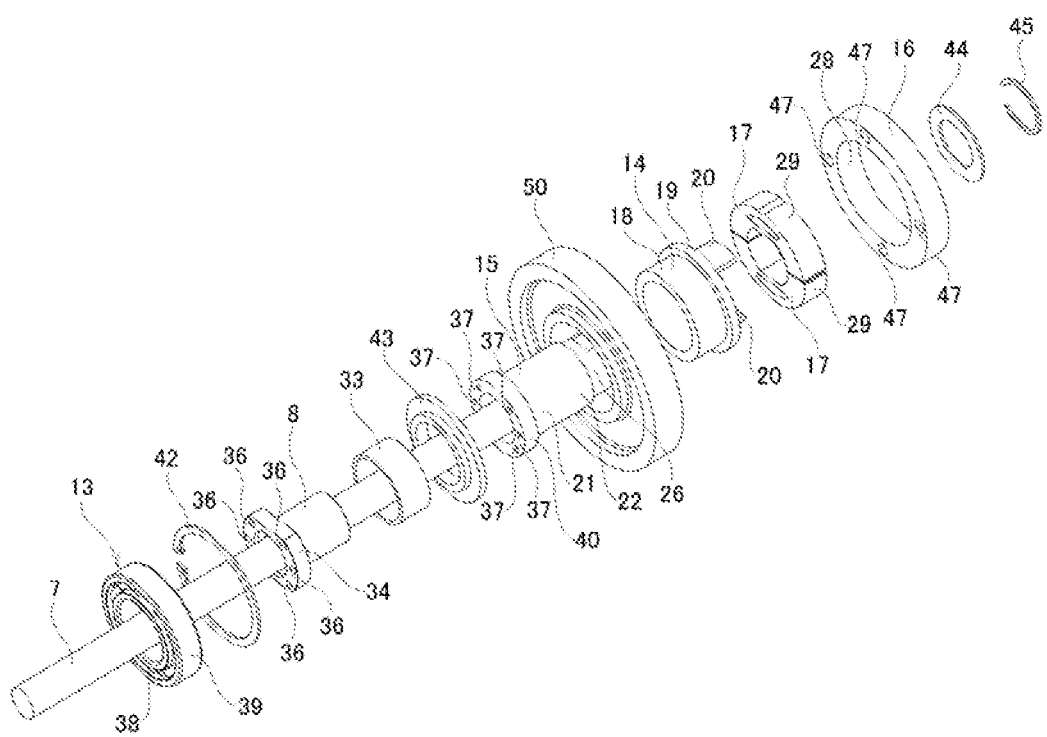
FIG. 4 is an exploded perspective view of a ball screw mechanism and a reverse input blocking clutch constituting the actuator according to the first example of an embodiment of the first aspect.
Figure 5:
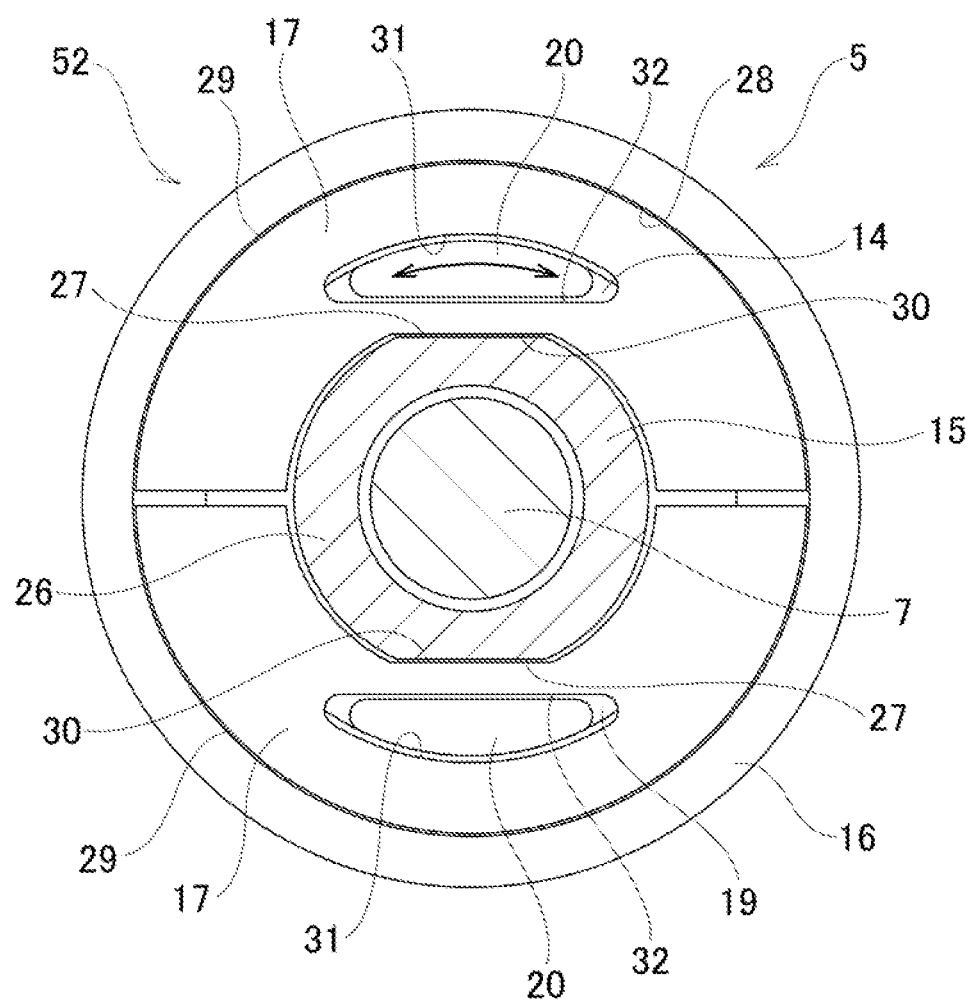
FIG. 5 is a cross-sectional view taken along the line A-A of FIG. 2

Note that unless otherwise specified, the axial direction of the actuator 1 is the axial direction of the ball screw mechanism 6, or in other words, the left-right direction in FIGS. 1 and 2. Moreover, one side in the axial direction is the right side in FIGS. 1 and 2, and the other side in the axial direction is the left side in FIGS. 1 and 2. The axial direction of the reverse input blocking clutch 5 coincides with the axial direction of the ball screw mechanism 6. Furthermore, the radial direction and the circumferential direction mean the radial direction and the circumferential direction of the reverse input blocking clutch 5.

The ball screw mechanism 6 includes a screw shaft (ball screw shaft) 7, a nut (ball nut) 8, and a plurality of balls 9. The screw shaft 7 has a male-side spiral groove 10 formed spirally on the outer circumferential surface. The nut 8 is arranged around the screw shaft 7 and is coaxial with the screw shaft 7, and has a female-side spiral groove 11 formed spirally on the inner circumferential surface. The plurality of balls 9 are spirally arranged between the male-side spiral groove 10 and the female-side spiral groove 11. In addition, in the portion of the nut 8 that overlaps the outer side in the radial direction of the female-side spiral groove 11, there is a circulation path 12 (refer to FIG. 2) for allowing the plurality of balls 9 moving between the male-side spiral groove 10 and the female-side spiral groove 11 to circulate when the screw shaft 7 and the nut 8 rotate relative to each other. The circulation path 12 may be formed directly in the nut 8 or may be formed by using another member such as a circulation tube or the like. With such a configuration, the ball screw mechanism 6 is able to convert the relative rotational motion of the screw shaft 7 and the nut 8 into a relative linear motion (relative motion in the axial direction) of the screw shaft 7 and the nut 8.

In this example, the screw shaft 7 is arranged on the inner side of the housing 2, and both ends in the axial direction project to the outer side of the housing 2. Moreover, the screw shaft 7 is supported by supports 53 such as sliding bearings or the like that are held on the inner side of both side portions in the axial direction of the housing 2 so as to be able to freely slide with respect to the housing 2. Note that the outer circumferential surface of the portions of the screw shaft 7 that are slidably supported by the supports 53 may be configured by a simple cylindrical surface on which the male-side spiral groove 10 is not formed. It is also possible to omit the installation of the supports 53. The nut 8 is supported on the inner side of the housing 2 by a first bearing 13 so as to be able to only rotate.

The reverse input blocking clutch 5 includes an input member 14 that is an input portion, an output member 15 that is an output portion, a pressed member 16, and a pair of engaging members 17, and is arranged around the screw shaft 7 and the nut 8 on the inner side of the housing 2, and are coaxial with the screw shaft 7 and the nut 8. Moreover, the reverse input blocking clutch 5 has a locking mechanism 52 on a part thereof, and the locking mechanism 52 is arranged at a portion separated from the nut 8 on one side in the axial direction. Note that in the following description, unless otherwise specified, the axial direction, the radial direction, and the circumferential direction of the input member 14, the output member 15, and the pressed member 16 coincides with the axial direction, the radial direction, and the circumferential direction of the reverse input blocking clutch 5.

Figure 10:
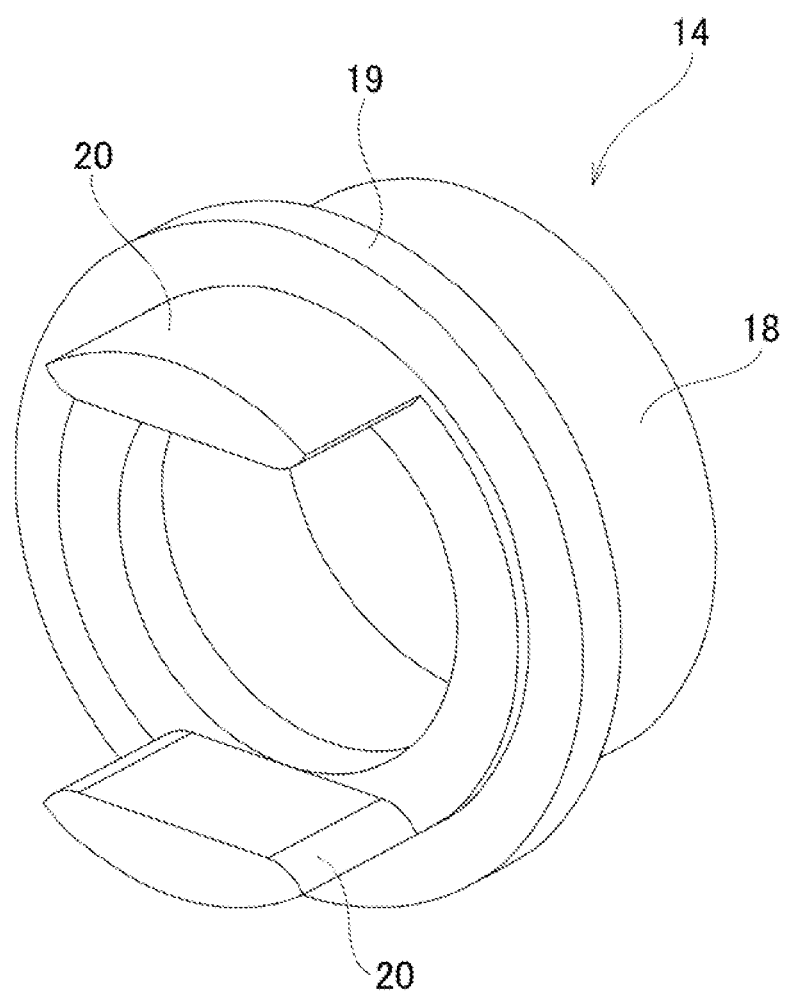
FIG. 10 is a perspective view illustrating a removed input member of the reverse input blocking clutch according to the first example of an embodiment of the first aspect.

As illustrated in FIG. 10, the input member 14 includes an input cylinder portion 18 that is an input connecting portion, an input ring portion 19, and a pair of input engaging portions 20. The input cylinder portion 18 has a cylindrical shape. The input ring portion 19 has a circular ring shape, is arranged coaxially with the input cylinder portion 18, and has an intermediate portion in the radial direction that is coupled to an end portion on one side in the axial direction of the input cylinder portion 18. The pair of input engaging portions 20 have a substantially elliptical column shape, and extend from positions at two locations on opposite sides in a diametrical direction of inner side portions in the radial direction of the input ring portion 19. More specifically, the pair of input engaging portions 20 are arranged in portions of the input ring portion 19 that are outwardly separated from the center axis of rotation O so as to be separated from each other in the radial direction. The surface on the outer side in the radial direction of each input engaging portion 20 has a partial cylindrical surface shape centered on the center axis of rotation O, the surface on the inner side in the radial direction of the input engaging portion 20 has a flat surface shape that is orthogonal to the diametrical direction that is the separating direction between the pair of input engaging portions 20

Figure 11:
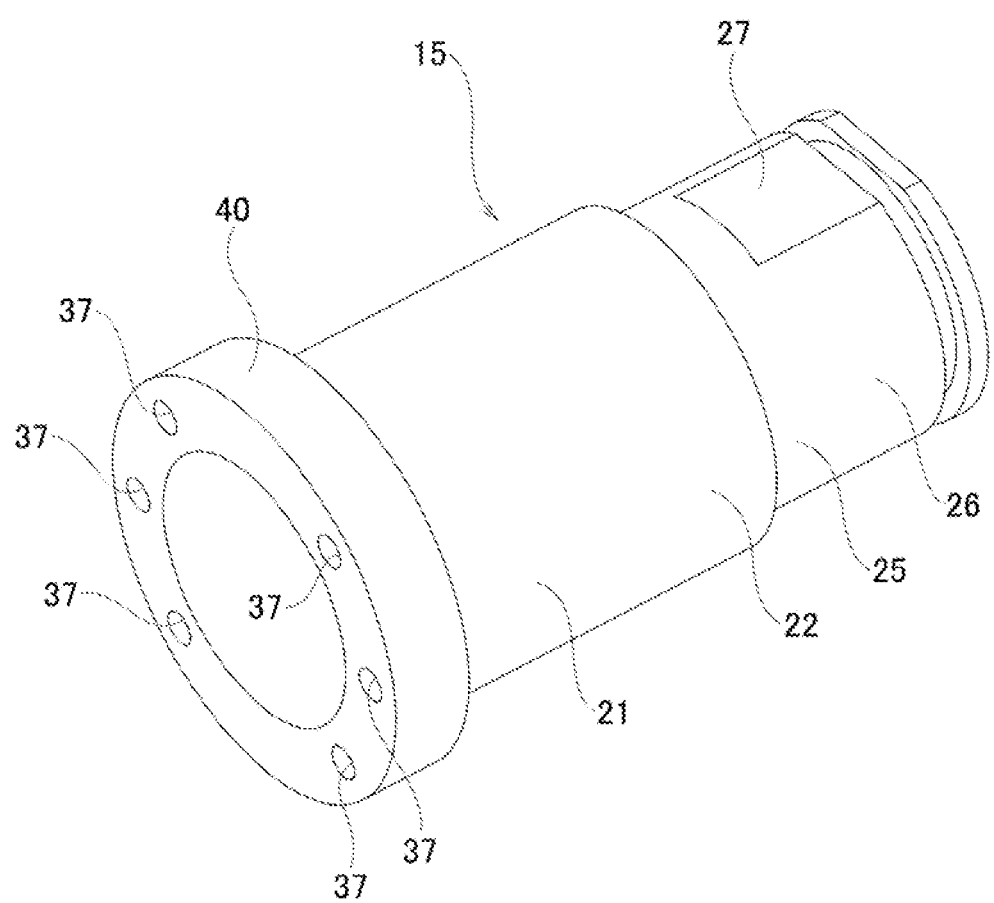
FIG. 11 is a perspective view illustrating a removed output member of the reverse input blocking clutch according to the first example of an embodiment of the first aspect.

As illustrated in FIG. 11, the output member 15 is configured in a tubular shape, and is arranged coaxially with the input member 14 on the inner side in the radial direction of the input member 14. The output member 15 includes an output cylinder portion 21 that constitutes a half portion on the other side in the axial direction thereof, and an offset cylinder portion 22 that constitutes a half portion on the one side in the axial direction thereof, with the portions being coaxial. The output cylinder portion 21 has a large-diameter inner circumferential surface portion 23 that is a cylindrical surface on the inner circumferential surface. As illustrated in FIG. 2, the offset cylinder portion 22 has a small-diameter inner circumferential surface portion 24 on the inner circumferential surface, and is a cylindrical surface having a smaller diameter than the large-diameter inner circumferential surface portion 23. The offset cylinder portion 22 has a small diameter cylinder portion 25 on the one side in the axial direction, having a smaller outer diameter than the other side in the axial direction. The small diameter cylinder portion 25 has an output engaging portion 26 at an intermediate portion in the axial direction. The output engaging portion 26 has flat-shaped cam surfaces 27 that are parallel to each other and located at two positions on opposite sides from each other in the radial direction of the outer circumferential surface The output member 15 is arranged such that the portion on the other side in the axial direction of the offset cylinder portion 22 is arranged on the inner side in the radial direction of the input cylinder portion 18, and the output engaging portion 26 is arranged in a portion between the pair of input engaging portions 20. Moreover, a second bearing 33 is installed between the inner circumferential surface of the input cylinder portion 18 and the outer circumferential surface of the offset cylinder portion 22 on the other side in the axial direction. The second bearing 33 ensures coaxiality between the input member 14 and the output member 15, and allows relative rotation between the input member 14 and the output member 15. As the second bearing 33, a cylindrical slide bearing or a rolling bearing such as a radial needle bearing or the like may be used. Note that the second bearing 33 may be omitted, and the inner circumferential surface of the input cylinder portion 18 and the outer circumferential surface of the offset cylinder portion 22 on the other side in the axial direction may be slidably fitted together in the rotational direction.

The pressed member 16 has an L-shaped cross-sectional shape and is formed in an annular shape as a whole. The pressed member 16 is arranged coaxially with the input member 14 and the output member 15 and around the pair of input engaging portions 20 and the output engaging portion 26. Moreover, the pressed member 16 has a pressed surface 28 that is a cylindrical concave surface on an inner circumferential surface surrounding the periphery of the pair of input engaging portions 20 and the output engaging portion 26.

Each engaging member 17 of the pair of engaging members 17 has a substantially arc-shaped plate shape (bow-shaped plate shape), and is arranged on the inner side in the radial direction of the pressed member 16. More specifically, the pair of engaging members 17 is provided between the pressed surface 28 and the outer circumferential surface of the output engaging portion 26 so that the output engaging portion 26 is sandwiched from both sides in the radial direction (both the upper and lower sides in FIG. 5) that is the separating direction of the pair of cam surfaces 27. Each engaging member 17 is composed of identical parts made to have the same shape and the same size as each other.

Each engaging member 17 has a pressing surface 29 that is a cylindrical convex surface on the outer side surface in the radial direction (outer circumferential side surface) facing the pressed surface 28, and has an output engaging surface 30 capable of engaging with the cam surface 27 in the central portion in the circumferential direction of the inner side surface in the radial direction facing the cam surface 27 of the output engaging portion 26. The output engaging surface 30 has a flat surface shape that is orthogonal to the separating direction (vertical direction in FIG. 5) of the pair of engaging members 17. In addition, in a state with the pair of engaging members 17 arranged on the inner side in the radial direction of the pressed member 16, the inner diameter dimension of the pressed member 16 and the dimension in the radial direction of the engaging member 17 are regulated so that there is a gap in a portion between the pressed surface 28 and the pressing surface 29 or in a portion between the cam surface 27 and the output engaging surface 30.

Each engaging member 17 has an input engaging hole 31 in the central portion in the circumferential direction of the intermediate portion in the radial direction. The input engaging hole 31 is a substantially rectangular through hole in the axial direction extending in the width direction of each engaging member 17, and has a size that allows the input engaging portion 20 to be loosely inserted. Of the inner surfaces of the input engaging holes 31, the surface located on the inner side in the radial direction is an input engaging surface 32 that can be engaged with the input engaging portion 20. The input engaging surface 32 has a flat surface shape parallel to the output engaging surface 30.

The width direction of each engaging member 17 is a direction (left and right in FIG. 5) orthogonal to the separating direction or the far-near direction (vertical direction in FIG. 5) of the pair of engaging members 17 in a virtual plane orthogonal to the axial direction.

In a state with the input engaging portion 20 inserted into the inner side of the input engaging hole 31, there are gaps between the input engaging portion 20 and the input engaging hole 31 in the width direction and the far-near direction of the engaging members 17. Therefore, the input engaging portion 20 is able to move relative to the input engaging hole 31 in the rotation direction of the input member 14, and the input engaging hole 31 is able to move relative to the input engaging portion 20 in the far-near direction.

The pressing surface 29 of each engaging member 17 has a surface characteristic of having a larger coefficient of friction than the other portions, and the radius of curvature thereof is the same as or slightly smaller than the radius of curvature of the pressed surface 28. The pressing surface 29 may be directly formed by the surface of each engaging member 17, or may be formed of an intermediate member such as a friction material or the like that is fixed to each engaging member 17 by sticking or adhesion. Alternatively or optionally, an intermediate member such as a gap adjusting member or the like may be arranged between the pressed surface 28 and the pressing surface 29 so that the pressed surface 28 is provided on the inner surface of the gap adjusting material. By providing an intermediate member such as a friction material, a gap adjusting member or the like, even in a case of a gap provided between the pressed surface 28 and the pressing surface 29 so that each of the engaging members 17 can move in the radial direction with respect to the pressed surface 28, or in other words, even in a case where variation occurs in the backlash in the rotational direction between the input member 14 and the output member 15, it is possible to keep the backlash small. Furthermore, a lubricant such as traction oil, traction grease, or other lubricating oil or the like for lubricating the contact portion between the pressed surface 28 and the pressing surface 29 may be arranged between the pressed surface 28 and the pressing surface 29. As a result, an effect is obtained in that the coefficient of friction $\mu$ between the pressed surface 28 and the pressing surface 29 may be increased to improve the brake torque, or the finishing process or heat treatment performed on the pressing surface 29 of the engaging member may be locally limited.

Figure 6:
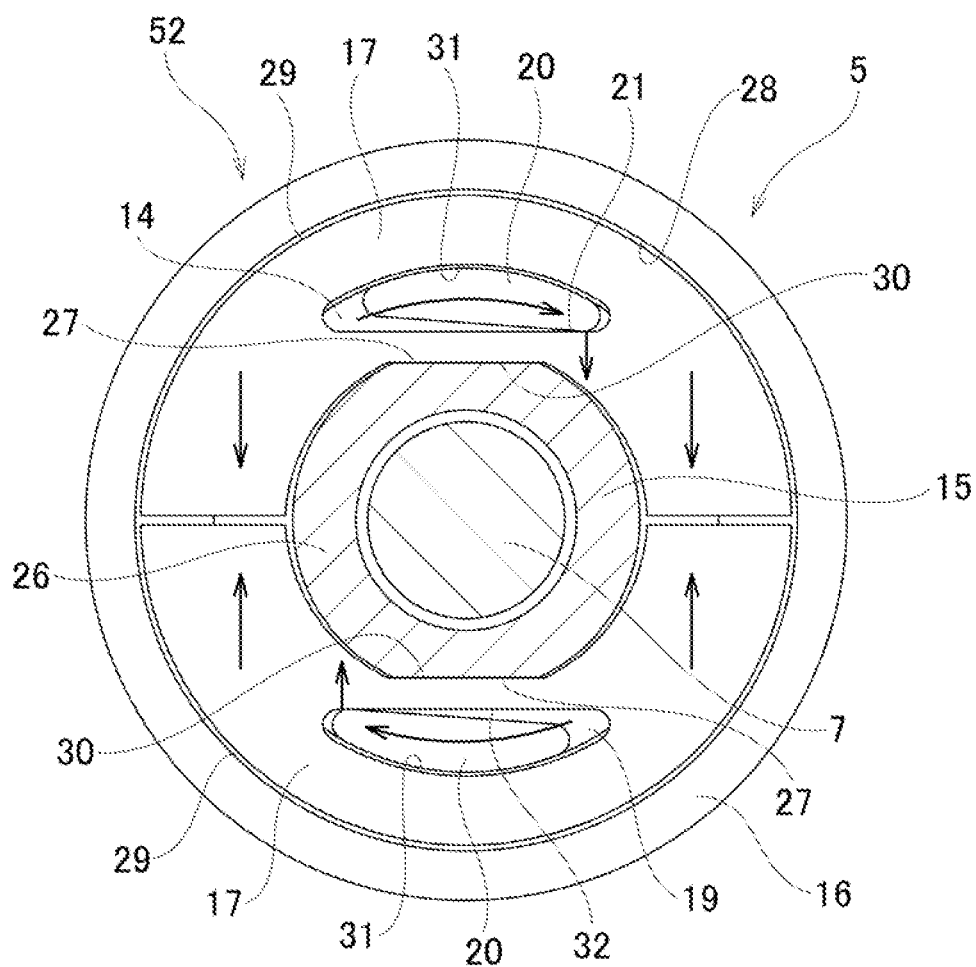
FIG. 6 relates to the reverse input blocking clutch according to the first example of an embodiment of the first aspect and illustrates a state in which rotational torque is inputted to the input member.

Both side surfaces in the circumferential direction of each engaging member 17 are flat surfaces orthogonal to the far-near direction. As illustrated in FIG. 6, in a state in which the output engaging surface 30 of each engaging member 17 is in surface contact with the cam surface 27, or in other words, in a state in which the pair of engaging members 17 are closest to each other in the far-near direction, the circumferential dimension of each of the pair of engaging members 17 is regulated so that both side surfaces of a pair of engaging members 17 facing each other in the circumferential direction do not come into contact with each other, or even in a case where there is contact, the surface pressure at the area of contact is virtually zero.

The reverse input blocking clutch 5 includes a locking mechanism 52 that is configured by a pair of input engaging portions 20, an output engaging portion 26, a pressed member 16, and a pair of engaging members 17, each of which is arranged so as to overlap in the radial direction.

In a state in which the reverse input blocking clutch 5 is arranged around the screw shaft 7 and nut 8, the locking mechanism 52 is arranged at a portion separated on the one side in the axial direction from the nut 8.

In this state, the output member 15 is externally fitted and fixed to the nut 8 so that the output cylinder portion 21 is able to transmit torque. More specifically, the large-diameter inner circumferential surface portion 23 of the output cylinder portion 21 is externally fitted to the outer circumferential surface of the end portion on the one side and the intermediate portion in the axial direction of the nut 8 without rattling in the radial direction. Furthermore, by the end surface on the other side in the axial direction of the output cylinder portion 21 coming into contact with an outward facing flange-shaped collar portion 34 that is provided on the end portion on the other side in the axial direction of the nut 8, the output member 15 is positioned in the axial direction with respect to the nut 8. In this state, the output cylinder portion 21 is fixed to the nut 8 by using a plurality of bolts 35. More specifically, through holes 36 in the axial direction are provided at a plurality of locations (6 locations in the illustrated example) in the circumferential direction of the collar portion 34, screw holes 37 are provided on the end portion of the outer side in the axial direction of the output cylinder portion 21 at locations that match each of the through holes 36. Bolts 35 that are inserted through each of the through holes 36 are screwed into each of the screw holes 37. Note that as a method for externally fitting and fixing the output cylinder portion 21 to the nut 8 so that torque may be transmitted, methods such as press-fit fitting, spline fitting, key engagement, welding, brazing or the like may be adopted. Moreover, in a state in which the output cylinder portion 21 is externally fitted and fixed to the nut 8, the small-diameter inner circumferential surface portion 24 of the offset cylinder portion 22 closely faces the outer circumferential surface of the screw shaft 7.

The output member 15, together with the nut 8, is supported inside the housing 2 by a first bearing 13 so that it can only rotate. In the illustrated example, as the first bearing 13, a deep groove ball bearing, which is a kind of rolling bearing capable of supporting a radial load and an axial load, is used. The inner ring 38 of the first bearing 13 is tightly fitted around the outside (pressure fitted around the outside) of the output cylinder portion 21. In addition, by bringing the end surface on the other side in the axial direction of the inner ring 38 in contact with an outward facing flange-shaped collar portion 40 that is provided on the end portion on the other side in the axial direction of the output cylinder portion 21, positioning in the axial direction of the inner ring 38 with respect to the output cylinder portion 21 is possible. Moreover, the outer ring 39 of the first bearing 13 is tightly fitted around the inside (pressure-fitted around the inside) of the housing 2. Furthermore, by holding the outer ring 39 in the axial direction between a stepped surface 41 provided on a portion of the inner circumferential surface of the housing 2 adjacent to the other side in the axial direction of the outer ring 39 and a retaining ring 42 locked to a portion of the inner circumferential surface of the housing 2 adjacent to the one side of the outer ring 39 in the axial direction, the outer ring 39 may be positioned in the axial direction with respect to the housing 2.

The first bearing is provided in order to support the nut and the output member so as to be able to rotate with respect to the housing, and the type, installation location, and the like of the bearing used are not specified; however, preferably the first bearing is configured by a bearing that is capable of supporting radial loads and axial loads in both directions. As the first bearing, a multi-point contact ball bearing, a double row angular contact ball bearing, or the like is used. The first bearing is installed so as to directly support the nut with respect to the housing or to support another member (a member other than the output member) that rotates together with the nut with respect to the housing. Note that the inner ring and outer ring of the first bearing may also be integrally formed with a member that is adjacent to the first bearing.

An output gear 50 of the reduction mechanism 4 is externally fitted and fixed to the input cylinder portion 18 of the input member 14 so as to be able to transmit torque. More specifically, the output gear 50 is externally fitted and fixed to the input cylinder portion 18 by a method such as pressure-fitting, spline fitting, key engagement, welding, brazing, or the like so that it is possible to transmit torque. The output gear 50 may be positioned in the axial direction with respect to the input member 14 by bringing the surface on the one side in the axial direction of the inner end portion in the radial direction in contact with the input ring portion 19. Moreover, by holding a ring-shaped first spacer 43 in the axial direction between the input member 14 and the output gear 50 and the inner ring 38 of the first bearing 13, the input member 14 and the output gear 50 may be positioned in the axial direction with respect to the output member 15. However, the input cylinder portion 18 may also be integrally formed with the output gear 50.

A ring-shaped second spacer 44 is locked together with the retaining ring 45 around the outer circumferential surface of the end portion on the one side in the axial direction of the small diameter cylinder portion 25 of the output member 15. The second spacer 44 faces via a minute gap or comes in light contact in the axial direction with the end surface on the one side in the axil direction of the pair of input engaging portions 20 and the side surfaces on the one side in the axial direction of the pair of engaging members 17. As a result, the input member 14 and the pair of engaging members 17 may be positioned in the axial direction with respect to the output member 15, and relative rotation of the input member 14, the output member 15, and the pair of engaging members 17, and radial displacement of the pair of engaging members 17 are allowed.

The pressed member 16 is fixed to the housing 2 by using a plurality of bolts 46. More specifically, through holes 47 in the axial direction are provided at a plurality of locations (4 locations in the illustrated example) in the circumferential direction of the pressed member 16, and screw holes 48 are provided in locations of the housing 2 that match the through holes 47. Bolts 46 that are inserted through each of the through holes 47 are inserted are screwed into each of the screw holes 48. Note that as a method for fixing the pressed member 16 to the housing 2, methods such as pressure-fitting, spline fitting, key engagement, welding, brazing or the like may also be adopted. Furthermore, the pressed member may be integrally formed with the housing.

The reduction mechanism 4 is a parallel shaft gear mechanism that includes a plurality of gears, the center axes of rotation of which are arranged in parallel with each other.

More specifically, the reduction mechanism 4 includes an input gear 49 as an input portion and an output gear 50 as an output portion. The input gear 49 is externally fitted and fixed to the tip end portion of a drive shaft 51 of the electric motor 3 arranged in parallel with the screw shaft 7 by a method such as pressure fitting, spline fitting, key engagement, welding, brazing, or the like so as to be able to transmit torque. The drive shaft 51 of the electric motor 3 may be rotationally driven in both directions. In a state in which the output gear 50 is fitted and fixed to the input cylinder portion 18, the tooth portions provided on the outer circumferential portions of the input gear 49 and the output gear 50 engage with each other. Note that the second bearing 33 also plays a role of supporting a gear reaction force applied from the input gear 49 to the output gear 50.

As the reduction mechanism, in addition to a parallel shaft gear mechanism, it is also possible to adopt other kinds of reduction mechanisms such as a planetary gear mechanism, a bevel gear mechanism, a wave gear mechanism, a cycloid reduction mechanism, a belt drive reduction mechanism, a chain drive reduction mechanism, wedge roller traction drive reduction mechanism, or combinations of these, and the like.

In the actuator 1 of this example having such a configuration, the rotational torque of the drive shaft 51 of the electric motor 3 is reduced (increased) by the reduction mechanism 4 and then inputted to the input member 14 of the reverse input blocking clutch 5. The reverse input blocking clutch 5 transmits all of the rotational torque inputted to the input member 14 to the output member 15 via the pair of engaging members 17. The rotational torque transmitted to the output member 15 is transmitted to the nut 8 and rotates the nut 8. The rotation of the nut 8 is converted into a linear motion of the screw shaft 7 via the plurality of balls 9. Therefore, for example, when the screw shaft 7 is connected to the driven portion of various mechanical devices, the driven portion may be driven by the linear motion of the screw shaft 7. On the other hand, for example, when an axial load is reversely inputted from the driven portion to the screw shaft 7, the axial load is converted into a rotational torque that is reversely inputted to the nut 8, and this rotational torque is reversely inputted from the nut 8 to the output member 15 of the reverse input blocking clutch 5. The reverse input blocking clutch 5 does not transmit the rotational torque that is reversely inputted to the output member 15 to the input member 14, or only transmits a part of the rotational torque to the input member 14 via the pair of engaging members 17, and blocks the remaining part.

The specific operation of the reverse input blocking clutch 5 will be described. First, a case in which a rotational torque is inputted to the input member 14 from the electric motor 3 side will be described. As illustrated in FIG. 6, when a rotational torque is inputted to the input member 14, the input engaging portions 20 rotate in the rotational direction of the input member 14 (clockwise in the example of FIG. 6) inside input engaging holes 31. The surfaces on the inner side in the radial direction of the input engaging portions 20 press the input engaging surfaces 32 inward in the radial direction, and move the pair of engaging members 17 in directions away from the pressed surface 28. Due to the engagement between the input engaging surfaces 32 and the input engaging portions 20, each of the engaging members 17 is moved toward the inside in the radial direction so as to approach each other in the far-near direction (the engaging member 17 located on the upper side of FIG. 6 is moved toward the lower side, and the engaging member 17 located on the lower side of FIG. 6 is moved toward the upper side).

The output engaging surfaces 30 of the pair of engaging members 17 hold the output engaging portion 26 of the output member 15 from both sides in the radial direction, and engage (come in surface contact) with the pair of cam surfaces 27 of the output member 15 without looseness. As a result, the rotational torque inputted to the input member 14 is transmitted to the output member 15 via the pair of engaging members 17, and is outputted from the output member 15. Such transmission of rotational torque from the input member 14 to the output member 15 is performed regardless of the rotational direction of the input member 14.

Figure 7:
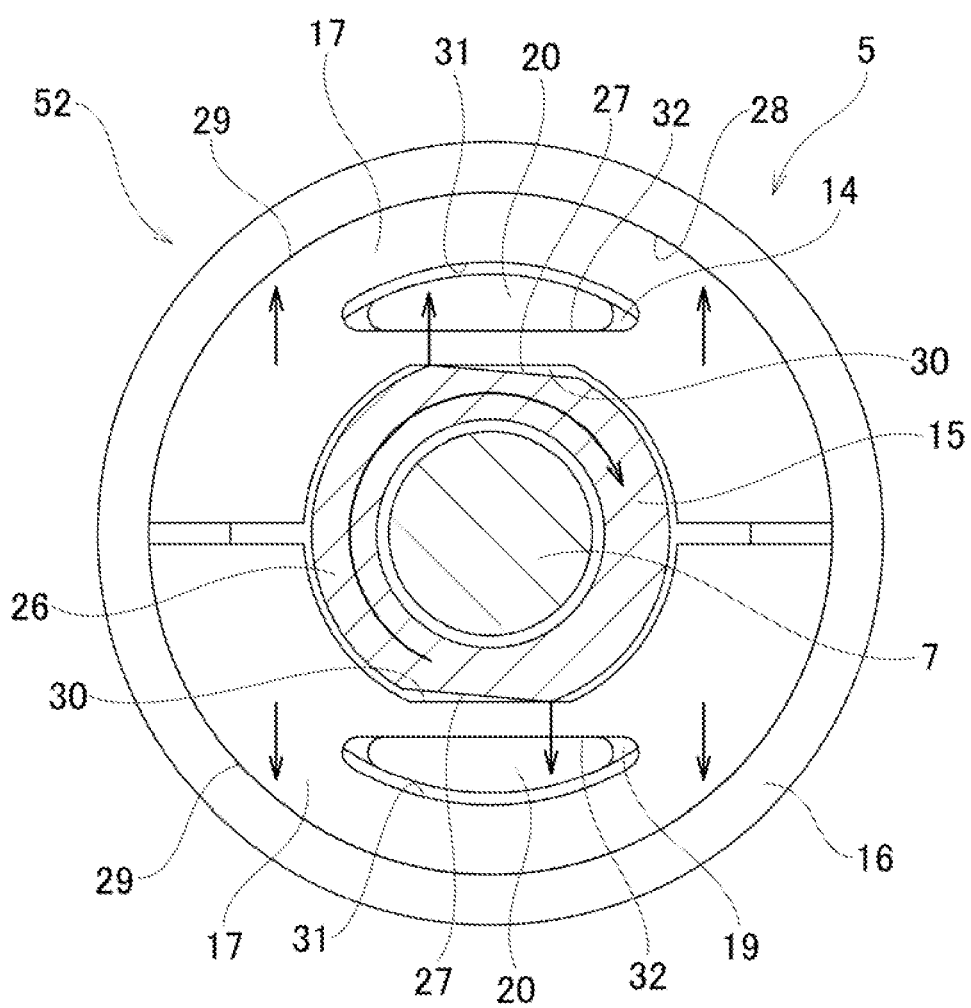
FIG. 7 relates to the reverse input blocking clutch according to the first example of an embodiment of the first aspect and illustrates a state in which rotational torque is reversely inputted to the output member.

Next, a case where the rotational torque is reversely inputted to the output member 15 from the ball screw mechanism 6 side will be described. As illustrated in FIG. 7, when rotational torque is reversely inputted to the output member 15, the output engaging portion 26 rotates on the inner side between the pair of output engaging surfaces 30 in the rotational direction of the output member 15 (rotates clockwise in the example of FIG. 7). Corner portions of the output engaging portion 26 (end portions in the circumferential direction of the cam surfaces 27) press the output engaging surfaces 30 outward in the radial direction, and move the pair of engaging members 17 in directions toward the pressed surface 28. Based on the engagement between the output engaging surfaces 30 and the output engaging portion 26, each of the engaging members 17 moves toward the outside in the radial direction so as to separate from each other (the engaging member 17 positioned on the upper side in FIG. 7 is moved toward the upper side, and the engaging member 17 positioned on the lower side in FIG. 7 is moved toward the lower side). The pressing surfaces 29 of the pair of engaging members 17 are pressed against the pressed surface 28. At this time, the pressing surfaces 29 and the pressed surface 28 come into contact with each other in the entire range or a part (for example, the central portion) of the pressing surfaces 29 in the circumferential direction. In this example, based on this contact, the rotational torque reversely inputted to the output member 15 is blocked from being transmitted to the input member 14, or only a part is transmitted and the remaining part is blocked. Such a blocking function is achieved regardless of the rotation direction of the output member 15. In order to prevent the rotational torque reversely inputted to the output member 15 from being transmitted to the input member 14, the output member 15 is locked by making the pair of engaging members 17 firm between the output engaging portion 26 and the pressed member 16 so that the pressing surfaces 29 do not slide (rotate relatively) with respect to the pressed surface 28. On the other hand, in order to transmit only a part of the rotational torque reversely inputted to the output member 15 to the input member 14 and block the remaining part, the output member 15 is semi-locked by making the pair of engaging members 17 firm between the output engaging portion 26 and the pressed member 16 so that the pressing surfaces 29 slide (rotate relatively) with respect to the pressed surface 28.

Figure 8:
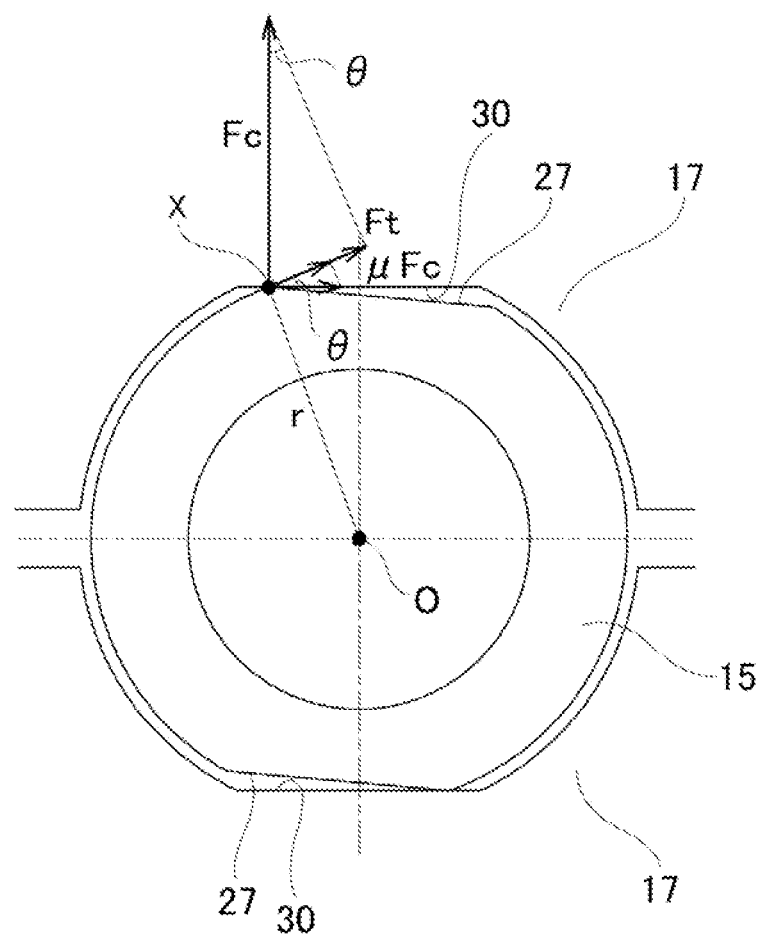
FIG. 8 relates to the reverse input blocking clutch according to the first example of an embodiment of the first aspect, and is a partially enlarged view of FIG. 7 illustrating the relationship between the forces acting on an engaging member from the output member when rotational torque is reversely inputted to the output member.

The theory and conditions for locking or semi-locking the output member 15 when the rotational torque is reversely inputted to the output member 15 will be described more specifically with reference to FIGS. 8 and 9. As illustrated in FIG. 8, when a corner portion of the output engaging portion 26 comes into contact with an output engaging surface 30 due to rotational torque being reversely inputted to the output member 15, a normal force Fc acts on the contact portion X between the corner portion of the output engaging portion 26 and the output engaging surface 30 in the direction perpendicular to the output engaging surface 30.

Moreover, presuming that the coefficient of friction between the output engaging portion 26 and the output engaging surface 30 is a friction force μFc acts on the contact portion X in the direction parallel to the output engaging surface 30. Here, presuming that the wedge angle between the direction of the line of action of the tangential force Ft acting on the contact portion X and the output engaging surface 30 is θ, the tangential force Ft is expressed by the following Equation (1).

$$Ft = Fc \cdot \sin\theta + \mu Fc \cdot \cos\theta \tag{1}$$

Therefore, the normal force Fc is expressed by the following Equation (2) using the tangential force Ft.

$$Fc = Ft/(\sin\theta + \mu \cdot \cos\theta) \tag{2}$$

When a corner portion of the output engaging portion 26 comes into contact with an output engaging surface 30, the magnitude of the torque T transmitted from the output member 15 to the engaging member 17 is expressed by the following Equation (3), where r is the distance from the center axis of rotation O of the output member 15 to the contact portion X.

$$T = r \cdot Ft \tag{3}$$

Figure 9:
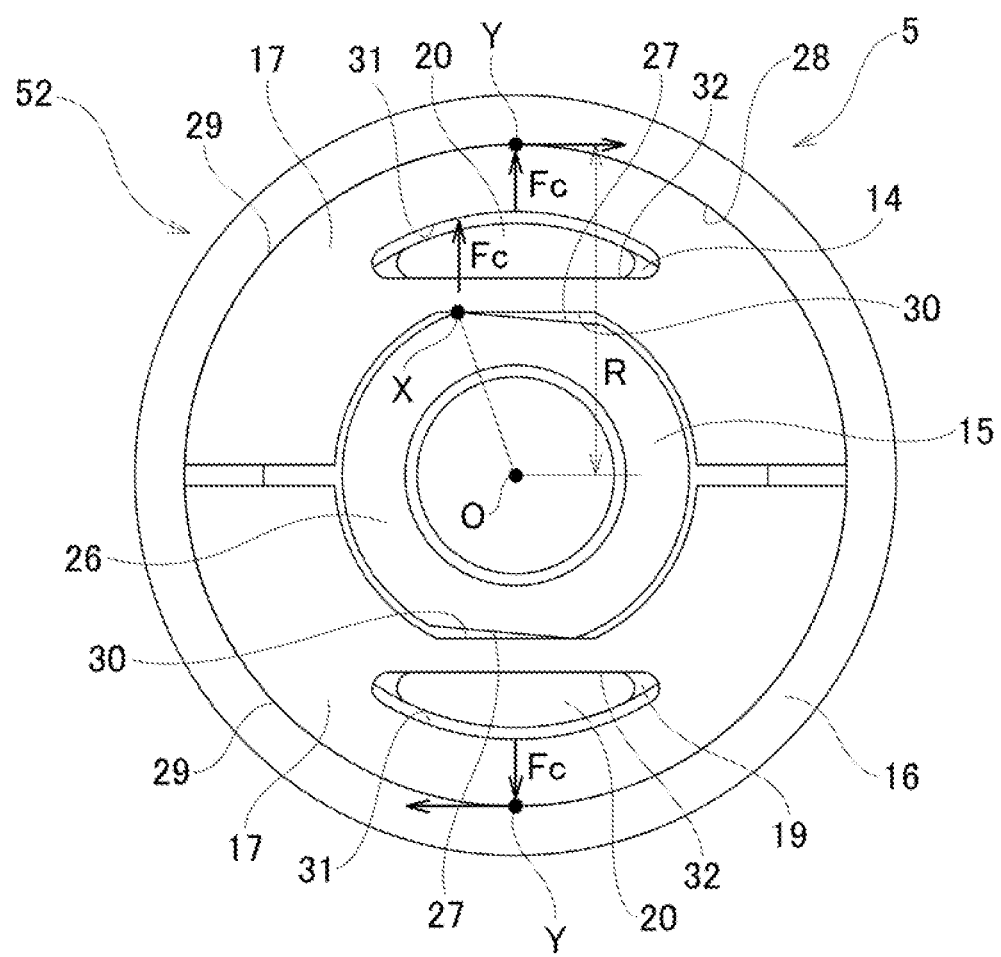
FIG. 9 relates to the reverse input blocking clutch according to the first example of an embodiment of the first aspect, and is for explaining a condition in which the output member is locked when rotational torque is reversely inputted to the output member.

As described above, the normal forces Fc act at the contact portions X, so as illustrated in FIG. 9, the pressing surfaces 29 of the engaging members 17 are pressed against the pressed surface 28 of the pressed member 16 by the forces of the normal forces Fc. Therefore, when the coefficient of friction between the pressing surfaces 29 and the pressed surface 28 is set to μ' and the distance from the center axis of rotation O of the output member 15 to the contact portions Y between the pressing surfaces 29 and the pressed surface 28 is R, the magnitude of the brake torque T' acting on the engaging members 17 is expressed by the following Equation (4).

$$T' = \mu' R Fc \tag{4}$$

Therefore, it can be seen that in order to obtain a larger braking force, the coefficient of friction μ', the distance R, and the normal force Fc should be increased.

In order to lock the output member 15, the transmission torque T and the brake torque T' must satisfy the relationship of the following Equation (5).

$$T < T' \tag{5}$$

Moreover, by substituting the Equations (1) to (4) above into the Equation (5) above, the following Equation (6) may be obtained.

$$\mu' R(\sin\theta + \mu \cdot \cos\theta) > r \tag{6}$$

From the Equation (6) above, it can be seen that when the coefficient of friction μ' between the pressing surfaces 29 and the pressed surface 28 is increased, the output member 15 may be locked even when the distance R is decreased.

In addition, presuming that the coefficient of friction μ and the coefficient of friction μ' are both 0.1, the Equation (7) below may be obtained from the Equation (6) above.

$$R > 10r(\sin\theta + 0.1\cos\theta) \tag{7}$$

From the Equation (7) above, it can be seen that by appropriately setting the distance r from the center axis of rotation O of the output member 15 to the contact portion X, the distance R from the center axis of rotation O of the output member 15 to the contact portion Y, and the wedge angle θ between the direction of the line of action of the tangential force Ft and the output engaging surface 30, the output member 15 is locked.

On the other hand, in order to allow the output member 15 to be half-locked so that only a part of the rotational torque reversely inputted to the output member 15 is transmitted to the input member 14 and the remaining part is blocked, the transmission torque T and the brake torque T' must satisfy the relationship of the following Equation (8).

$$T > T' \tag{8}$$

Furthermore, as is clear from the Equation (6) above, by appropriately setting the coefficient of friction μ between the output engaging portion 26 and the output engaging surface 30, the friction coefficient μ' between the pressing surface 29 and the pressed surface 28, the distance r from the central axis of rotation O to the contact portion X, the distance R from the center axis of rotation O to the contact portion Y, and the wedge angle θ between the direction of the action line of the tangential force Ft and the output engaging surface 30, the output member 15 may be semi-locked.

In a case where rotational torque is inputted to the input member 14 in a state in which the output member 15 locked or half-locked, when the normal forces acting on the engaging members 17 from the input member 14 become larger than the normal forces Fc acting on the engaging members 17 from the output member 15, the locked or semi-locked output member 15 is released. In other words, the engaging members 17 move inward in the radial direction, and the rotational torque is transmitted from the input member 14 to the output member 15.

In the actuator 1 of this example, when a load in the axial direction is reversely inputted to the screw shaft 7 and the rotational torque is reversely inputted to the output member 15 of the reverse input blocking clutch 5 by applying a reaction force to the driven portion of various mechanical devices coupled to the screw shaft 7, the reverse input blocking clutch 5 prevents the output member 15 from rotating (locks the output member 15), so the rotational torque reversely inputted to the output member 15 is not transmitted to the input member 14, or the reverse input blocking clutch 5 suppresses the rotation of the output member 15 (semi-locks the output member 15), and only a part of the rotational torque that reversely inputted to the output member 15 is transmitted to the input member 14 and the remaining part is blocked. Therefore, in a case of locking the output member 15 even when the electric motor 3 is not energized, the position of the driven portion may be held, and in a case of semi-locking the output member 15, it is possible to prevent the position of the driven portion from changing suddenly. In short, it is not necessary for the electric motor 3 to generate a force for holding the position of the driven portion and for preventing the position of the driven portion from suddenly changing against a reaction force applied to the driven portion. Therefore, the power consumption of the electric motor 3 may be reduced accordingly.

In a case of implementing the actuator 1 of this example, when the output member 15 is set to be half-locked, the blocking amount of the rotational torque reversely inputted to the output member 15 is appropriately set depending on the usage of the actuator 1. For example, in a case where the actuator 1 of this example is used by being incorporating into a steer-by-wire type steering apparatus of an automobile, the housing 2 is fixed to the vehicle body in a state where the axial direction of the screw shaft 7 is aligned with the vehicle width direction, and the base end portion of the tie rod connected to a steered wheel is coupled to the end portion in the axial direction of the screw shaft 7. When the steering wheel is operated while the vehicle is running in order to turn the vehicle in a curved line, a reaction force, in other words, a restoring force from the road surface that returns the steering angle to a straight running state acts on the steered wheels. Utilizing this restoring force has a first advantage in that the operation of the steering wheel when returning the automobile from curved driving to straight driving becomes easy. Then, when the output member 15 is set to be half-locked, in addition to obtaining the first advantage, in a case where the reaction force acting on the steered wheels from the road surface becomes large (for example, a case in when a steered wheel rides up on a curb), a second advantage is obtained in that the steering angle of the steered wheels may be prevented from suddenly changing.

However, there is a relationship in that the first advantage become more difficult to obtain as the blocking amount of the rotational torque that is reversely inputted to the output member 15 increases, and the second advantage becomes more difficult to obtain as the blocking amount of the rotational torque reversely inputted to the output member 15 decreases. In a case in which the actuator 1 of this example is incorporated into the steer-by-wire type steering apparatus and the output member 15 is set to be half-locked, it is preferable from the aspect of obtaining the first advantage that the blocking amount of the rotational torque reversely inputted to the output member 15 be 80% or less, and more preferably 20% or less. From the aspect of obtaining the second advantage, it is preferable that the blocking amount of the rotational torque reversely inputted to the output member 15 be 20% or more, and more preferably 80% or more. From the aspect of obtaining both the first advantage and the second advantage, it is preferable that the blocking amount of the rotational torque reversely inputted to the output member 15 be within the range of 20% to 80%.

Note that the blocking amount may be found from the following Equation (9).

(Blocking amount of rotational torque reversely inputted to the output member 15)=[(Rotational torque reversely inputted to the output member 15)−(Rotational torque transmitted to the input member 14)]/(Rotational torque reversely inputted to the output member 15)    (9)

In the reverse input blocking clutch 5 of this example, the engaging members 17 have both a function of transmitting the rotational torque inputted to the input member 14 to the output member 15 and a function of blocking the rotational torque reversely inputted to the output member 15 (function of locking or semi-locking the output member 15). Therefore, the number of parts of the reverse input blocking clutch 5 may be suppressed, and the operation can be stabilized as compared with the case where both functions are provided in different members. For example, in a case where each of two members differently has a function of transmitting rotational torque or a function of blocking rotational torque, there is a possibility that the timing of releasing the blocking of rotational torque that is reversely inputted to the output member and the timing of starting the transmission of rotational torque from the input member to the output member may deviate from each other. In this case, when rotational torque is reversely inputted to the output member between the time when the blocking of the rotational torque is released and the time when the transmission of the rotational torque to the output member is started, the output member is locked again. In this example, the engaging member 17 is provided with both a function of transmitting the rotational torque input to the input member 14 to the output member 15 and a function of blocking the rotational torque reversely input to the output member 15, so it is possible to prevent such an inconvenience from occurring.

In this example, the direction of the force acting on the engaging member 17 from the input member 14 and the direction of the force acting on the engaging member 17 from the output member 15 are opposite to each other, so the direction of movement of the engaging member 17 may be controlled. by regulating the magnitude relation of both forces. Therefore, the operation of switching between the locked or semi-locked state and the unlocked state of the output member 15 can be easily (stably and surely) performed. Therefore, it is possible to prevent the inconvenience of the rolling body remaining bitten in the narrow portion of the wedge-shaped space in the radial direction and not releasing the locked state as in the case of a reverse input blocking clutch as in a conventional structure.

In this example, the locking mechanism 52 of the reverse input blocking clutch 5 is arranged at a portion deviated to the one side in the axial direction from the nut 8. Moreover, the inner diameter dimension of the output engaging portion 26 of the locking mechanism 52 (inner diameter dimension of the small-diameter inner circumferential surface portion 24) is smaller than the outer diameter dimension of the range in the axial direction in which the female-side spiral groove 11 exists in the nut 8. Therefore, the diameter of the locking mechanism 52 may be reduced.

To explain this point in more detail, the circulation path 12 is provided on the outer side in the radial direction of the female spiral groove 11 in the range in the axial direction in which the female-side spiral groove 11 exists in the nut 8, so the outer diameter dimension of this range in the axial direction tends to become large. Moreover, in order to secure the strength of the output engaging portion 26 of the locking mechanism 52, it is necessary to secure the thickness in the radial direction at a specified amount or more. Therefore, when the output engaging portion of the locking mechanism is arranged on the outer side in the radial direction of the range in the axial direction where the female-side spiral groove 11 exists in the nut 8, the outer diameter dimension of the output engaging portion is also increased accordingly by that amount. On the other hand, in this example, the output engaging portion 26 of the locking mechanism 52 is arranged at a portion separated in the axial direction from the nut 8, and the inner diameter of the output engaging portion 26 is smaller than the outer diameter of the range in the axial direction in which the female-side spiral groove 11 exists in the nut 8. Therefore, in this example, the outer diameter dimension of the output engaging portion 26 may be made smaller as compared with a structure in which the output engaging portion is arranged on the outer side in the radial direction of the range in the axial direction where the female-side spiral groove 11 exits in nut 8. Therefore, the diameter of the locking mechanism 52 may be reduced by that amount, and the actuator 1 may be made smaller in the radial direction.

In this example, the reduction mechanism 4 and the locking mechanism 52 are arranged so as to be adjacent to each other in the axial direction without having the first bearing 13 located between the reduction mechanism 4 and the locking mechanism 52 in the axial direction. Therefore, structure in which the input member 14 spans between the output gear 50 of the reduction mechanism 4 and the locking mechanism 52 may be simplified.

In this example, the reduction mechanism 4 is provided between the electric motor 3 and the reverse input blocking clutch 5. Therefore, at least a part of the rotational torque that is reversely inputted from the ball screw mechanism 6 side is blocked by the reverse input blocking clutch 5 before being transmitted to the reduction mechanism 4. Accordingly, the reduction mechanism 4 is protected from the rotational torque that is reversely inputted. More specifically, fretting in the engagement or the like between the input gear 49 and the output gear 50 is prevented or suppressed.

In this example, a ball screw mechanism is adopted as a rotational linear motion conversion mechanism; however, in a case of implementing the present invention, a sliding screw mechanism may be applied as the rotation/linear motion conversion mechanism instead. In other words, by taking the male-side engaging portion existing on the outer circumferential surface of the screw shaft as the male screw portion, and taking the female-side engaging portion existing on the inner circumferential surface of the nut as the female screw portion and then screwing together the male screw portion and the female screw portion, the male screw portion and the female screw portion may directly engaged with each other.

In a case of implementing the present invention, in addition to an electric motor, an engine, a water turbine, a wind turbine, or the like may be applied as a drive source of the actuator. Moreover, the drive source of the actuator may also be human power. Furthermore, a rotational linear motion conversion mechanism such as a ball screw mechanism, a planetary roller screw mechanism and the like has a function of reducing the output of the drive source, so the reduction mechanism may be omitted.

In a case of implementing the present invention, the materials of the input member, the output member, the pressed member, and the engaging members of the reverse input blocking clutch are not particularly limited. For example, as these materials, in addition to metals such as iron alloys, copper alloys, aluminum alloys and the like, synthetic resins mixed with reinforcing fibers as needed may also be applied. Moreover, the input member, the output member, the pressed member, and the engaging members may be made of the same material or may be made of different materials. For example, in order to improve the switchability between the locked or semi-locked state and the released state, the hardness, elasticity, and the like may be made to be different between the input member, the output member, the pressed member and the engaging members. Furthermore, in a case where rotational torque is reversely inputted to the output member, as long as the output member meets the locked or semi-locked condition, lubricants such as traction oil, traction grease, ordinary lubricating oil and the like may also be arranged at the portions where the input member, the output member, the pressed member, and the engaging members come into contact with each other. In this case, at least one of the input member, the output member, the pressed member, and the engaging members may be made of oil-impregnated metal.

The actuator of the present invention is not limited to use in automobiles, and may also be applied to steer-by-wire type steering apparatuses mounted on various transportation devices such as construction equipment, ships and the like.

In addition to the actuator, the reverse input blocking clutch of the first aspect may be applied to various mechanical devices such as a variable compression ratio device, an electric door device, a power window device, a steering device, a jack, and the like. The number of engaging members of the reverse input blocking clutch of the first aspect is not limited to two, and may be one or three or more.

Second Example of Embodiment of First Aspect

Figure 12:
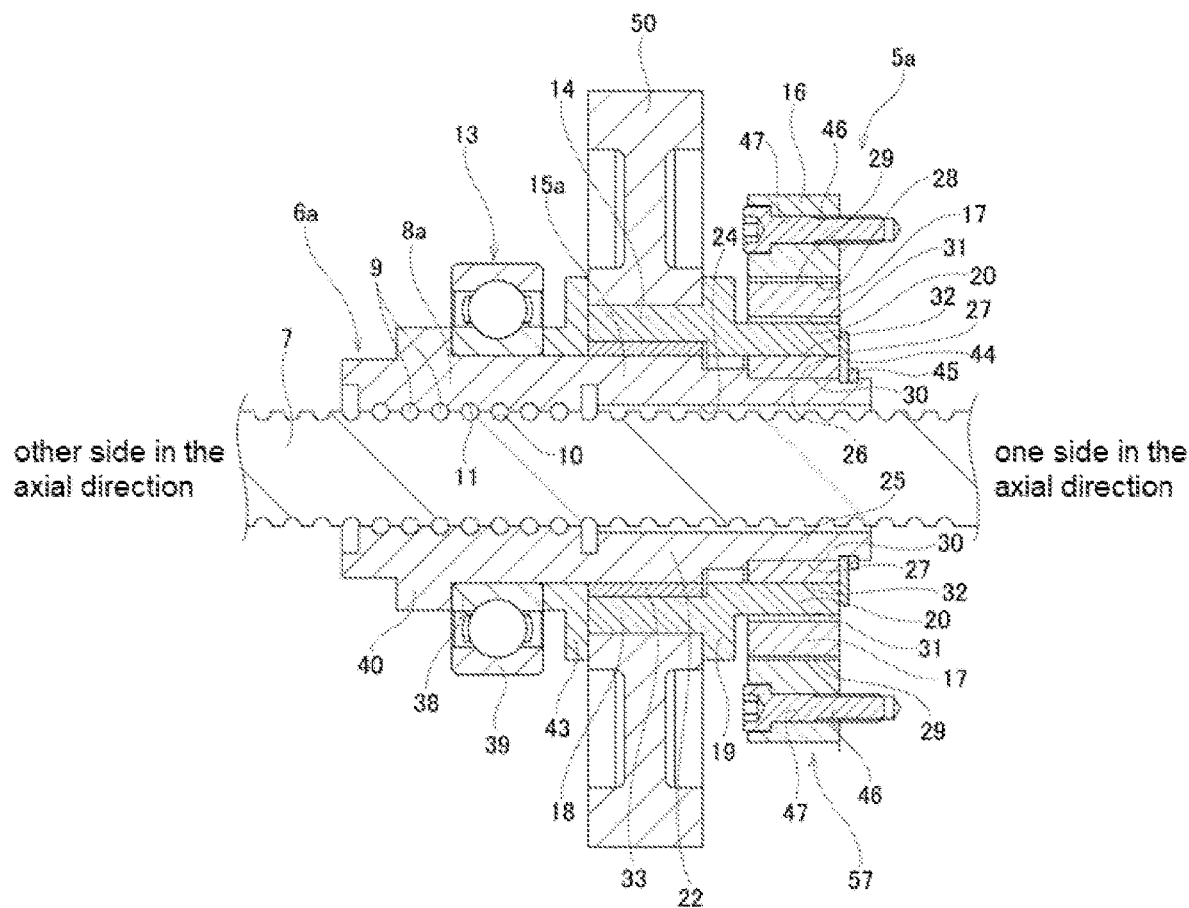
FIG. 12 is a partial cross-sectional view of an actuator according to a second example of an embodiment of the first aspect.

A second example of an embodiment of the first aspect of the present invention will be described with reference to FIG. 12.

In this example, the output member 15*a* of the reverse input blocking clutch 5*a* is integrally formed with the nut 8*a* of the ball screw mechanism 6*a*.

With the actuator of this example having such a configuration, the number of parts may be reduced by integrally forming the output member 15*a* with the nut 8*a*. More specifically, the nut 8*a* and the output member 15*a* can be combined into one component, and the plurality of bolts 35 (see FIGS. 1 and 2) used as the coupling member may be omitted. As a result, the actuator may be made smaller, lighter, and the assembly man-hours may be reduced. Furthermore, by reducing the inertial force of the rotating body including the nut 8*a*, it is possible to reduce the power consumption of the electric motor 3 (see FIG. 1) as a drive source. Other configurations and operations are the same as in the first example of an embodiment of the first aspect.

Third Example of Embodiment of First Aspect

Figure 13:
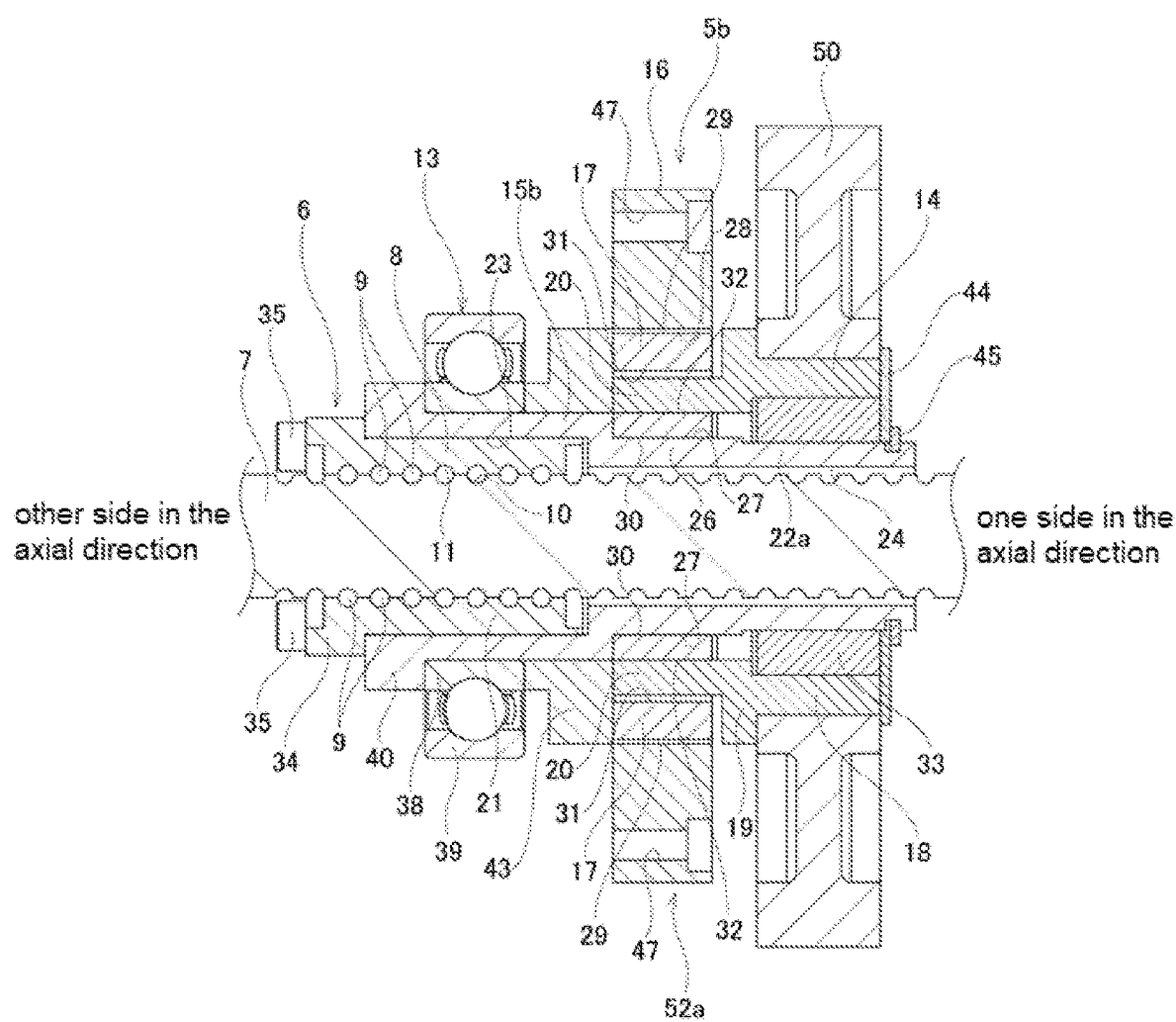
FIG. 13 is a partial cross-sectional view of an actuator according to a third example of an embodiment of the first aspect.

A third example of an embodiment of the first aspect of the present invention will be described with reference to FIG. 13.

In this example, the positional relationship in the axial direction between the reduction mechanism 4*a* and the locking mechanism 52*a* of the reverse input blocking clutch 5*b* is reversed from that of the first example of an embodiment of the first aspect. In other words, in this example, the locking mechanism 52*a* is arranged between the first bearing 13 and the reduction mechanism 4*a* in the axial direction. The output engaging portion 26 is provided on the other side portion in the axial direction of an offset cylinder portion 22*a* of an output member 15*b*, and the pressed member 16, the pair of engaging members 17, and the pair of input engaging portions 20, 20 of the locking mechanism 52*a* are arranged on the outer side in the radial direction of the output engaging portion 26. Moreover, a reduction mechanism 4*a*, an input cylinder portion 18, and a second bearing 33 are arranged on the outer side in the radial direction of one side portion in the axial direction of the offset cylinder portion 22*a*. Other configurations and operations are the same as in the first example of an embodiment of the first aspect.

Fourth Example of Embodiment of First Aspect

Figure 14:
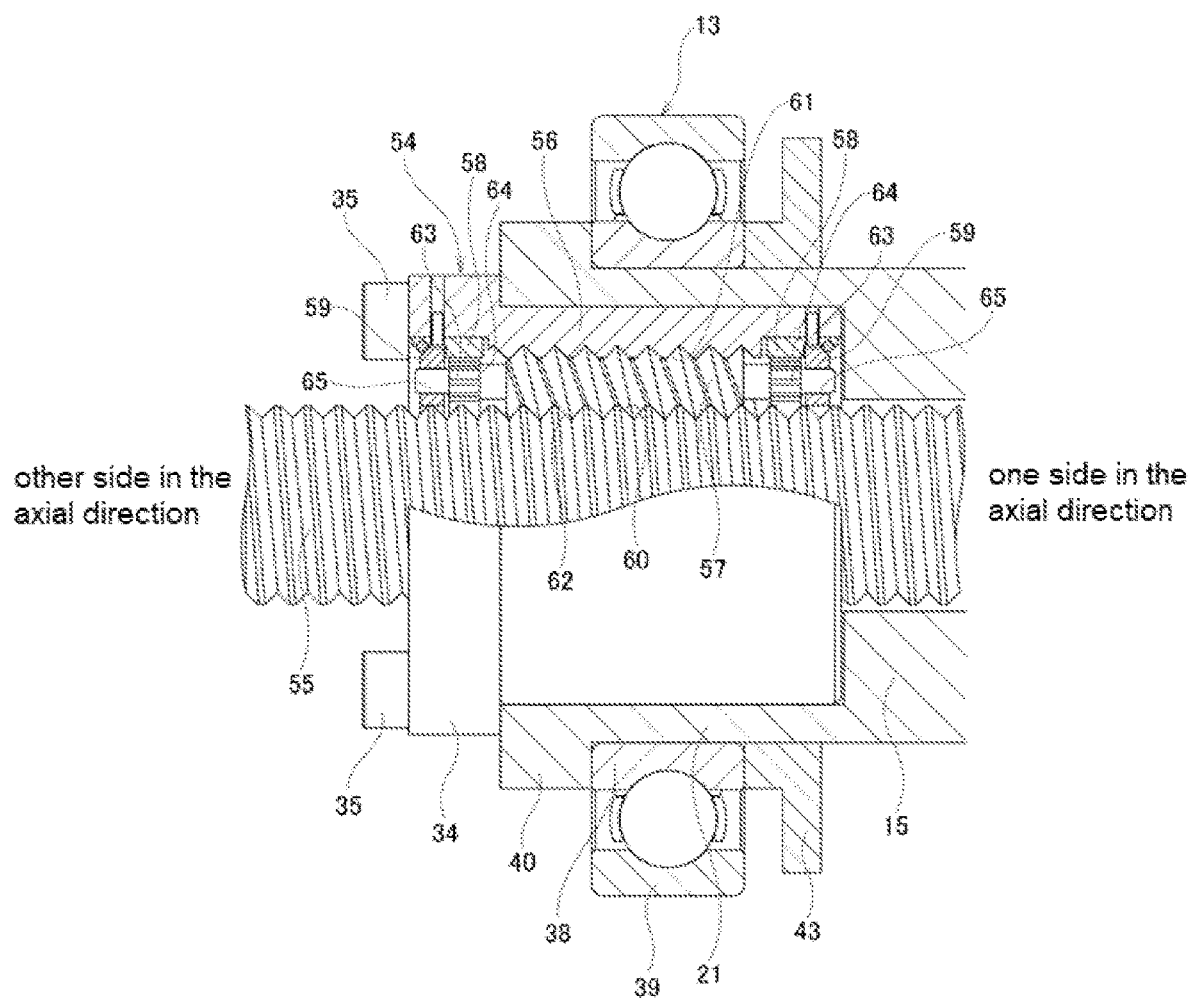
FIG. 14 is a partial cross-sectional view of a fourth example of an embodiment of the first aspect.

A fourth example of an embodiment of the first aspect of the present invention will be described with reference to FIG. 14.

This example differs from the first example of an embodiment of the first aspect in that a planetary roller screw mechanism 54 is used instead of the ball screw mechanism 6 (see FIG. 1) as the rotational linear motion conversion mechanism.

The planetary roller screw mechanism 54 includes a screw shaft 55, a nut 56, a plurality of planetary rollers 57, two ring gears 58, and two cages 59.

The screw shaft 55 has a male screw portion 60 on the outer circumferential surface. The nut 56 has a female screw portion 61 on the inner circumferential surface of the intermediate portion in the axial direction, and is arranged around the screw shaft 55 so as to be coaxial with the screw shaft 55. Each of the planetary rollers 57 has a roller screw portion 62 on the outer circumferential surface of the intermediate portion in the axial direction, and has gear portions 63 on the outer circumferential surface of the portions near both ends in the axial direction. The plurality of planetary rollers 57 are arranged parallel to the screw shaft 55, and are arranged at equal intervals in the circumferential direction between the outer circumferential surface of the screw shaft 55 and the inner circumferential surface of the nut 56. The roller screw portion 62 of each planetary roller 57 engages with both the male screw portion 60 and the female screw portion 61.

Each of the two ring gears 58 has an annular shape and has a gear portion 64 on the inner circumferential surface. One each of the ring gears 58 is internally fitted and fixed to the nuts 56 at both ends in the axial direction. Each of the gear portions 64 of the ring gears 58 engages with the gear portions 63 existing in portions near both ends in the axial direction of each planetary roller 57. Each of the two cages 59 has an annular shape and has support holes 65 in the axial direction at a plurality of positions at equal intervals in the circumferential direction. One cage 59 each is arranged between the outer circumferential surface of the screw shaft 55 and the inner circumferential surface of both end portions in the axial direction of the nut 56. Both end portions in the axial direction of the planetary rollers 57 are rotatably inserted into respective support holes 65 of the cages 59. Each of the cages 59 is free to rotate with respect to both the screw shaft 55 and the nut 56, and is prevented from being displaced in the axial direction with respect to the nut 56.

In such a planetary roller screw mechanism 54, when there is relative rotational movement between the screw shaft 55 and the nut 56, the planetary rollers 57 revolve while rotating between the screw shaft 55 and the nut 56, and based on this, there is relative linear movement between the screw shaft 55 and the nut 56.

In this example, instead of the screw shaft 7 (see FIG. 1) of the first example of the embodiment of the first aspect, the screw shaft 55 is arranged inside the housing 2 (see FIG. 1), and, instead of the nut 8 (see FIG. 1), the output cylinder portion 21 of the output member 15 is externally fitted and fixed to the nut 56. Although it is not illustrated in the figures, in this example as well, a configuration is adopted in which the locking mechanism 52 (see FIG. 1) of the reverse input blocking clutch 5 is arranged at a portion separated from the nut 56 on the one side in the axial direction, and the inner diameter dimension of the output engaging portion 26 (see FIG. 1) of the locking mechanism 52 is smaller than the outer diameter dimension of the range in the axial direction in which the female screw portion 61 exists in the nut 56. Therefore, the diameter of the locking mechanism 52 may be reduced. Other configurations and operations are the same as in the first example of an embodiment of the first aspect.

Fifth Example of Embodiment of First Aspect

Figure 15:
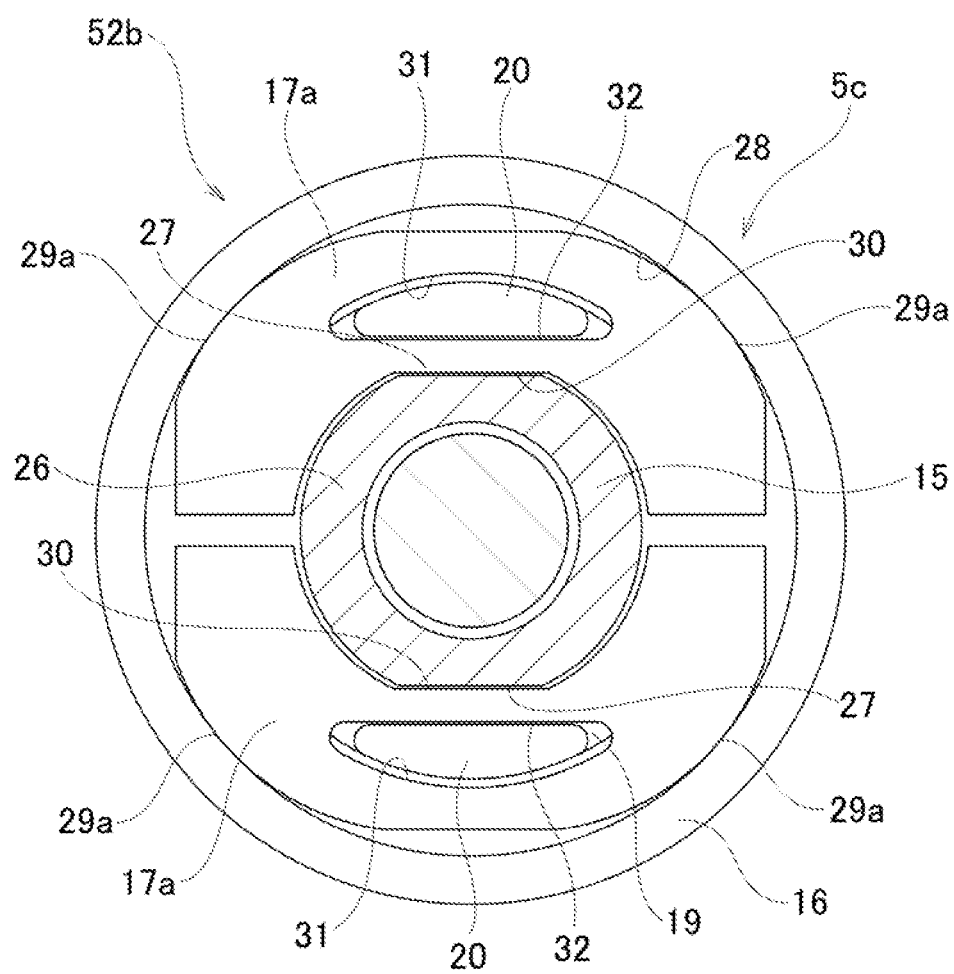
FIG. 15 relates to a fifth example of an embodiment of the first aspect, and corresponds to FIG. 5.
Figure 16:
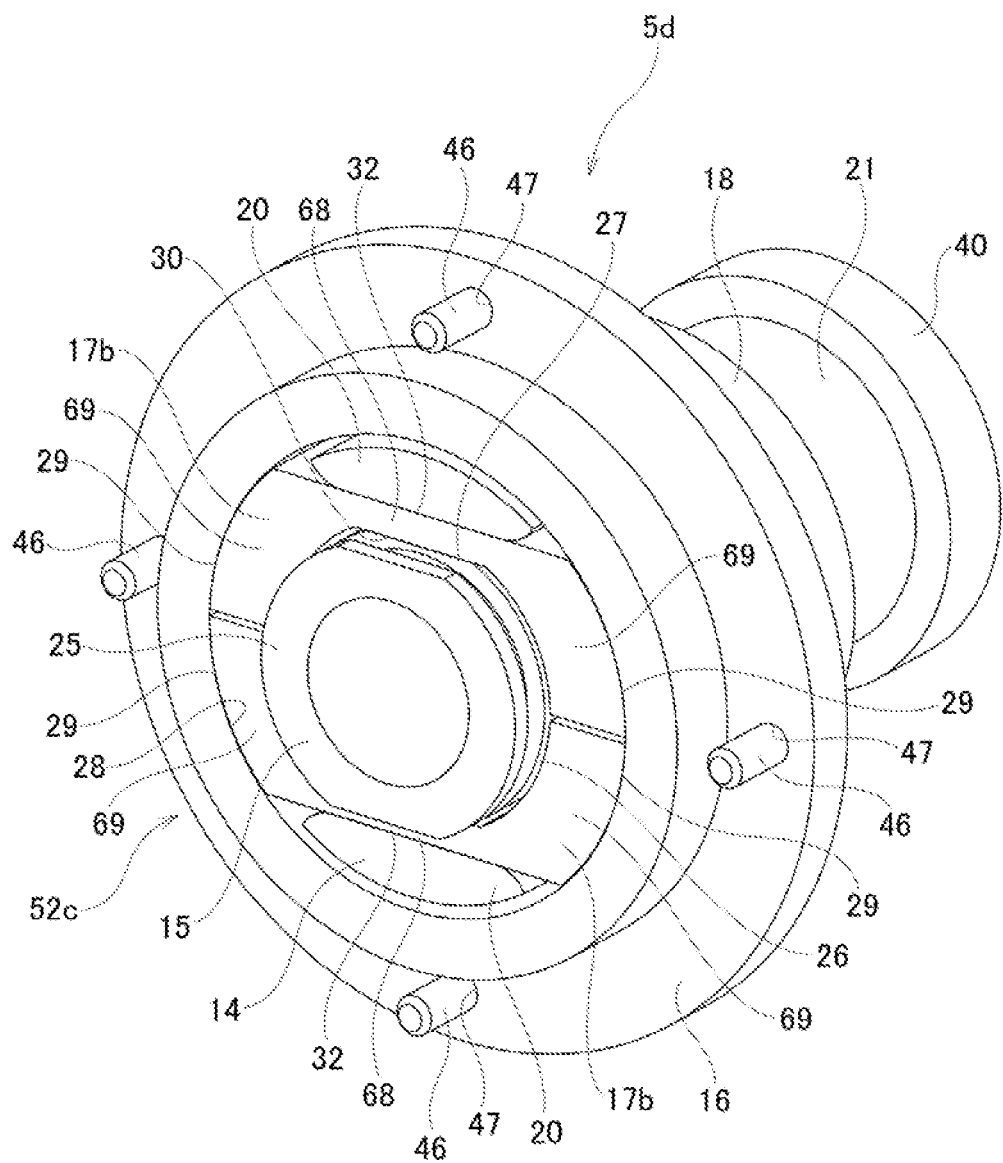
FIG. 16 is a perspective view of a reverse input blocking clutch according to a first example of an embodiment of a second aspect of the present invention.
Figure 17:
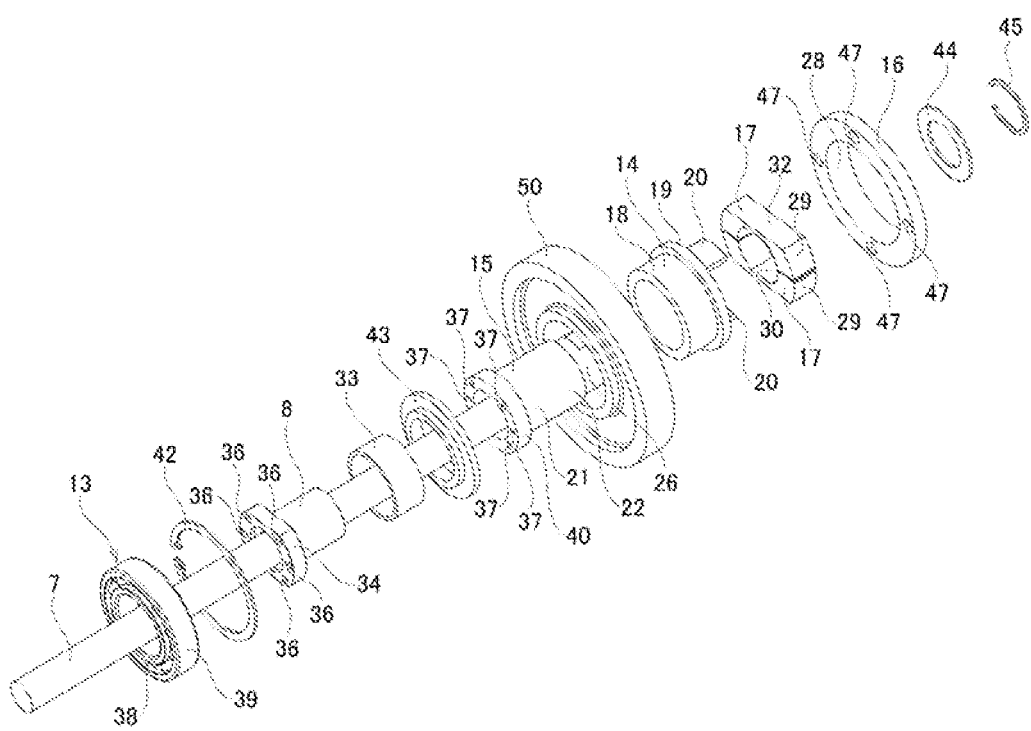
FIG. 17 is an exploded perspective view of a ball screw mechanism and the reverse input blocking clutch constituting an actuator according to the first example.

A fifth example of an embodiment of the first aspect of the present invention will be described with reference to FIG. 15.

In this example, the structure of the locking mechanism 52b of the reverse input blocking clutch 5c is different from that of the first example of an embodiment of the first aspect. In other words, in this example, each of the outer side surfaces in the far-near direction of the pair of engaging members 17a are the pressing surfaces 29a in which the two portions separated in the circumferential direction are pressed against the pressed surface 28, and the intermediate portion in the circumferential direction that is located between the pressing surfaces 29a is a portion that is not pressed against the pressed surface 28, or in other words, is a portion that is retracted inward in the radial direction from the pressing surfaces 29a. Each of the pressing surfaces 29a is a cylindrical convex surface having a radius of curvature smaller than the radius of curvature of the pressed surface 28.

In this example having such a configuration, when rotational torque is reversely inputted to the output member 15 and the engaging members 17a are pressed against the pressed surface 28 by the output engaging portion 26, a wedge effect is generated, and the frictional engagement force between the pressed surface 28 and the pressing surfaces 29a is able to be increased. Therefore, the brake torque T' acting on the engaging members 17a may be increased. Accordingly, the diameter dimension of the locking mechanism 52b for obtaining the required brake torque T' may be reduced. Other configurations and operations are the same as in the first example of an embodiment of the first aspect.

In the first aspect of the present invention, the structures of the examples of an embodiment of the first aspect described above can be appropriately combined and implemented as long as technical contradiction does not occur.

First Example of Embodiment of Second Aspect

A first example of an embodiment of a second aspect of the present invention will be described with reference to FIGS. 16 to 22. In this second aspect of the present invention as well, the reverse input blocking clutch is applied to an actuator.

The reverse input blocking clutch 5d of the first example of an embodiment of the second aspect includes:

a pressed member 16 having a cylindrical concave-shaped pressed surface 28 having a center axis;

an input member 14 having input engaging portions 20 arranged on the inner side in the radial direction of the pressed surface 28 and having a center axis of rotation that is coaxial with the central axis of the pressed surface 28;

an output member 15 having an output engaging portion 26 arranged further on the inner side in the radial direction of the pressed surface 28 than the input engaging portions 20 and having a center axis of rotation that is coaxial with the pressed surface 28; and a pair of engaging members 17b, each having a first portion 68 arranged on the inner side in the radial direction of the pressed surface 28 at a position located in the radial direction between the input engaging portion 20 and the output engaging portion 26, and a pair of second portions 69 arranged at positions deviated to both sides in the circumferential direction from the position located in the radial direction between the input engaging portion 20 and the output engaging portion 26.

The reverse input blocking clutch 5d of the first example of an embodiment of the second aspect is configured so that in a case where rotational torque is inputted to the input member 14, the engaging members 17b move in a direction away from the pressed surface 28 due to the input engaging portions 20 engaging with the first portions 68, and by the first portions 68 engaging with the output engaging portion 26, transmit the rotational torque that is inputted to the input member 14 to the output member 15; and in a case where rotational torque is reversely inputted to the output member 15, the engaging members 17b move in a direction toward the pressed surface 28 due to the output engaging portion 26 engaging with the first portions 68, and by the pair of second portions 69 being pressed against the pressed surface 28, do not transmit the rotational torque that is reversely inputted to the output member 15 to the input member 14, or transmit a part of the rotational torque that is reversely inputted to the output member 15, to the input member 14, and block the remaining part.

In particular, in the reverse input blocking clutch 5*f* of this first example of an embodiment of the second aspect, in a case where rotational torque is inputted to the output member 15, a pair of contact portions M1, M2 where the pair of second portions 69 come in contact with the pressed surface 28 are positioned closer to the center axis O of the pressed surface 28 than a specified portion in the directions of the bisector Z of the tangent lines X1 and X2 of the pressed surface 28 at each area of contact of the pair of contact portions M1, M2, where the specified portion is a portion (chain line L1 in FIG. 21) of the first portion 68 to which the input engaging portion 20 engages when a rotational torque is inputted to the input member 14.

Preferably, the specified portion is taken to be a portion of the first portion 68 where the output engaging portion 26 engages in a case where rotational torque is reversely inputted to the output member 15 (chain line L2 in FIG. 21), and the pair of contact portions M1 and M2 are positioned to a side closer to the center axis O of the pressed surface 28.

Figure 18:
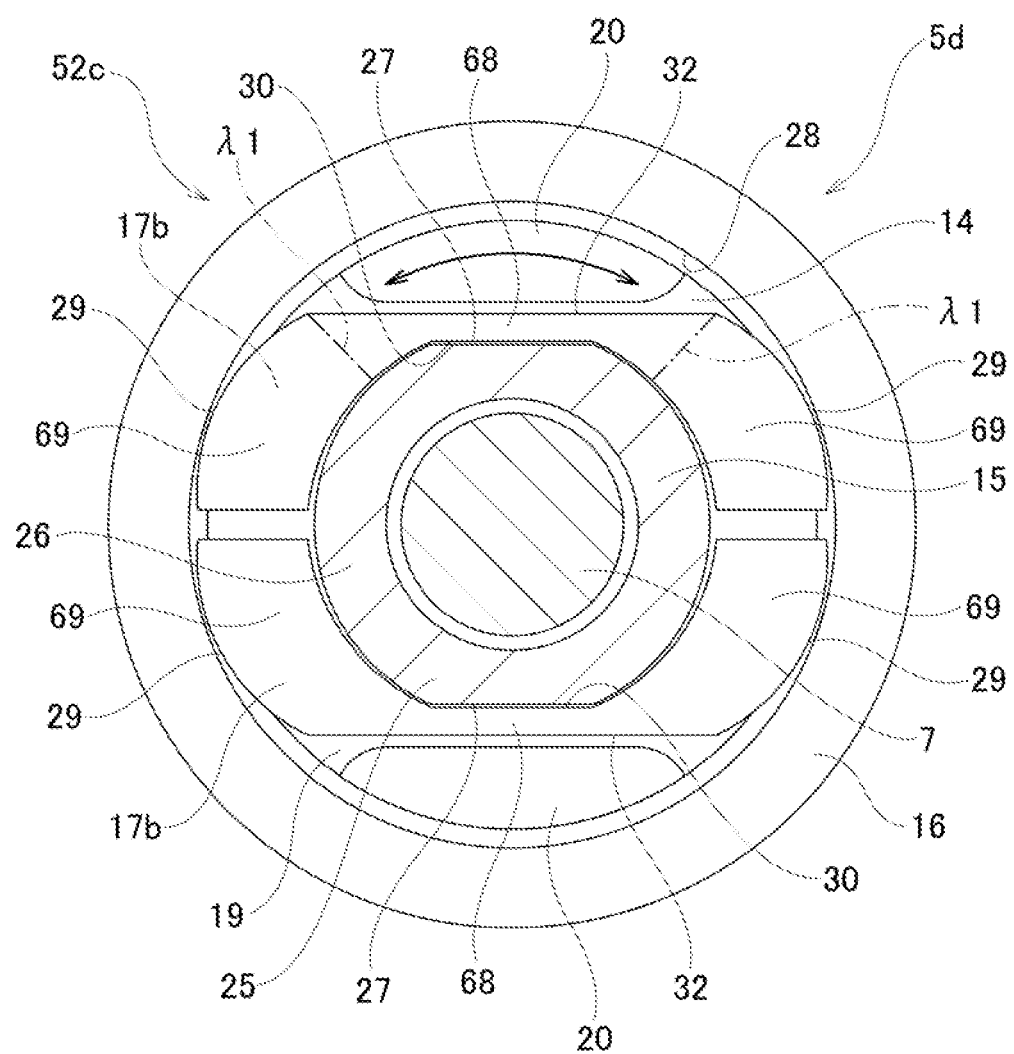
FIG. 18 relates to the first example of an embodiment of the second aspect, and corresponds to FIG. 5.
Figure 19:
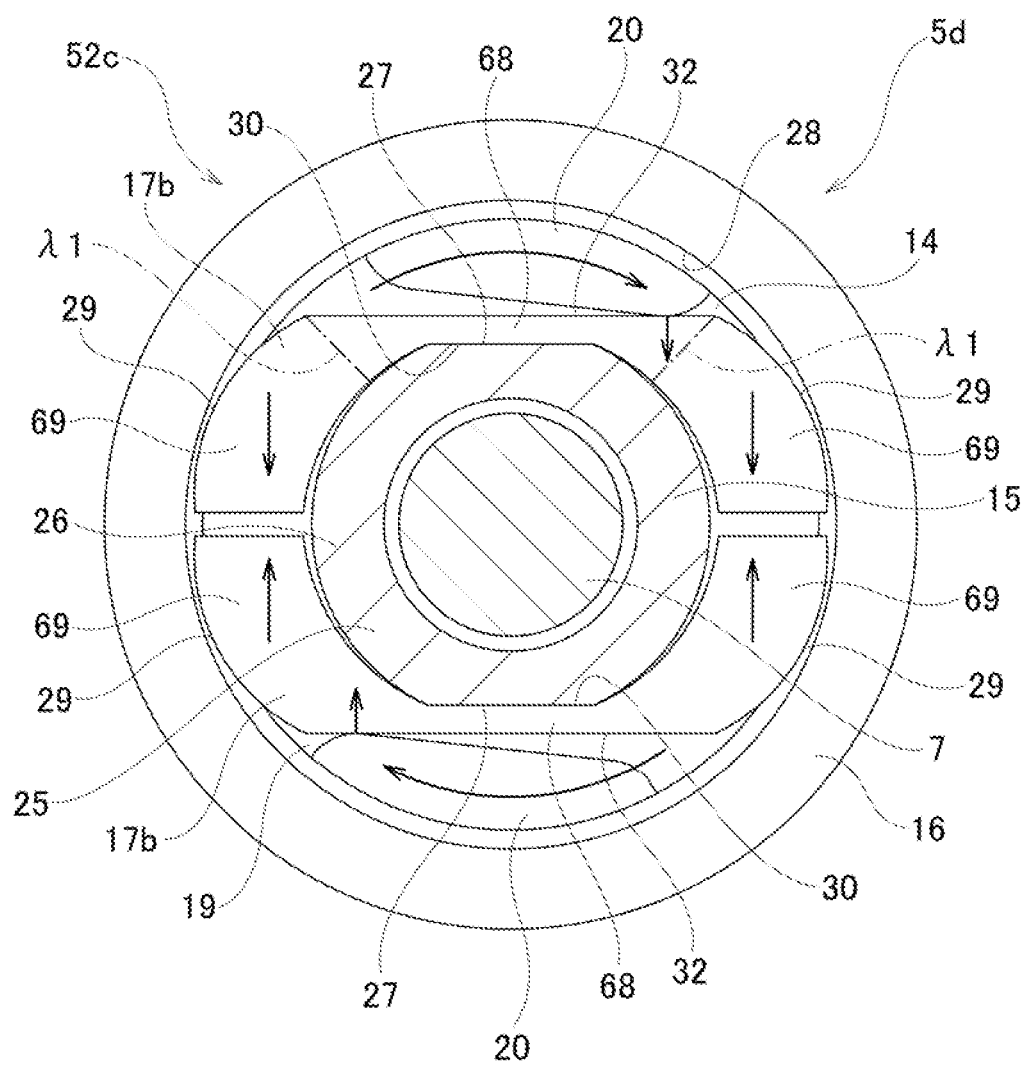
FIG. 19 relates to the reverse input blocking clutch according to the first example of an embodiment of the second aspect, and illustrates a state in which rotational torque is inputted to the input member.
Figure 20:
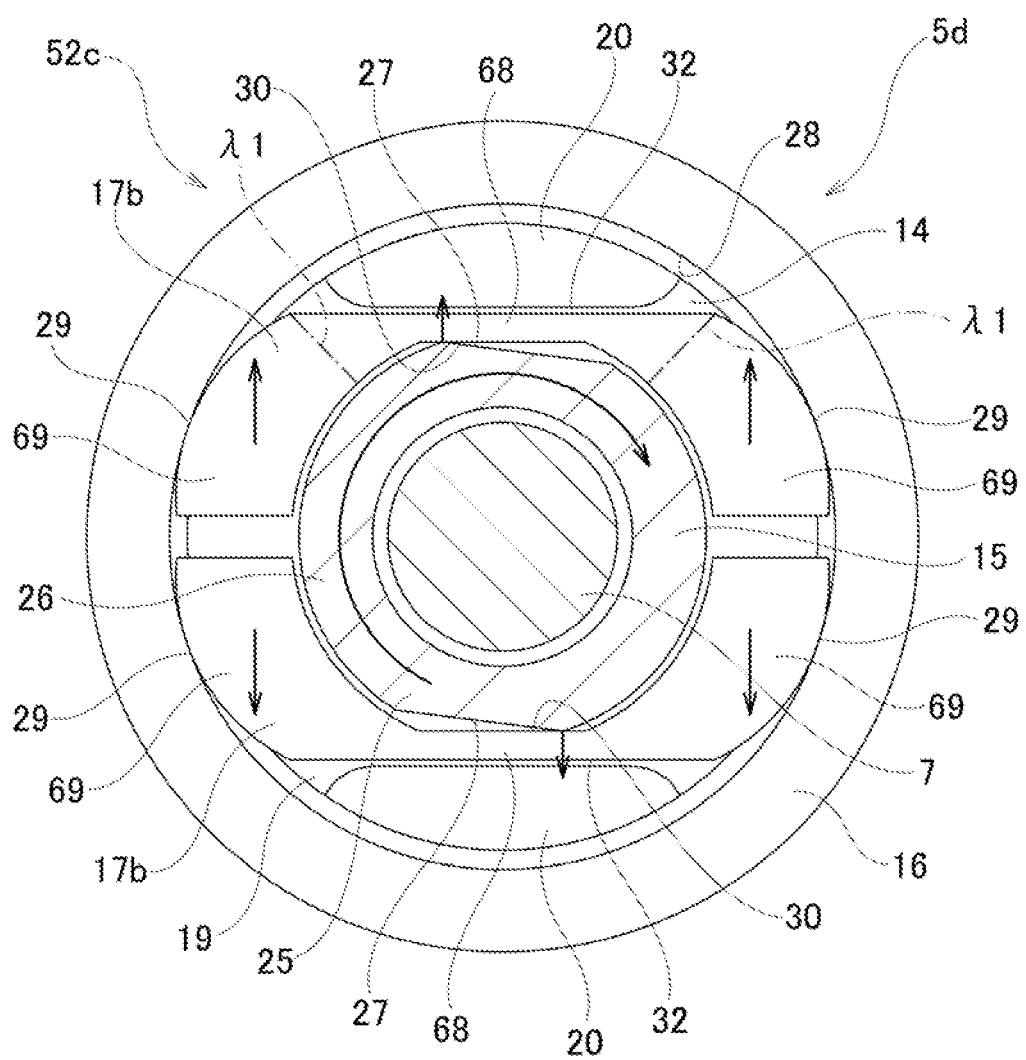
FIG. 20 relates to the reverse input blocking clutch according to the first example of an embodiment of the second aspect, and illustrates a state in which rotational torque is reversely inputted to the output member.

Hereinafter, the reverse input blocking clutch 5*d* of this first example of an embodiment of the second aspect will be described in more detail. In the reverse input blocking clutch 5*d* of this example, each of the engaging members 17*b* of the pair of engaging members 17*b* has a substantially arc-shaped plate shape (bow-shaped plate shape) and is arranged on the inner side in the radial direction of the pressed member 16. More specifically, the pair of engaging members 17*b* is arranged between the pressed surface 28 and the outer circumferential surface of the output engaging portion 26 so that the pair of engaging members 17*b* sandwiches the output engaging portion 26 from both sides in the radial direction that is the separating direction (both sides in the vertical direction in FIG. 18) of the pair of cam surfaces 27. In addition, each of the pair of engaging members 17*b* has a first portion 68 arranged on the inner side in the radial direction of the pressed surface 28 at a position located in the radial direction between the input engaging portion 20 and the output engaging portion 26; and a pair of second portions 69 arranged at positions on both sides in the circumferential direction separated from the position located between the input engaging portion 20 and the output engaging portion 26 in the radial direction. In FIGS. 18 to 20, the chain lines 2J are virtual lines indicating the boundaries between the first portion 68 and the second portions 69. In this example, none of the engaging members 17*b* has a portion on the inner side in the radial direction of the pressed surface 28 arranged on the outer side in the radial direction of the input engaging portion 20. Each engaging member 17*b* is composed of identical parts made to have the same shape and the same size as each other.

Each engaging member 17*b* has cylindrical convex pressing surfaces 29 on the outer side surfaces of both side portions in the circumferential direction facing the pressed surface 28, or in other words, on the outer side surfaces in the radial direction of the pair of second portions 69. Moreover, each of the engaging members 17*b* has an output engaging surface 30 that is able to engage with the cam surface 27 arranged on the inner side surface in the radial direction of the intermediate portion in the circumferential direction facing the cam surface 27 of the output engaging portion 26, or in other words, on the inner side surface in the radial direction of the intermediate portion in the circumferential direction of the first portion 68. The output engaging surface 30 has a flat surface shape that is orthogonal to the separating direction (vertical direction in FIG. 6) of the pair of engaging members 17*b*. In addition, in a state in which the pair of engaging members 17*b* are arranged on the inner side in the radial direction of the pressed surface 28, the inner diameter dimension of the pressed surface 28 and the dimension in the radial direction of the engaging member 17*b* are regulated so that there is a gap in a portion between the pressed surface 28 and the pressing surfaces 29 or in a portion between the cam surface 27 and the output engaging surface 30.

Each of the engaging members 17*b* has an input engaging surface 32 that is capable of engaging with the input engaging portion 20 on the outer side surface in the radial direction of the intermediate portion in the circumferential direction facing the inner side surface in the radial direction of the input engaging portion 20, or in other words, the outer side surface in the radial direction of the first portion 68. The input engaging surface 32 has a flat surface shape parallel to the output engaging surface 30. There are gaps between the pressed surface 28 and the input engaging surfaces 32 in the circumferential direction and in the separating direction of the pair of engaging members 17*b*, respectively. Therefore, the input engaging portions 20 are able to move relative to the pair of engaging portions 17*b* in the rotation direction of the input member 14, and the engaging members 17*b* are able to move relative to the input engaging portions 20 in the separating direction of the pair of engaging members 17*b*.

Each of the pair of pressing surfaces 29 has a coefficient of friction larger than the coefficient of friction of the other parts of the respective engaging members 17*b*, and has a radius of curvature Cr' smaller than the radius of curvature Cr of the pressed surface 28 (Cr'<Cr).

As illustrated in FIG. 19, in the reverse input blocking clutch 5*d* of this example, when a rotational torque is inputted to the input member 14, the input engaging portions 20 rotate in the rotational direction of the input member 14 (clockwise in the example of FIG. 19). Then, the input engaging portions 20 press the input engaging surfaces 32 inward in the radial direction, and move the pair of engaging members 17*b* in directions away from the pressed surface 28. Due to the engagement between the input engaging surfaces 32 and the input engaging portions 20, each engaging member 17*b* moves toward the inside in the radial direction so as to move closer to each other in the separating direction (the engaging member 17*b* positioned on the upper side in FIG. 19 moves downward, and the engaging member 17*b* positioned on the lower side in FIG. 19 moves upward). As a result, the output engaging surfaces 30 of the pair of engaging members 17*b* hold the output engaging portion 26 from both sides in the radial direction and engage (surface contact) with the pair of cam surfaces 27 without looseness. As a result, the rotational torque inputted to the input member 14 is transmitted to the output member 15 via the pair of engaging members 17*b*, and is outputted from the output member 15.

As illustrated in FIG. 20, when rotational torque is reversely inputted to the output member 15, the output engaging portion 26 rotates in the rotational direction of the output member 15 (rotates clockwise in the example of FIG. 20). Then, corner portions of the output engaging portion 26 (end portions in the circumferential direction of the cam surfaces 27) press the output engaging surfaces 30 outward in the radial direction, and move the pair of engaging members 17*b* in directions toward the pressed surface 28. Due to the engagement between the output engaging surfaces 30 and the output engaging portion 26, each engaging member 17*b* moves toward the outside in the radial direction so as to separate from each other in the separating direction (the engaging member 17b positioned on the upper side in FIG. 20 moves upward, and the engaging member 17b positioned on the lower side in FIG. 20 moves downward). As a result, the pair of pressing surfaces 29 of each of the pair of engaging members 17b are pressed against the pressed surface 28 at two locations separated in the circumferential direction. Here, since the radius of curvature Cr' of the pressing surface 29 is smaller than the radius of curvature Cr of the pressed surface 28, each pressing surface 29 and the pressed surface 28 make line contact or point contact at one point. Therefore, each engaging member 17b having a pair of pressing surfaces 29 and the pressed surface 28 come into contact with each other at a total of two points. Due to this contact, the reverse input blocking clutch 5d of this example functions to prevent the rotational torque reversely inputted to the output member 15 from being transmitted to the input member 14, or only transmits a part of that rotational torque and blocks the remaining part.

Figure 21:
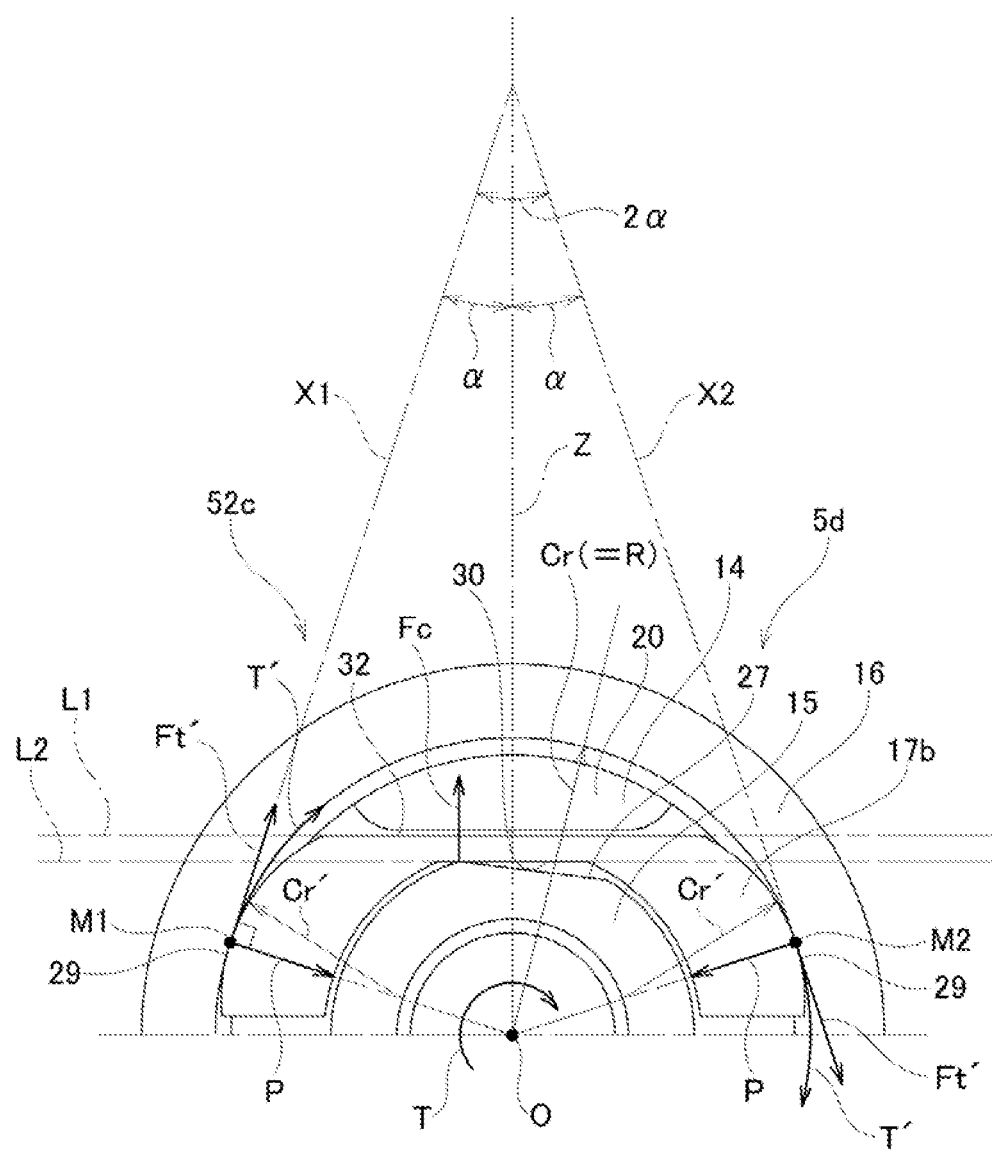
FIG. 21 relates to the reverse input blocking clutch according to the first example of an embodiment of the second aspect, and is for explaining a condition in which the output member is locked or half locked when rotational torque is reversely inputted to the output member.

In this example, as illustrated in FIG. 21, a normal force P corresponding to the normal force Fc acts on the contact portions M1 and M2 between the pressing surfaces 29 and the pressed surface 28, respectively. Here, the center of curvature of each pressing surface 29 exists on a virtual line that connects the center axis O of the pressed surface 28 (=the center axis of rotation of the input member 14 and the output member 15) and each of the contact portions M1 and M2 between pressed surfaces 29 and the pressed surface 28. Furthermore, presuming that the wedge angle between the tangent lines X1 and X2 at the contact portions M1 and M2 is 2α and the coefficient of friction between the pressing surfaces 29 and the pressed surface 28 is the normal force P acting on the contact portions M1 and M2 is expressed by the following Equation (10).

$$P = Fc/2(\sin \alpha + \mu' \cdot \cos \alpha) \qquad (10)$$

The tangential force Ft' acting on the contact portions M1 and M2 that generate the braking force on the engaging members 17b is represented by the following Equation (11).

$$Ft' = \mu' P \qquad (11)$$

Presuming that the distance from the center axis of rotation O of the output member 15 to the contact portions M1 and M2 between the pressing surfaces 29 and the pressed surface 28 is R (=Cr), the size of the brake torque T' acting on each engaging member 17b is expressed by the following Equation (12).

$$T' = 2R \cdot Ft' \qquad (12)$$

From Equations (10), (11), and (12) above, the magnitude of the brake torque T' is expressed by the Equation (13) using the coefficient of friction μ', the distance R, the normal force Fc, and the wedge angle α.

$$T' = \mu' R Fc/(\sin \alpha + \mu' \cdot \cos \alpha) \qquad (13)$$

Therefore, it can be seen that in order to obtain a larger brake torque T', the coefficient of friction μ', the distance R, and the normal force Fc should be increased. Furthermore, it can be seen that in order to increase the brake torque T' by utilizing the wedge effect, the wedge angle α should be made as small as possible. In other words, it can be seen that each of the contact portions M1, M2 should be brought as close as possible to the center axis of the pressed surface 28 in the direction of the bisector Z of the tangent lines X1 and X2 (the direction of the normal force Fc, the vertical direction in FIG. 21). In this example, in order to reduce the wedge angle α, the positions of the centers of curvature of each of the pressing surfaces 29 are regulated so that the contact portions M1 and M2 are positioned in the direction of the bisector Z on the side nearer to the center axis O of the pressed surface 28 than the input engaging surfaces 32 (side lower than the chain line L1 in FIG. 21), and on the side even nearer to the center axis O of the pressed surface 28 than the output engaging surfaces 30 (side lower than the chain line L2 in FIG. 21). Note that the input engaging surface 32 is a portion of the first portion 68 of each engaging member 17b that the input engaging portion 20 engages with when a rotational torque is inputted to the input member 14. Furthermore, the output engaging surface 30 is a portion of the first portion 68 of each engaging member 17b with which the output engaging portion 26 engages when a rotational torque is reversely inputted to the output member 15.

In order for the output member 15 to become locked, the transmission torque T and the brake torque T' must satisfy the relationship of Equation. (8): T<T' given in the first example of the first aspect. By substituting Equation (1): Ft=Fc·sin θ+μfc·cos θ, Equation (2): Ft=Ft/(sin θ+μ·cos θ), and Equation (3): T=r·Ft described in the first example of the first aspect, and Equations (10) to (13) described above into Equation (8), the following Equation (14) is obtained.

$$\mu' R/\{(\sin \theta + \mu \cdot \cos \theta)(\sin \alpha + \mu' \cdot \cos \alpha)\} > r \qquad (14)$$

From the Equation (14) above, it can be seen that when the coefficient of friction μ' between the pressing surfaces 29 and the pressed surface 28 is increased, the output member 15 may be locked even when the distance R is decreased.

In addition, presuming that the coefficient of friction μ and the coefficient of friction μ' are both 0.1, the Equation (15) below may be obtained from the Equation (14) above.

$$R > 10r(\sin \theta + 0.1 \cos \theta)(\sin \alpha + 0.1 \cos \alpha) \qquad (15)$$

Based on Equation (15) above, the output member 15 may be locked by appropriately setting the distance r from the center axis of rotation O of the output member 15 to the contact portion X, the distance R from the center axis of rotation O of the output member 15 to the contact portions M1 and M2, the wedge angle θ, and the wedge angle α.

On the other hand, in order to semi-lock the output member 15 so that only a part of the rotational torque reversely inputted to the output member 15 is transmitted to the input member 14 and the remaining part is blocked, the transmission torque T and the brake torque T' must satisfy the relationship of Equation (8): T>T' described in the first example of the first aspect.

As is clear from the Equation (15) above, by appropriately setting the coefficient of friction μ between the output engaging portion 26 and the output engaging surface 30, the coefficient of friction μ' between the pressing surfaces 29 and the pressed surface 28, the distance r from the center axis of rotation O to the contact portion X, the distance R from the center axis of rotation O to the contact portions M1, M2, and the wedge angle θ between the direction of the action line of the tangential force Ft and the output engaging surfaces 30, the output member 15 may be semi-locked.

In the reverse input blocking clutch 5d of this example, as indicated in Equation (13) above, the size of the brake torque T' is proportional to the distance R from the center axis of rotation O of the output member 15 to the contact portions M1 and M2 between the pressing surfaces 29 and the pressed surface 28. Moreover, from Equation (13) above, it can be seen that in order to increase the brake torque T', the wedge angle α should be made as small as possible, or in other words, the contact portions M1 and M2 between the pressed surface 28 and the engaging member 17 should be as close to the center axis O of the pressed surface 28 as possible with respect to the direction of the bisector Z (vertical direction in FIG. 21). In this example, the contact portions M1 and M2 are positioned closer to the center axis O of the pressed surface 28 than the input engaging surfaces 32 in the direction of the bisector Z (side lower than the chain line L1 in FIG. 21), and further, is positioned on the side closer to the center axis O of the pressed surface 28 than the output engaging surfaces 30 (side lower than the chain line L2 in FIG. 21). By adopting such a configuration, it is easy to make the wedge angle $\alpha$ sufficiently small, and to obtain a large brake torque T'.

Figure 22:
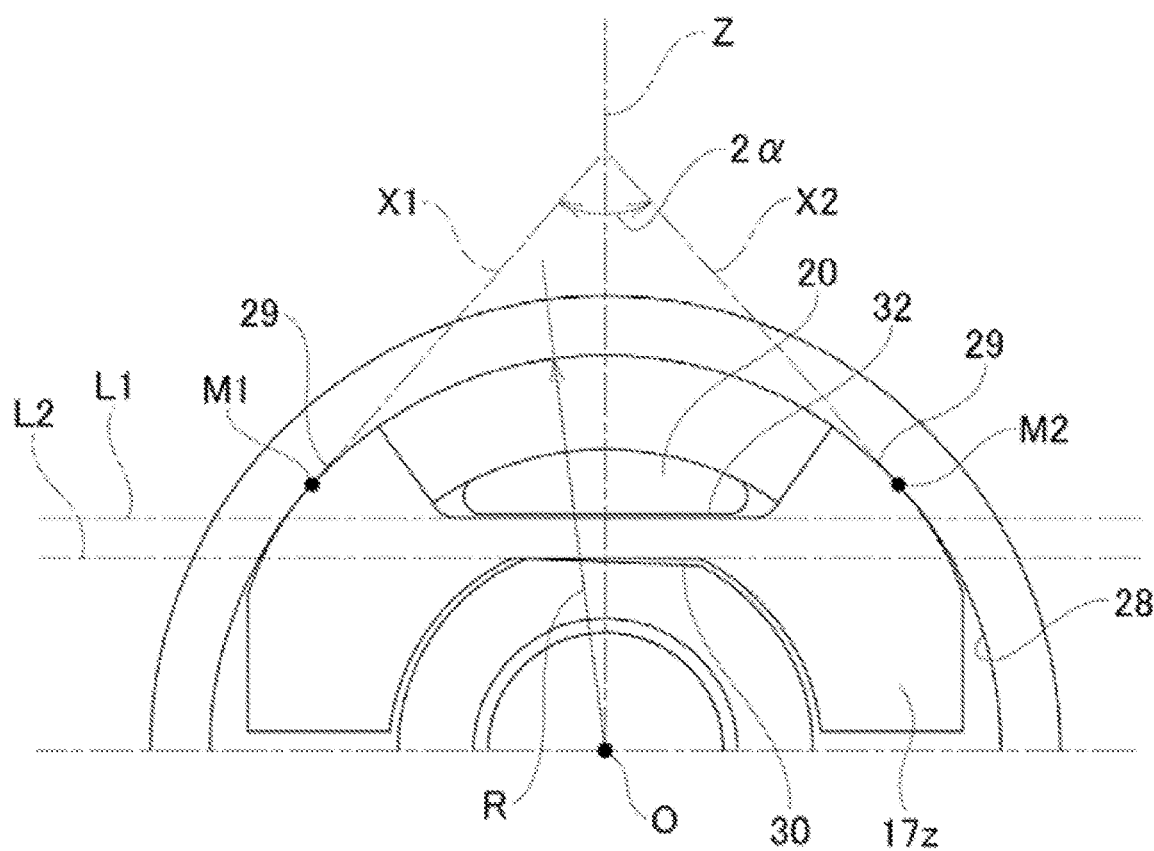
FIG. 22 relates to the structure of a reference example for explaining the action and effect of the first example of an embodiment of the second aspect, and corresponds to FIG. 21.
Figure 23:
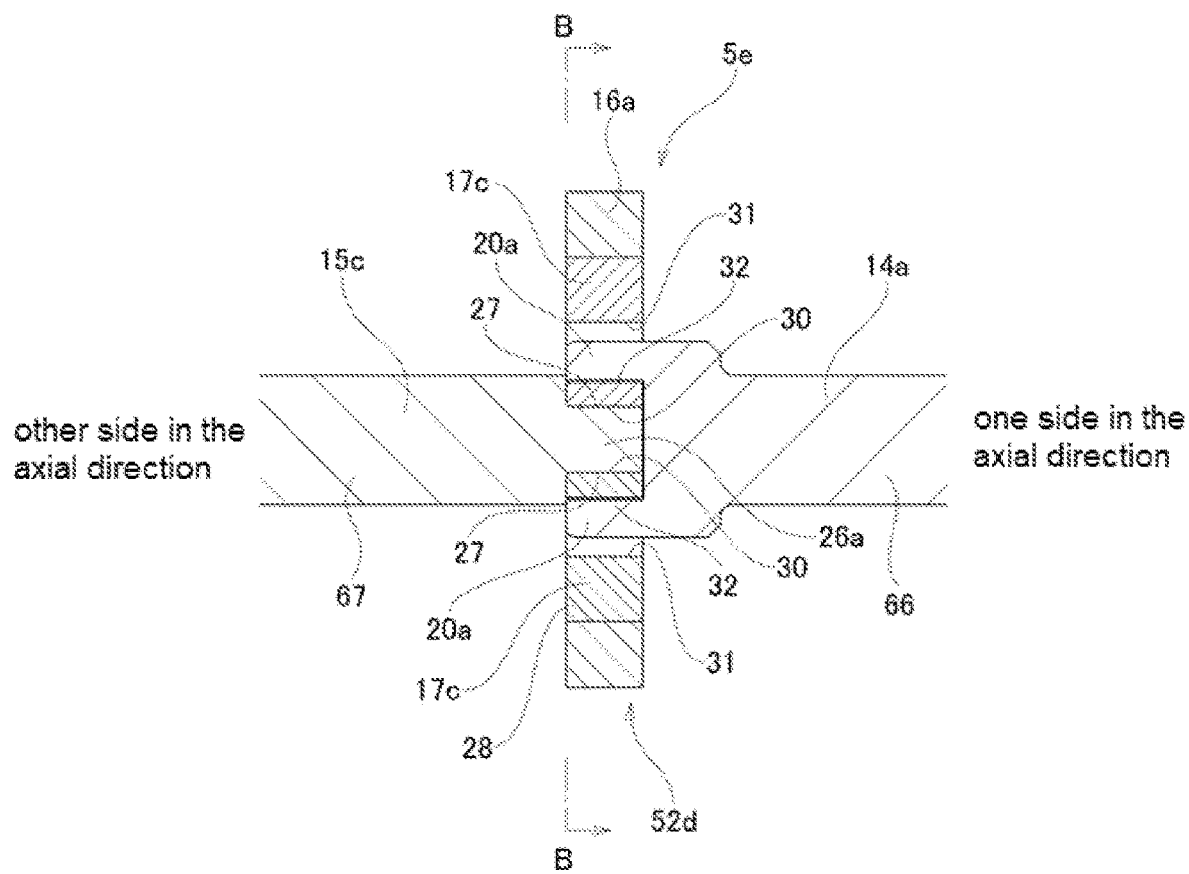
FIG. 23 is a cross-sectional view of a reverse input blocking clutch according to a second example of an embodiment of the second aspect.
Figure 24:
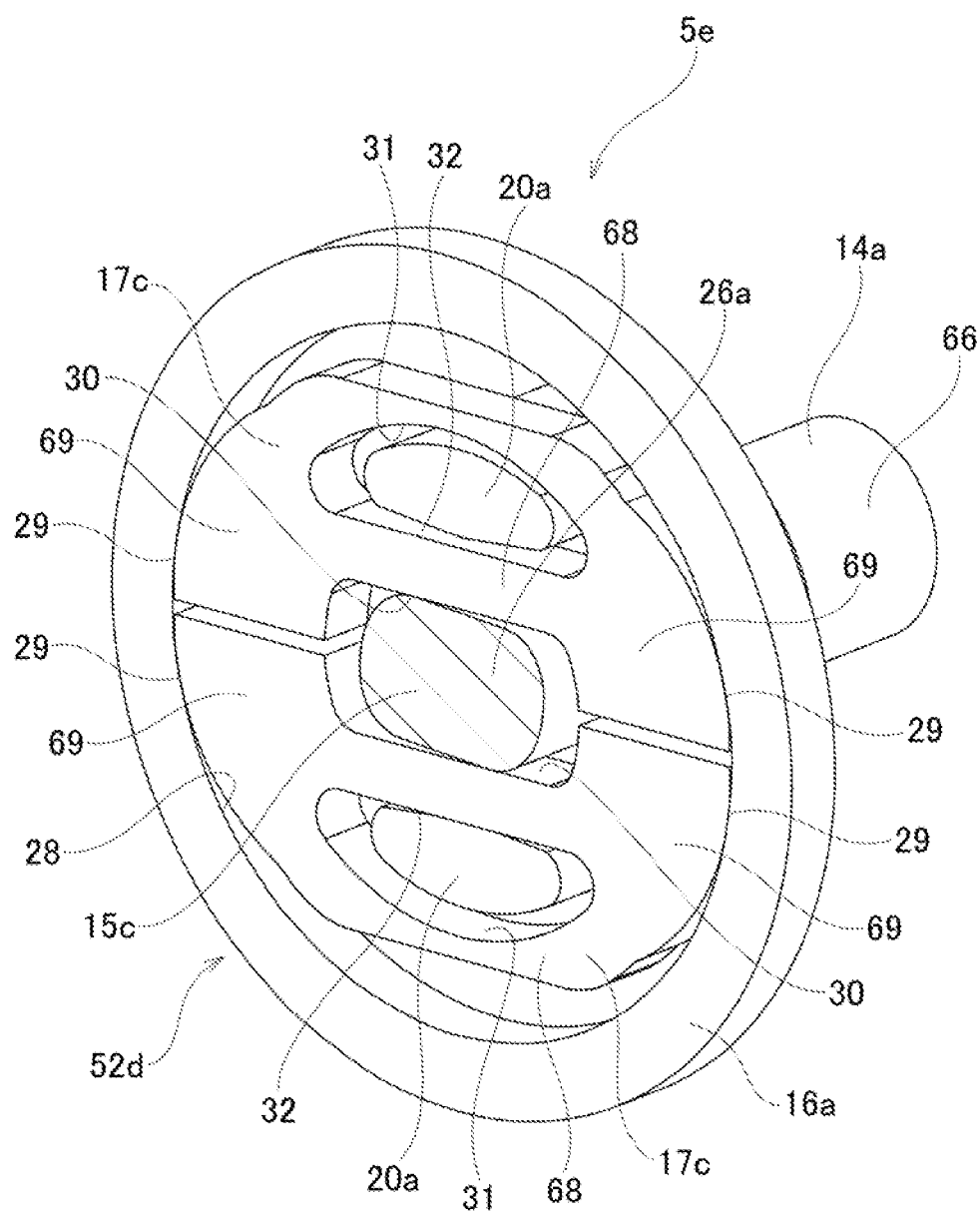
FIG. 24 is a perspective view of the reverse input blocking clutch according to the second example of an embodiment of the second aspect.

In the structure of this example, when compared for example, with the structure of a reference example as illustrated in FIG. 22 where the contact portions M1 and M2 are located on the side farther from the input engaging surfaces 32 with respect to the center axis O (side above the chain line L1 in FIG. 22) in the direction of the bisector Z, the distance R required to obtain the brake torque T' of a specified size may be reduced, or in other words, the diameter dimension of the locking mechanism 52c may be reduced. In addition, in the structure of this example, as long as the distance R is the same as that of the reference example, a brake torque T' larger than that of the reference example may be obtained, and as a result, it is possible to increase the safety factor against slipping of the pressed surface 28 and the pressing surfaces 29 as compared with the structure of the reference example.

In this example, neither engaging member 17b of the pair of engaging members 17b of the reverse input blocking clutch 5d has a portion on the inner side in the radial direction of the pressed surface 28 that is arranged on the outer side in the radial direction of the input engaging portions 20. Therefore, it is easy to reduce the weight and facilitate manufacturing when compared with a case in which the engaging member 17z has a portion on the inner side in the radial direction of the pressed surface 28 arranged on the outer side in the radial direction of the input engaging portions 20 as in the reference structure illustrated in FIG. 22.

In this example, the contact portions M1 and M2 are positioned on the side closer to the center axis O of the pressed surface 28 than the output engaging surfaces 30 in the direction of the bisector Z (side lower than the chain line L2 in FIG. 21). However, in a case of implementing the present invention, the contact portions M1, M2 may me positioned on the side nearer to the center axis O of the pressed surface 28 than the input engaging surfaces 32 in the direction of the bisector Z (side lower than the chain line L1 in FIG. 21), and on the side farther from the center axis O of the pressed surface 28 than the output engaging surfaces 30 (side higher than the chain line L2 in FIG. 21), or at a position that is the same position as that of the output engaging surfaces 30 (on the chain line L2 in FIG. 21). Such a configuration is also included in the scope of the present invention.

In this example, the pressing surfaces 29 of each engaging member 17b have a cylindrical convex shape. However, in a case of implementing the present invention, the pressing surfaces of the engaging members may be formed of a non-cylindrical convex surface such as an elliptical cylinder convex surface or the like.

Other configurations and operations are the same as in the first example of an embodiment of the first aspect.

In addition to the actuator, the reverse input blocking clutch of this second aspect may be applied to various mechanical devices such as a variable compression ratio device, an electric door device, a power window device, a steering apparatus, a jack, and the like. The number of engaging members of the reverse input blocking clutch of the second aspect is not limited to two, and may be one or three or more.

Second Example of Embodiment of Second Aspect

A second example of an embodiment of the second aspect of the present invention will be described with reference to FIGS. 23 to 29.

This example is an example of a reverse input blocking clutch 5e that can be incorporated and used in various mechanical devices. In the reverse input blocking clutch 5e of this example, the basic structure and basic operation of the locking mechanism 52d are the same as those of the first example of the second embodiment; however, the specific structures of the input member 14a, the output member 15c, the pressed member 16a, and the pair of engaging members 17c are different from those of the first example of an embodiment of the second aspect.

The input member 14a and the output member 15c each have a solid axial shape, and are coaxially arranged in series and with each other in the axial direction.

The input member 14a is arranged on one side in the axial direction with respect to the output member 15c, and has an input shaft portion 66 in addition to a pair of input engaging portions 20a constituting the locking mechanism 52d. The input shaft portion 66 has a stepped columnar shape and has a center axis of rotation that is coaxial with the center axis of rotation of the pressed surface 28 of the locking mechanism 52d. The pair of input engaging portions 20a extend in the axial direction from two locations on opposite sides in the radial direction of the end surface on the other side in the axial direction of the input shaft portion 66. In this example, the inner surface in the radial direction of the input engaging portion 20a is formed by a chevron-shaped convex surface that is inclined in a direction inward in the radial direction from both sides in the circumferential direction while going toward the center side in the circumferential direction. The input shaft portion 66 is connected to the output portion of the input side mechanism constituting various mechanical devices so that torque can be transmitted by an arbitrary means.

The output member 15c has an output shaft portion 67 in addition to the output engaging portion 26a of the locking mechanism 52d. The output shaft portion 67 has a columnar shape and has a center axis of rotation that is coaxial with the center axis of rotation O of the pressed surface 28. The output engaging portion 26a has an elliptical columnar shape and extends axially from the central portion of the end surface on one side in the axial direction of the output shaft portion 67. The output shaft portion 67 is connected to the input portion of the output side mechanism constituting various mechanical devices so that torque may be transmitted by an arbitrary means.

The pressed member 16a has an annular shape as a whole and has a pressed surface 28 on the inner circumferential surface; however, has a rectangular cross-sectional shape. The pressed member 16a is fixed by an arbitrary means to a housing or the like constituting various mechanical devices.

Figure 25:
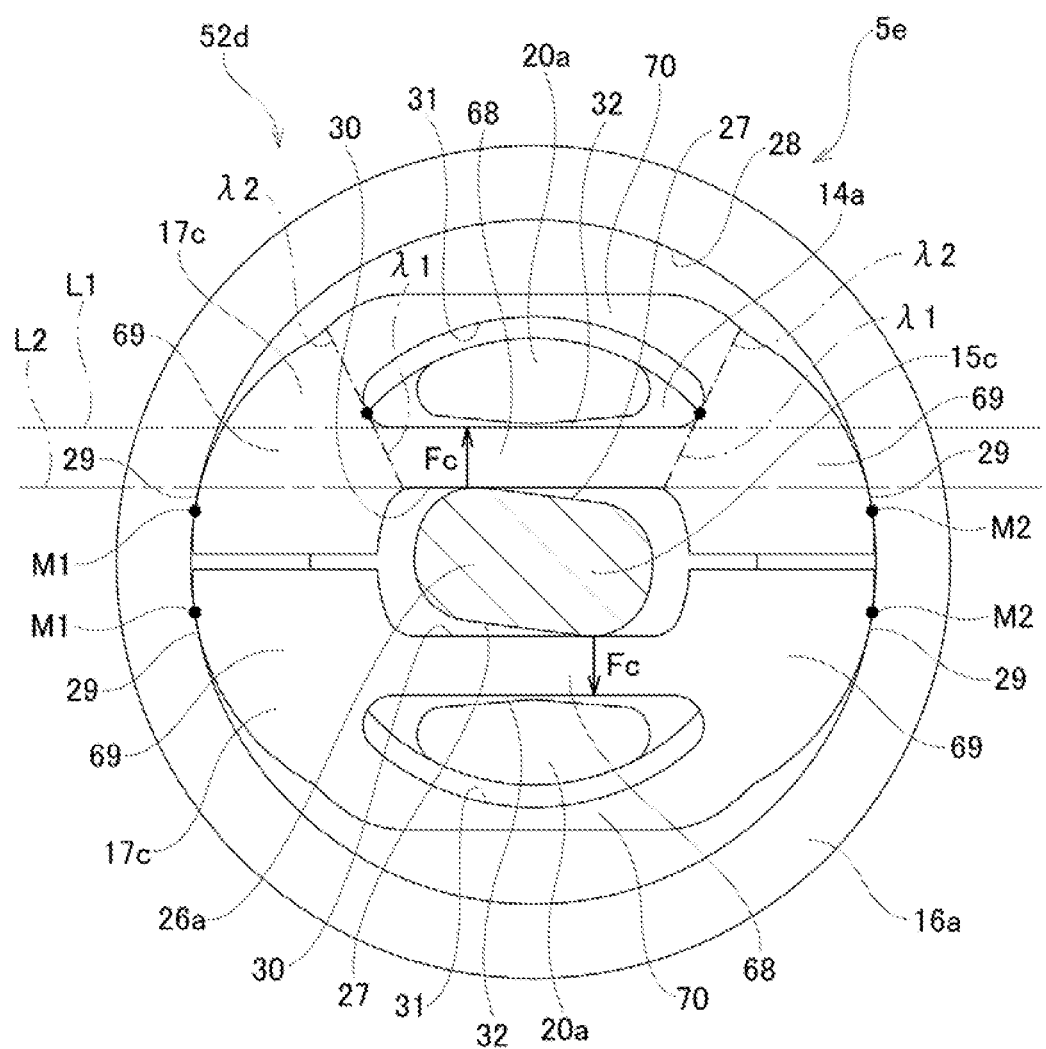
FIG. 25 is a cross-sectional view taken along the line B-B of FIG. 23.
Figure 26:
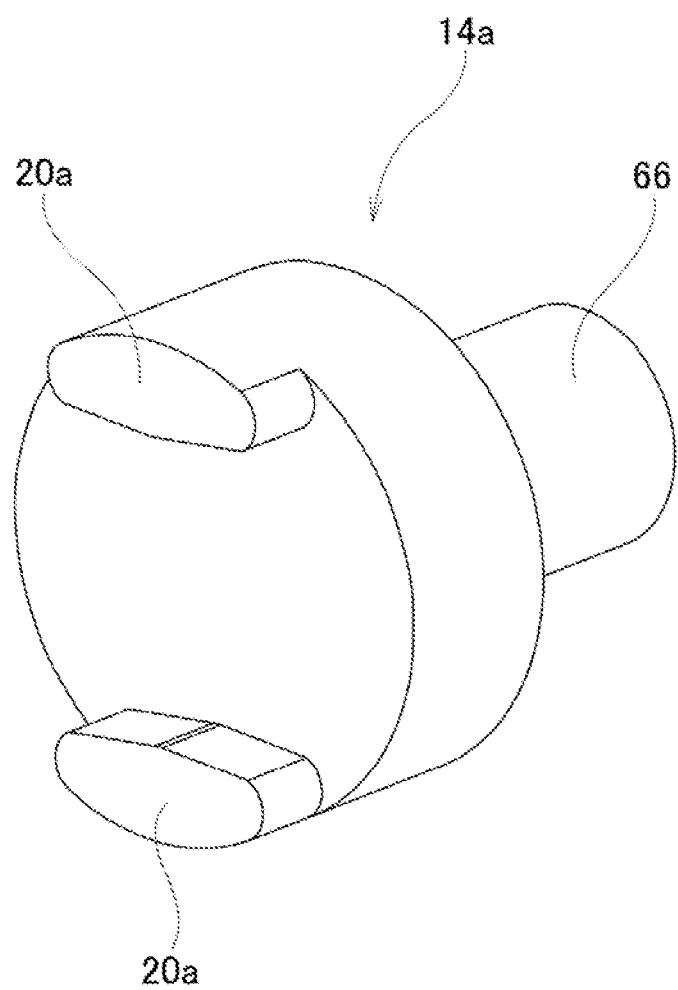
FIG. 26 is a perspective view illustrating a removed input member of the reverse input blocking clutch according to the second example of an embodiment of the second aspect.
Figure 27:
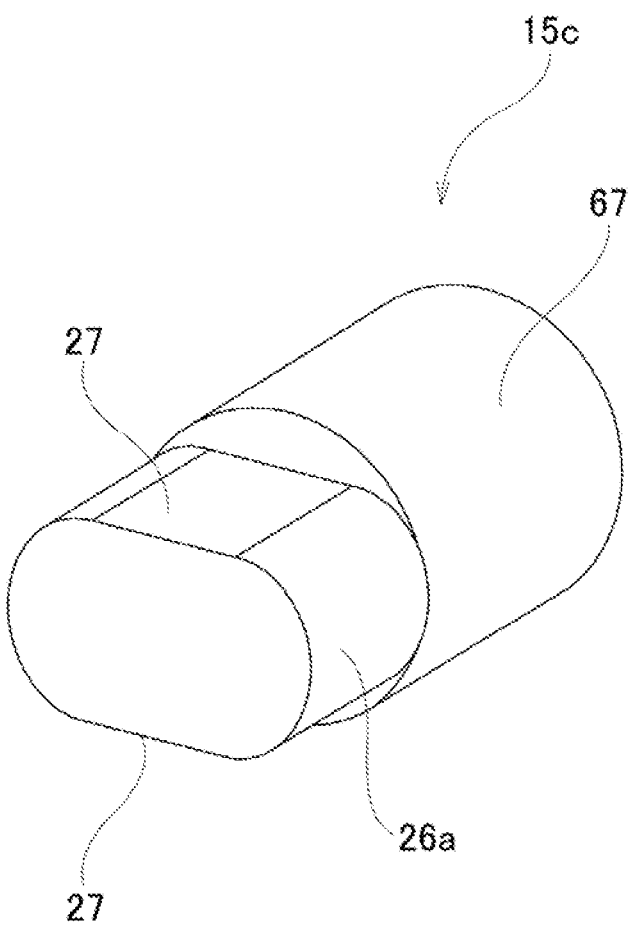
FIG. 27 is a perspective view illustrating a removed output member of the reverse input blocking clutch according to the second example of an embodiment of the second aspect.
Figure 28:
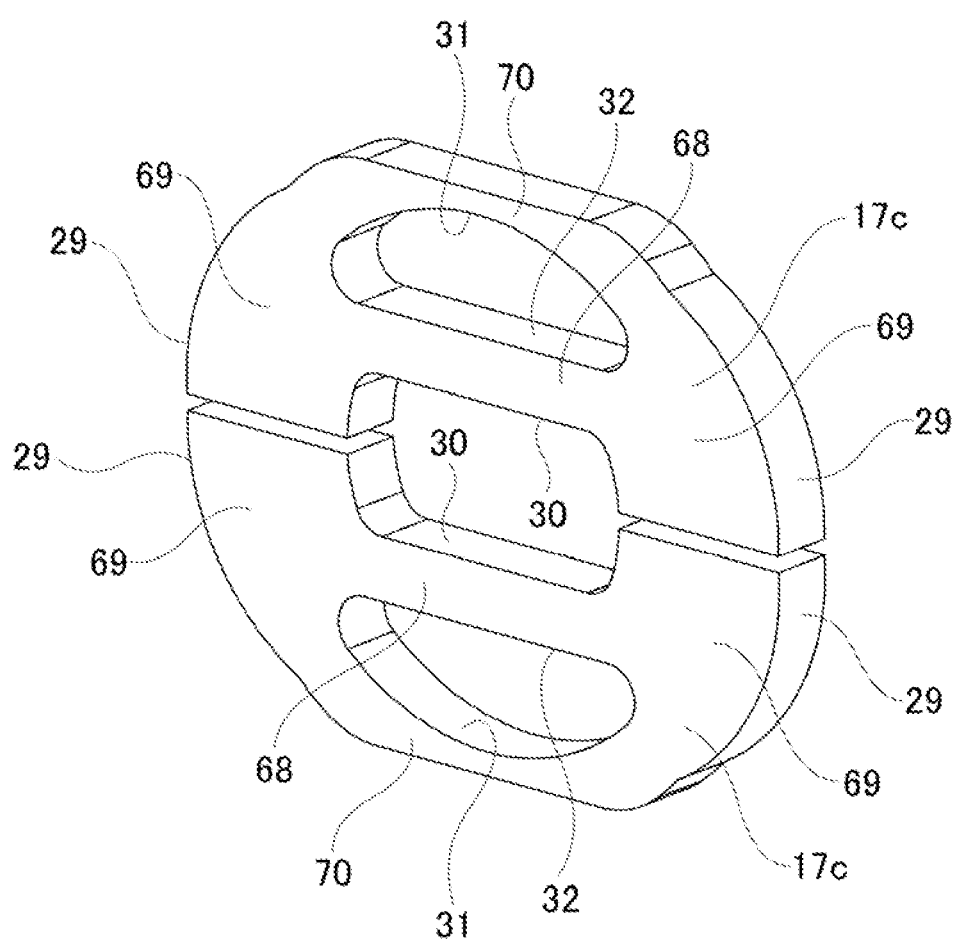
FIG. 28 is a perspective view illustrating a removed pair of engaging members of the reverse input blocking clutch according to the second example of an embodiment of the second aspect.
Figure 29:
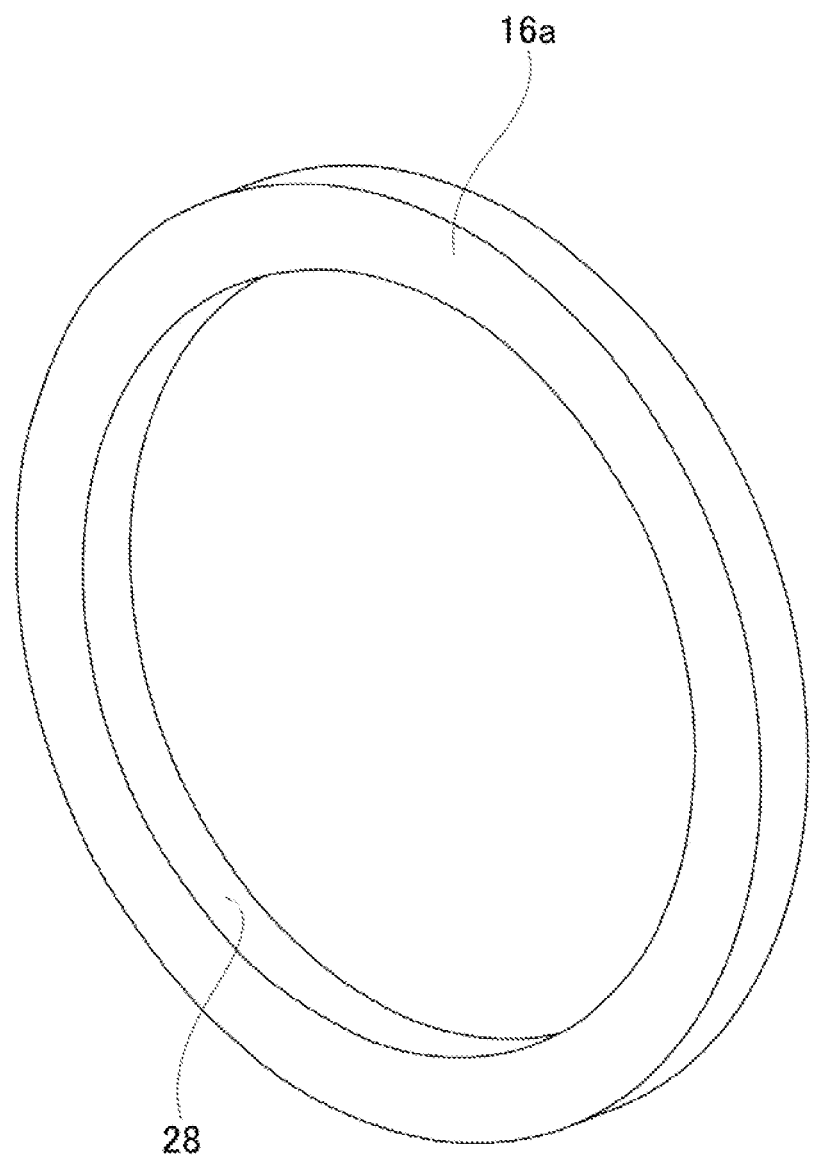
FIG. 29 is a perspective view illustrating a removed pressed member of the reverse input blocking clutch according to the second example of an embodiment of the second aspect.
Figure 30:
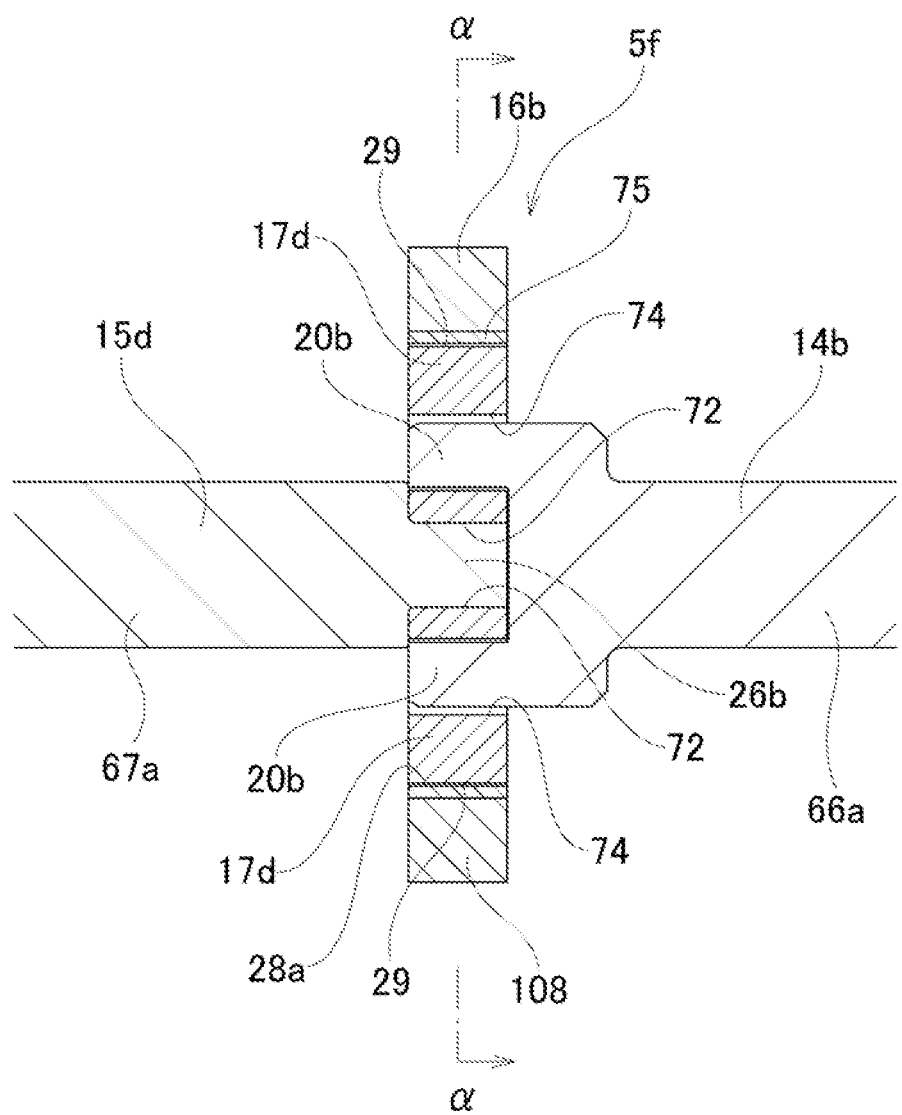
FIG. 30 is a cross-sectional view of a reverse input blocking clutch of a first example of an embodiment of a third aspect of the present invention.
Figure 31:
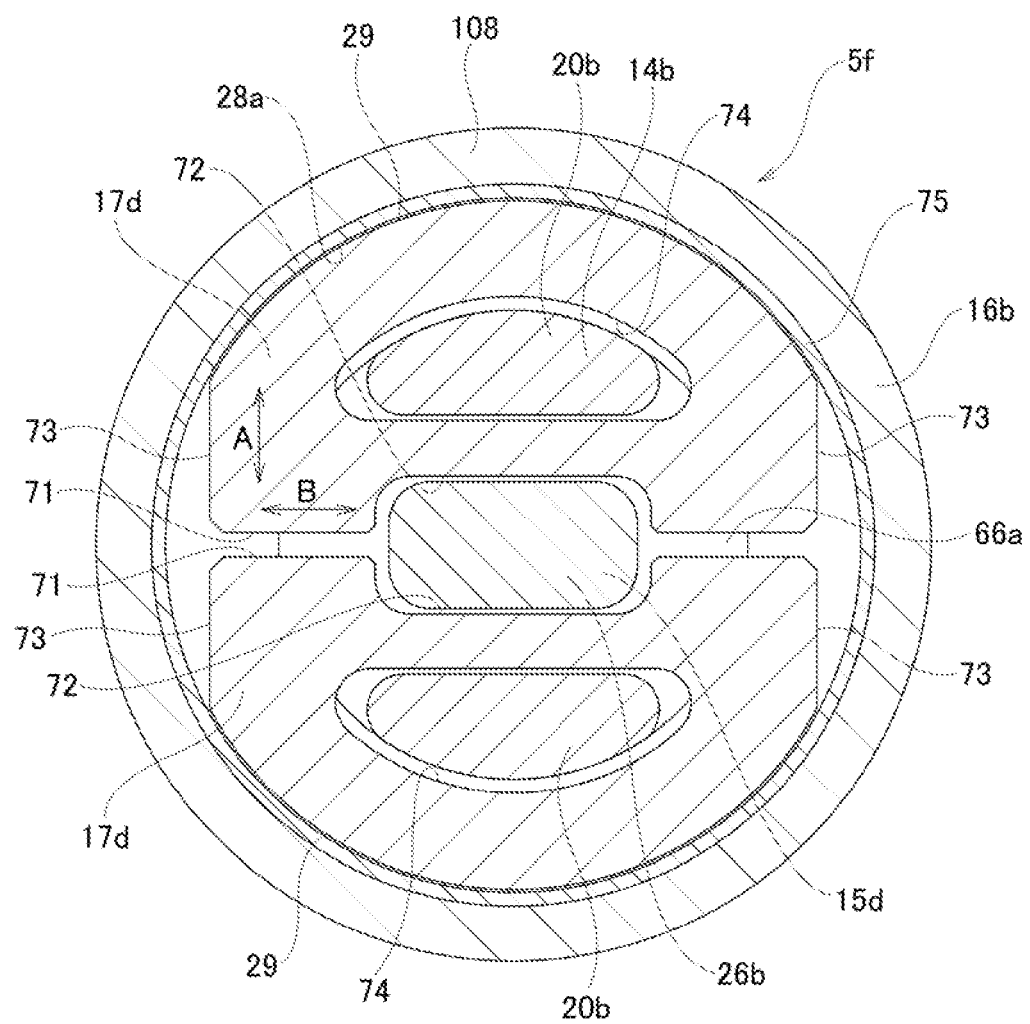
FIG. 31 is a cross-sectional view taken along line a-a of FIG. 30.
Figure 32:
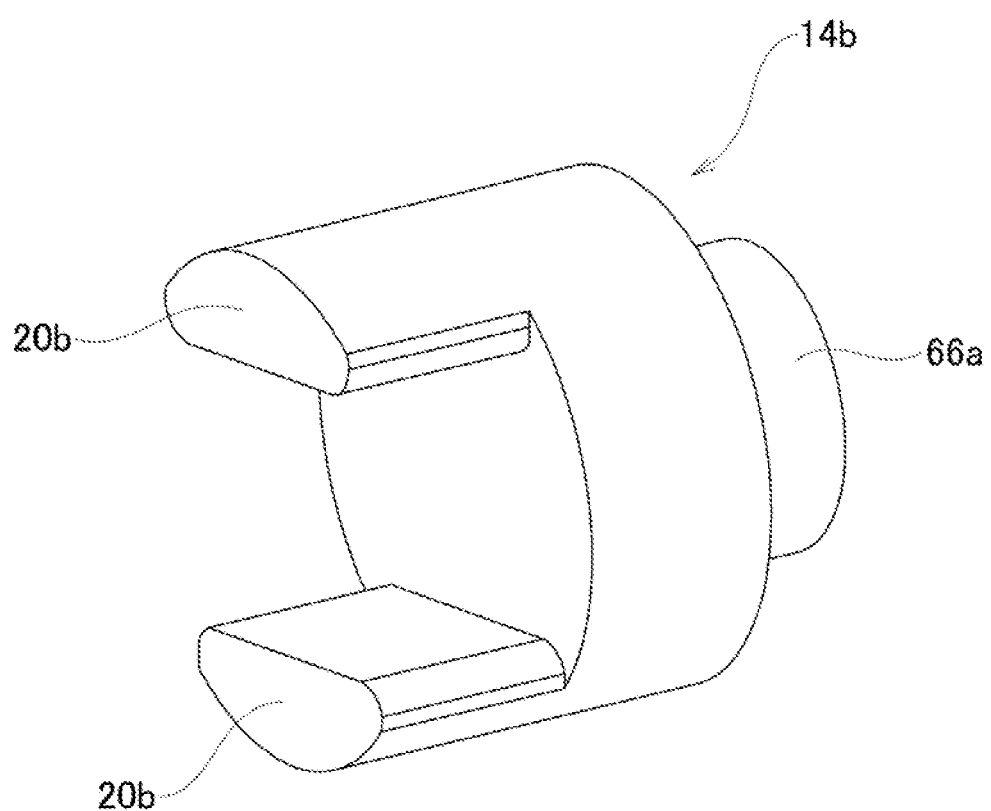
FIG. 32 is a perspective view illustrating a part of an input member of the reverse input blocking clutch of the first example of an embodiment of the third aspect.
Figure 33:
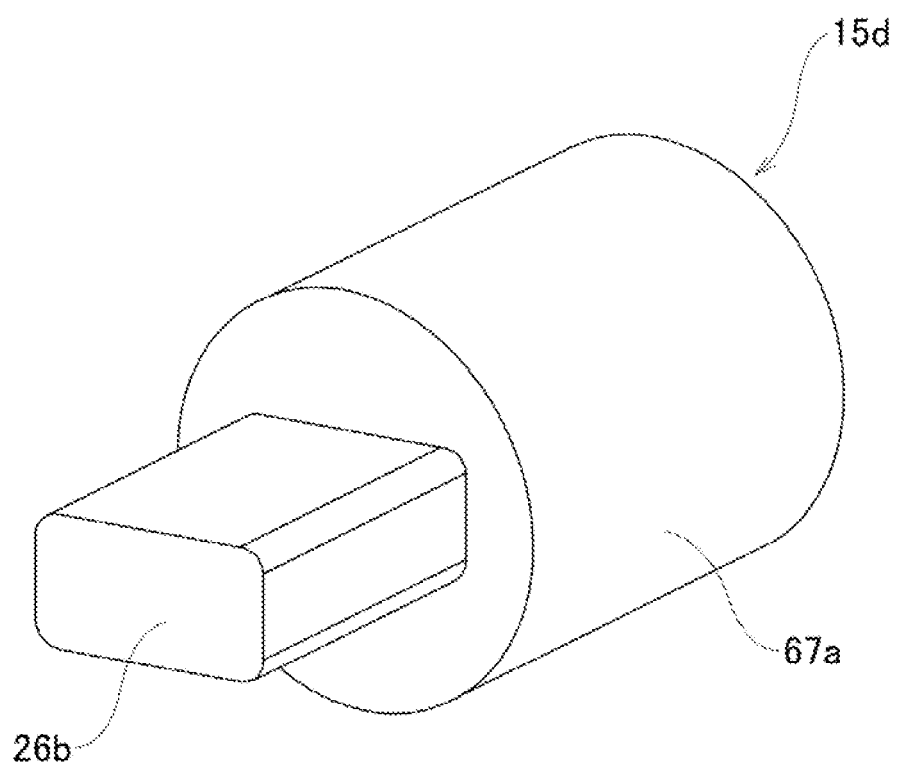
FIG. 33 is a perspective view illustrating a part of an output member of the reverse input blocking clutch of the first example of an embodiment of the third aspect.

Each engaging member 17c of the pair of engaging members 17c of the locking mechanism 52d has a third portion 70 that is a portion arranged on the outer side in the radial direction of the input engaging portion 20a in addition to the first portion 68 and the pair of the second portions 69. The third portion 70 connects the pair of second portions 69 to each other on the outer side in the radial direction of the input engaging portion 20a. In FIG. 25, the chain lines λ1 are virtual lines indicating the boundaries between the first portion 68 and the second portions 69, and the chain lines λ2 are virtual lines indicating the boundaries between the second portions 69 and the third portion 70. Each engaging member 17c has an input engaging hole 31 in an intermediate portion in the radial direction of an intermediate portion in the circumferential direction, or in other words, a portion located between the first portion 68 and the third portion 70. The input engaging hole 31 is a substantially rectangular through hole in the axial direction extending in a direction (left-right direction in FIG. 24) orthogonal to each of the separating direction and the axial direction of the pair of engaging members 17c, and the input engaging portion 20a is loosely inserted through the inner side thereof. In other words, there are gaps between the inner surface of the input engaging hole 31 and the input engaging portion 20a in the circumferential direction and in the separating direction between the pair of engaging members 17c. Therefore, the input engaging portions 20a are able to move relative to the engaging members 17c in the rotation direction of the input member 14a, and the engaging members 17c are able to move relative to the input engaging portions 20a in the separating direction between the pair of engaging members 17c. In this example, each of the engaging members 17c is provided with the third portion 70 on the outer side in the radial direction of the input engaging portions 20a that connects the pair of second portions 69, so it is easy to maintain rigidity. The other configurations and operations are the same as those of the first example of an embodiment of the first aspect and the first example of an embodiment of the second aspect.

First Example of Embodiment of Third Aspect

A first example of an embodiment of a third aspect of the present invention will be described with reference to FIGS. 30 to 37.

The reverse input blocking clutch 5f of this first example of an embodiment of the third aspect includes:

a pressed member 16b having a pressed surface 28a;

an input member 14b having a center axis of rotation O and at least one input engaging portion 20b;

an output member 15d having a center axis of rotation O that is coaxial with the center axis of rotation O of the input member 14b and an output engaging portion 26b; and at least one engaging member 17d having at least one pressing surface 29 that faces the pressed surface 28a, an engaging member side input engaging portion 74 that engages with the input engaging portion 20b, and an engaging member side output engaging portion 72 that engages with the output engaging portion 26b.

The reverse input blocking clutch 5f of this first example of an embodiment of the third aspect is configured so that when a rotational torque is inputted to the input member 14b, the engaging members 17d displace so as to cause the pressing surfaces 29 to separate from the pressed surface 28a due to the engagement between the input engaging portions 20b and the engaging member side input engaging portions 74, and by the engaging member side output engaging portions 72 engaging with the output engaging portion 26b, transmits the rotational torque that is inputted to the input member 14b to the output member 15d; and when a rotational torque is reversely inputted to the output member 15d, the engaging members 17d displace so as to press the pressed surfaces 29 against the pressed surface 28a due to the engagement between the output engaging portion 26b and the engaging member side output engaging portions 72, causing friction engagement between the pressing surfaces 29 and the pressed surface 28a.

In particular, in the reverse input blocking clutch 5f of this first example of an embodiment of the third aspect, an intermediate member is arranged at least in one of the portion between the engaging member 17d and the pressed member 16b, the portion between the input engaging portion 20b and the engaging member side input engaging portion 74, and the portion between the output engaging portion 26b and the engaging member side output engaging portion 72.

In the reverse input blocking clutch 5f of the first example of an embodiment of this third aspect, a gap adjusting member 75 is used as the intermediate member. Hereinafter, the reverse input blocking clutch 5f of this first example of an embodiment of the third aspect will be described in more detail.

The reverse input blocking clutch 5f of this example is a lock type reverse input blocking clutch, and includes an input member 14b, an output member 15d, a pressed member 16b, and a pair of engaging members 17d.

The input member 14b is connected to an input side mechanism such as an electric motor or the like, and rotational torque is inputted thereto. The input member 14b includes a center axis of rotation O and a pair of input engaging portions 20b arranged at positions separated in the radial direction from the center axis of rotation O. In this example, the input member 14b includes an input shaft portion 66a having a stepped columnar shape, and a pair of input engaging portions 20b that are formed so as to protrude in the axial direction from positions at two locations on opposite sides in the radial direction of the tip end surface of the large diameter portion of the input shaft portion 66a. The small diameter portion of the input shaft portion 66a is connected to the output portion of the input side mechanism so as to be able to transmit torque, or is formed integrally with the output portion of the input side mechanism. The pair of input engaging portions 20b have a substantially elliptical columnar shape and are separated from each other in the radial direction of the input member 14b. Each input engaging portion 20b has an outer side surface in the radial direction existing on the same cylindrical surface as the outer circumferential surface of the large diameter portion of the input shaft portion 66a, and an inner side surface in the radial direction that is a flat surface orthogonal to the separating direction of the pair of input engaging portions 20b.

The output member 15d is connected to an output side mechanism such as a reduction mechanism or the like and outputs rotational torque. The output member 15d includes a center axis of rotation O that is coaxial with the center axis of rotation O of the input member 14b, and an output engaging portion 26b that is arranged on the center axis of rotation O. In this example, the output member 15d includes an output shaft portion 67a having a cylindrical shape, and an output engaging portion 26b formed so as to protrude in the axial direction from the central portion of the tip end surface of the output shaft portion 67a. The base end portion of the output shaft portion 67a is connected to the input portion of the output side mechanism so as to be able to transmit torque, or is formed integrally with the input portion of the output side mechanism. The output engaging portion 26b has a cam function. In other words, the distance from the center axis of rotation O of the output member 15d to the outer circumferential surface of the output engaging portion 26b is not constant in the circumferential direction. In this example, the output engaging portion 26b has a substantially rectangular column shape. More specifically, the outer circumferential surface of the output engaging portion 26b is composed of a pair of first flat surfaces parallel to each other in the longitudinal direction (horizontal direction in FIG. 31), a pair of second flat surfaces parallel to each other in the lateral direction (vertical direction in FIG. 31), partial cylindrical surfaces connecting the first flat surfaces and the second flat surfaces. The output engaging portion 26b is arranged between the inner surfaces in the radial direction of the pair of input engaging portions 20b.

Figure 34:
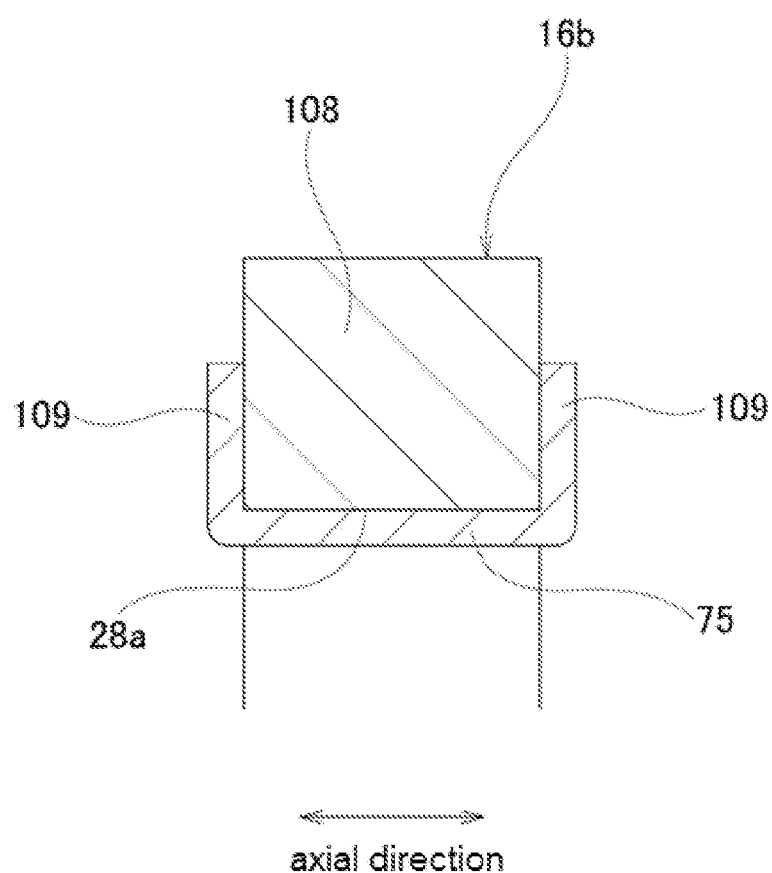
FIG. 34 is a partial cross-sectional view illustrating an example of a fixing method for fixing a gap adjusting member with respect to a pressed member in the reverse input blocking clutch of the first example of an embodiment of the third aspect.

The pressed member 16b is fixed to another member (not illustrated) such as a housing or the like, and its rotation is restricted. The pressed member 16b has a center axis of rotation O that is coaxial with the center axis of rotation O of the input member 14b, and has a pressed surface 28a that is a cylindrical concave surface on the inner circumferential surface centered on the center axis. In this example, the pressed member 16b is configured by combining the pressed member main body 108 and the gap adjusting member 75. The pressed member main body 108 is formed in an annular shape and has an inner circumferential surface that is a cylindrical concave surface. The gap adjusting member 75 is made of a metal plate such as a steel plate or the like, and has a short cylindrical shape, and has a pressed surface 28a on the inner circumferential surface. The gap adjusting member 75 is fixed to the pressed member main body 108 in a state of being internally fitted to the inner circumferential surface of the pressed member main body 108 without any looseness in the radial direction. More specifically, in this example, the gap adjusting member 75 is fixed to the pressed member main body 108 by adhering the outer circumferential surface thereof to the inner circumferential surface of the pressed member main body 108 with an adhesive. Note that the method of fixing the gap adjusting member 75 to the pressed member main body 108 is not limited to adhesion, and for example, welding, press-fitting, screwing, riveting, or any other means such as the fixing means as illustrated in FIG. 34 or the like may be used. In the fixing means illustrated in FIG. 34, a pair of bent pieces 109 bent outward in the radial direction are formed from both side portions in the axial direction of the gap adjusting member 75, and the pressed member main body 108 is located between and fixed from both sides in the axial direction by the pair of bent pieces 109. Moreover, in a case where the gap adjusting member 75 includes a fixing portion such as the pair of bent pieces 109 or the like, the fixing portion may be adhered, welded, screwed, or riveted to the pressed member main body 108. The pressed member 16b is arranged further on the outer side in the radial direction than the input member 14b and the output member 15d. More specifically, in the assembled state of the reverse input blocking clutch 5f, the pair of input engaging portions 20b and the output engaging portion 26b are arranged on the inner side in the radial direction of the pressed member 16b.

Each of the engaging members 17d constituting the pair of engaging members 17d includes pressing surfaces 29 facing the pressed surface 28a, an engaging member side input engaging portion 74 that engages with the input engaging portion 20b, and an engaging member side output engaging portion 72 that engages with the output engaging portion 26b. In this example, each engaging member 17d has a substantially semicircular plate shape and is arranged on the inner side in the radial direction of the pressed member 16b. Each of the engaging members 17d has pressing surfaces 29 on the outer side surface in the radial direction of the outer circumferential surface thereof, and has a flat bottom surface 71 and an engaging member side output engaging portion 72 on the inner side surface in the radial direction of the outer circumferential surface thereof. Each engaging member 17d has side surfaces 73 that are configured by a flat surface orthogonal to the bottom surface 71, at portions of the outer circumferential surface that connects both end portions in the circumferential direction of the pressing surface 29 and both end portions of the bottom surface 71. Note that the radial direction with respect to the engaging member 17d is a direction perpendicular to the bottom surface 71 indicated by the arrow A in FIG. 31. Furthermore, the width direction with respect to the engaging member 17d is a direction parallel to the bottom surface 71 indicated by the arrow B in FIG. 31. The pressing surface 29 is a partially cylindrical convex surface and has a radius of curvature equal to or less than the radius of curvature of the pressed surface 28a.

In this example, the pressing surfaces 29 of the pair of engaging members 17d are directed to opposite sides in the radial direction, and the bottom surfaces 71 of the pair of engaging members 17d face each other. In a state in which the pair of engaging members 17d is arranged on the inner side in the radial direction of the pressed member 16b, the inner diameter of the pressed member 16b and the radial dimension of each engaging member 17d are regulated so that there is a gap in at least one of the portion between the pressed surface 28a and the pressing surfaces 29 and the portion between the bottom surfaces 71.

Each engaging member 17d has an engaging member side input engaging portion 74 that is a substantially rectangular elongated hole that penetrates in the axial direction through the intermediate portion in the radial direction and extends in the width direction. Of the inner surface of the engaging member side input engaging portion 74, the portion located on the inner side in the radial direction is a flat surface orthogonal to the radial direction. The engaging member side input engaging portion 74 has a size that allows the input engaging portion 20b of the input member 14b to be loosely inserted. More specifically, when the input engaging portion 20b is inserted into the inner side the engaging member side input engaging portion 74, there is a gap in the width direction of the engaging member 17d and a gap in the radial direction of the engaging member 17d between the input engaging portion 20b and the inner surface of the engaging member side input engaging portion 74. Therefore, the input engaging portion 20b is engaged with the inner side of the engaging member side input engaging portion 74, so as to enables the engaging member 17d to move (displace) in the far-near direction with respect to the pressed surface 28a, and enables relative movement of the input member 14b in the rotation direction.

Each engaging member 17d has an engaging member side output engaging portion 72 that is a substantially rectangular recess portion formed so as to be recessed outward in the radial direction of the engaging member 17d from the central portion in the width direction of the bottom surface 71. The engaging member side output engaging portion 72 has a size and shape that allows a half portion in the lateral direction of the output engaging portion 26b of the output member 15d to be loosely arranged on the inner side of the engaging member side output engaging portion 72. More specifically, the engaging member side output engaging portion 72 has an opening width slightly larger than the dimension in the longitudinal direction of the output engaging portion 26b, and has a depth in the radial direction that is slightly smaller than ½ of the dimension in the lateral direction of the output engaging portion 26b. The bottom portion of the engaging member side output engaging portion 72 is a flat surface orthogonal to the radial direction.

In the assembled state of the reverse input blocking clutch 5f of this example, the pair of input engaging portions 20b of the input member 14b are inserted in the axial direction through the engaging member side input engaging portions 74 of the pair of engaging member 17d, and the output engaging portion 26b of the output member 15d arranged on the other side in the axial direction is inserted in the axial direction between the pair of engaging member side output engaging portions 72. In other words, the pair of engaging members 17d are arranged so that the respective engaging member side output engaging portions 72 are located on both of the outer sides in the radial direction of the output engaging portion 26b. In this example, the dimension in the axial direction of the input engaging portions 20b, the dimension in the axial direction of the output engaging portion 26b, the dimension in the axial direction of the pressed member 16b, and the dimension in the axial direction of the engaging members 17d are all substantially the same.

Figure 35:
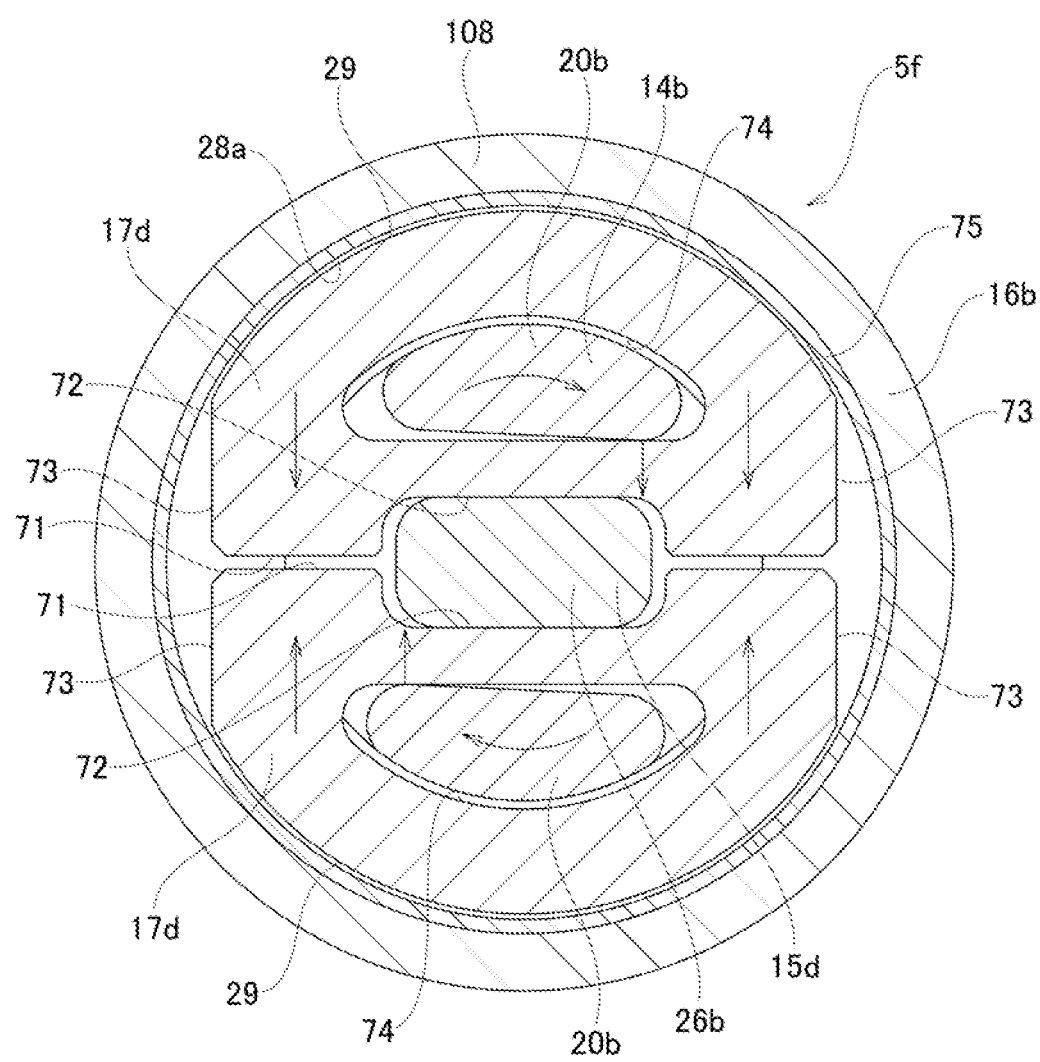
FIG. 35 relates to the reverse input blocking clutch according to the first example of an embodiment of the third aspect, and illustrates a state in which rotational torque is inputted to the input member.
Figure 36:
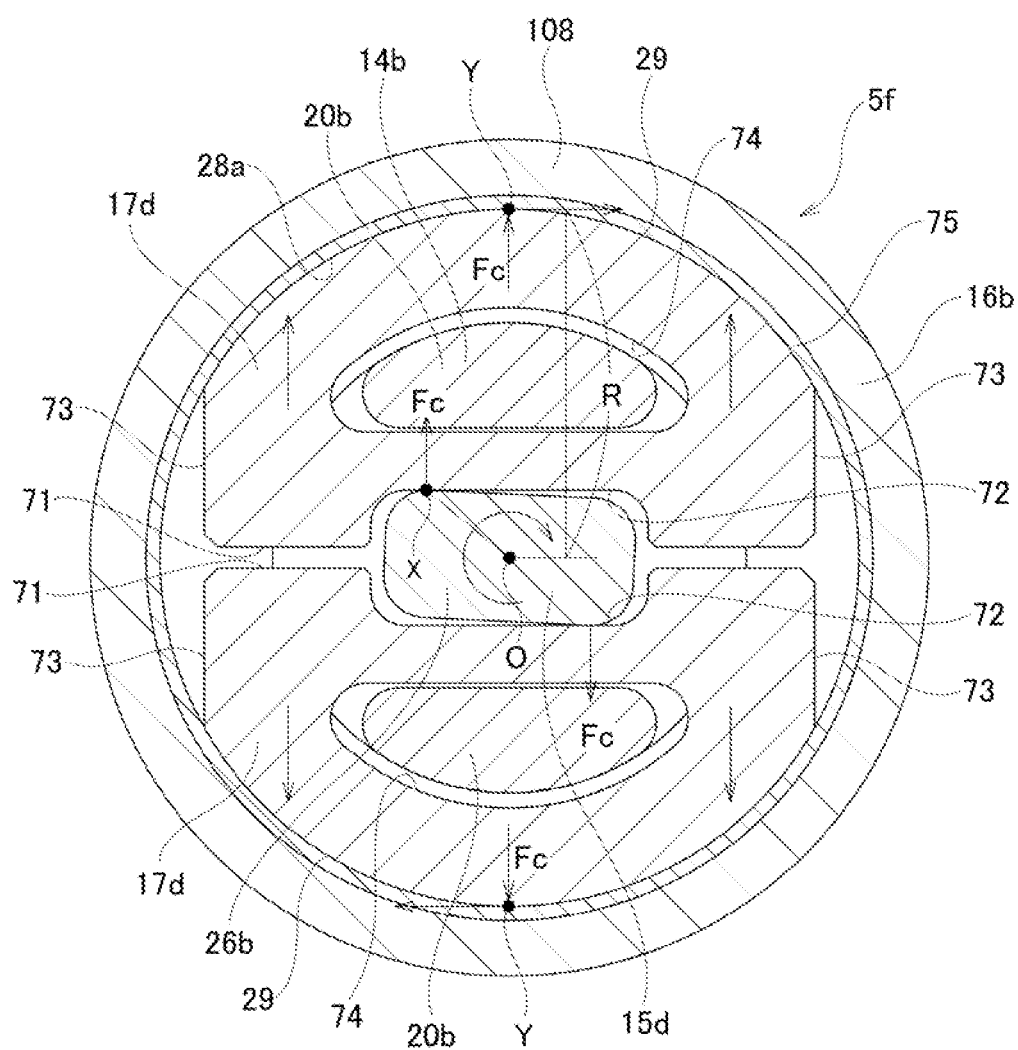
FIG. 36 relates to the reverse input blocking clutch according to the first example of an embodiment of the third aspect, and illustrates a state in which rotational torque is inputted to the output member.
Figure 37:
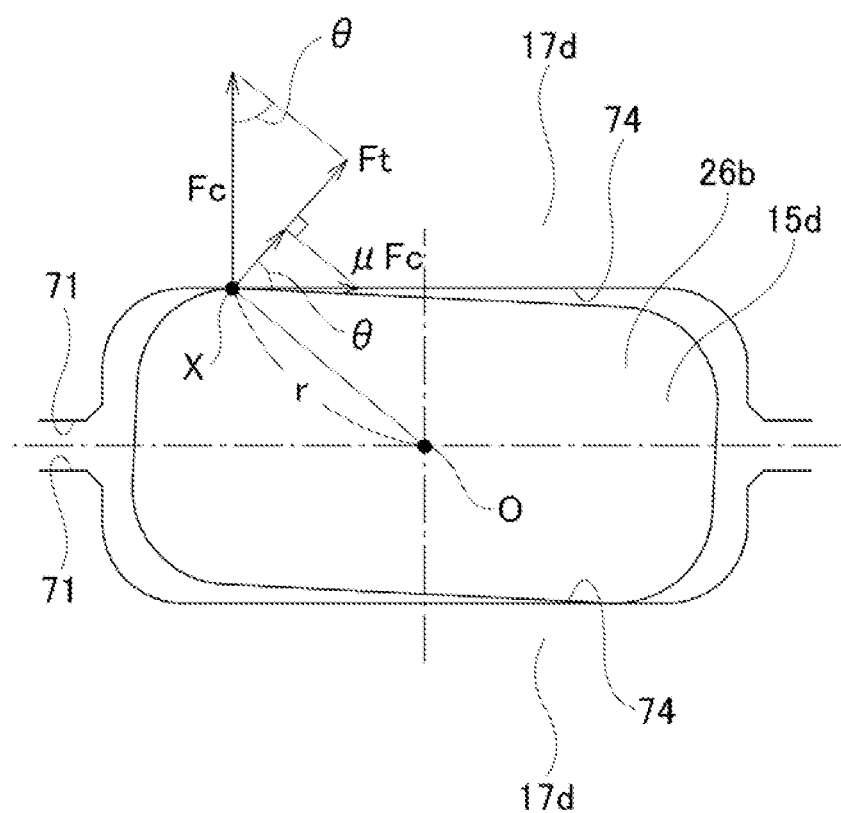
FIG. 37 relates to the reverse input blocking clutch according to the first example of an embodiment of the third aspect, and is a partially enlarged view of the center portion of FIG. 35 illustrating a state in which a force acts on an engaging member from the output member when rotational torque is reversely inputted to the output member.

The operation and function of the reverse input blocking clutch 5f of this example are illustrated in FIGS. 35 to 37; however, basically the operation and function are the same as those of the reverse input blocking clutch 5 in the first example of an embodiment of the first aspect, so the description here is omitted. In the reverse input blocking clutch 5f of this example, the size of the gap between the constituent members is adjusted so that the output member 15d may be locked or semi-locked. In particular, in the positional relationship in which the pressing surfaces 29 of the engaging members 17d are in contact with the pressed surface 28a, there are gaps that allow the pressing surfaces 29 to be further pressed toward the pressed surface 28a due to the corners of the output engaging portion 26b pressing the bottom of the engaging member side output engaging portions 72 between the inner side surface in the radial direction of the input engaging portions 20b and the inner surface of the engaging member side input engaging portions 74. As a result, in a case where rotational torque is reversely inputted to the output member 15d, the engaging members 17d are not prevented by the input engaging portions 20b from moving outward in the radial direction, and even after the pressing surfaces 29 come into contact with the pressed surface 28a, the surface pressure acting on the contact portions between the pressing surfaces 29 and the pressed surface 28a changes according to the magnitude of the rotational torque reversely inputted to the output member 15d whereby the output member 15d is properly locked or semi-locked.

In particular, in the reverse input blocking clutch 5f of this example, backlash in the direction of rotation between the input member 14b and the output member 15d may be kept to a small value.

In other words, in the reverse input blocking clutch 5f of this example, in order to enable switching between the locked or semi-locked state of the output member 15d and a state in which the locked or semi-locked state of the output member 15d is released, it is necessary to provide gaps in the portions between the input engaging portions 20b and the inner surface of the engaging member side input engaging portions 74, in the portions between the output engaging portion 26b and the bottom of the engaging member side output engaging portions 72, and in the portions between the pressed surface 28a and the pressing surfaces 29 for allowing the engaging members 17d to move in the radial direction with respect to the pressed surface 28a, or in other words, it is necessary to provide backlash in the direction of rotation between the input member 14b and the output member 15d. Note that such backlash is also necessary so that the reverse input blocking clutch 5f may be assembled.

However, when the backlash as described above becomes large, looseness in the direction of rotation between the input member 14b and the output member 15d becomes large. As a result, for example, the following inconveniences occur. in other words, depending on whether the input member 14b rotates in the forward direction or rotates in the opposite direction, the positional relationship in the direction of rotation between the input member 14b and the output member 15d changes significantly, and it may become difficult to control the rotation position of the output member 15d with high accuracy depending on the rotation position of the input member 14b. Moreover, the response time from the reversal of the direction of rotation of the input member 14b to the reversal of the direction of rotation of the output member 15d, and the response time from the reverse input of rotational torque to the output member 15d until the output member 15d is locked or semi-locked becomes longer. Then, when the response time of the former becomes long, the responsiveness of the control by the mechanical device in which the reverse input blocking clutch 5f is incorporated becomes low. Moreover, when the response time of the latter becomes long, for example, in an application for locking the output member 15d, even in a case where it is preferable to minimize the reverse input rotation of the output member 15d, it becomes difficult to meet the request. Furthermore, abnormal noise and fretting due to collision and rubbing are likely to occur between the members of the reverse input blocking clutch 5f. From the viewpoint of avoiding such an inconvenience, it is preferable to keep the backlash as small as possible.

The backlash varies due to the accumulation of the dimensional tolerances of the input member 14b, the output member 15d, the pressed member 16c, and the engaging members 17d. Therefore, backlash may increase unintentionally. Such an inconvenience may be avoided by reducing the dimensional tolerances. However, in general, it is not easy to reduce the dimensional tolerances. Such workarounds also increase costs.

In the reverse input cutoff clutch 5f of this example, even when the dimensional tolerances are not reduced, the backlash may be kept small by selecting a gap adjusting member 75 of the pressed member 16b having an appropriate thickness dimension when assembling the reverse input blocking clutch 5f. More specifically, for example, when assembling the reverse input blocking clutch 5f, first, the backlash is measured in a state in which the members other than the gap adjusting member 75 are assembled. Then, based on the size of the backlash measured in this way, a gap adjusting member 75 having an appropriate thickness dimension capable of keeping the backlash small is selected. By assembling the reverse input blocking clutch 5f including the gap adjusting member 75 selected in this way, the backlash can be kept to a small size.

With the reverse input blocking clutch 5f of this example, the backlash can be kept small, so looseness between the input member 14b and the output member 15d in the direction of rotation may be kept small. As a result, for example, the following effects may be obtained. In other words, depending on whether the input member 14b rotates in the forward direction or rotates in the opposite direction, the positional relationship in the direction of rotation between the input member 14b and the output member 15d may be made to be substantially equal (the difference in the positional relationship between the two cases may be sufficiently reduced). Therefore, the rotation position of the output member 15d may be accurately controlled by the rotation position of the input member 14b. Moreover, the response time from the reversal of the direction of rotation of the input member 14b to the reversal of the direction of rotation of the output member 15d, and the response time from the reverse input of rotational torque to the output member 15d until the output member 15d is locked or semi-locked may be shortened. By shortening the response time of the former, it is possible to increase the responsiveness of the control by the mechanical device in which the reverse input blocking clutch 5f is incorporated. By shortening the response time of the latter, for example, in applications of locking the output member 15d, the reverse input rotation of the output member 15d may be made as small as possible. Furthermore, it is possible to make it difficult for abnormal noise and fretting due to collision or rubbing to occur between the members of the reverse input blocking clutch 5f.

Other configurations and operations are the same as in the first example of an embodiment of the first aspect.

The reverse input blocking clutch of this third aspect may be used in an actuator using an electric motor as a drive source, by being incorporated between the electric motor and a driven portion driven by the electric motor. In this case, the driven portion may be driven with high efficiency by an electric motor, however, in a case where the rotational torque is reversely inputted from the driven portion side, by locking the reverse input blocking clutch, the position of the driven portion may be maintained without requiring power to be consumed by the electric motor. Therefore, it is possible to achieve an actuator having high efficiency and low power consumption.

Moreover, the reverse input blocking clutch of the third aspect may be applied to various mechanical devices such as a variable compression ratio device, an electric door device, a power window device, a steering apparatus, a jack and the like. Then, the backlash between the input member and the output member of the reverse input blocking clutch may be kept small, and the movable portion of various mechanical devices may be positioned with high accuracy. The number of engaging members of the reverse input blocking clutch of the present invention is not limited to two, and may be one or three or more.

In a case where rotational torque is reversely inputted to the output member, as long as the output member meets the locked or semi-locked condition, lubricants such as traction oil, traction grease, ordinary lubricating oil and the like may also be arranged at the portions where the input member, the output member, the pressed member, the engaging members and the gap adjusting member come into contact with each other. In this case, at least one of the input member, the output member, the pressed member, the engaging members, and the gap adjusting member may be made of oil-impregnated metal.

In addition, the material of the gap adjusting member may be ceramic or rubber. Furthermore, the gap adjusting member may be composed of various coating materials formed on the surface of at least one of the input member, the output member, the pressed member, and the engaging members such as plating such as nickel chrome plating, or the like, thermal spray coating, and resin coating and the like.

Second Example of Embodiment of Third Aspect

Figure 38:
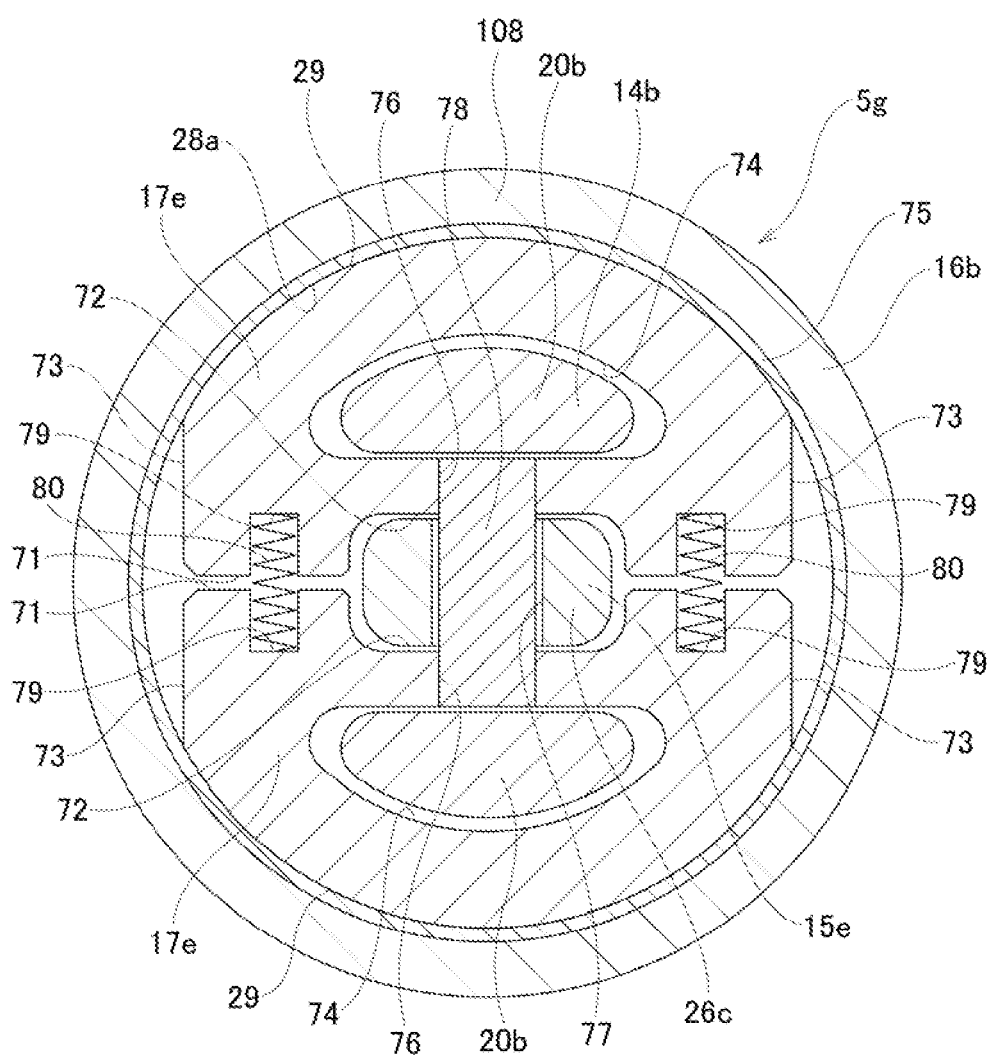
FIG. 38 is a view illustrating a reverse input blocking clutch of a second example of an embodiment of the third aspect.

A second example of an embodiment of the third aspect of the present invention will be described with reference to FIG. 38.

This example is a modified example of the first example (see FIGS. 30 to 37) of an embodiment of the third aspect. In the reverse input blocking clutch 5g of this example, each engaging member 17e of the pair of engaging members 17e, in an inner side portion in the radial direction of the intermediate portion in the width direction, has a guide hole 76 extending in the radial direction. Both end portions in the axial direction of the guide hole 76 are open to the bottom portion of the engaging member side output engaging portion 72 and to a portion positioned on the inner side in the radial direction of the inner surface of the engaging member side input engaging portion 74. In addition, the output engaging portion 26c of the output member 15e has an insertion hole 77 that is orthogonal to the center of the output engaging portion 26c and penetrates through the output engaging portion 26c in the lateral direction. Both end portions in the axial direction of a guide shaft 78 that is a guide member are inserted through the guide holes 76 of the engaging members 17e so that there is no looseness of the guide shaft 78 in the radial direction, and so that the guide shaft 78 is able to move in the axial direction. The intermediate portion in the axial direction of the guide shaft 78 is loosely inserted through the insertion hole 77 of the output engaging portion 26c. In this example having this kind of a configuration, the guide mechanism composed of the guide holes 76 of the engaging members 17e and the guide shaft 78 prevents the engaging members 17e from moving relative to each other in the width direction and from being tilted so that the bottom surfaces 71 of the engaging members 17e are not parallel to each other, and allows the engaging members 17e to only move away from or toward each other in the radial direction.

In this example, each engaging member 17e has two columnar guide recesses 79 on both sides in the width direction of the bottom surface 71 that are recessed in a direction perpendicular to the bottom surface 71. In a state in which the bottom surfaces 71 of the engaging members 17e face each other, a coil-shaped spring 80 as an elastic member is arranged inside each of the two sets of guide recesses 79 arranged on the same straight line, and is arranged so as to span the set of guide recesses 79. Each of the pair of engaging members 17e is biased toward the pressed surface 28a by the elasticity of the pair of springs 80 arranged in the two sets of guide recesses 79. In this example having this kind of a configuration, by stabilizing the postures of the pair of engaging members 17e while synchronizing them, it is possible to accurately perform movement of each engaging member 17e in the radial direction away from or toward each other. Other configurations and operations are the same as in the first example of an embodiment of the third aspect.

Third Example of Embodiment of Third Aspect

Figure 39:
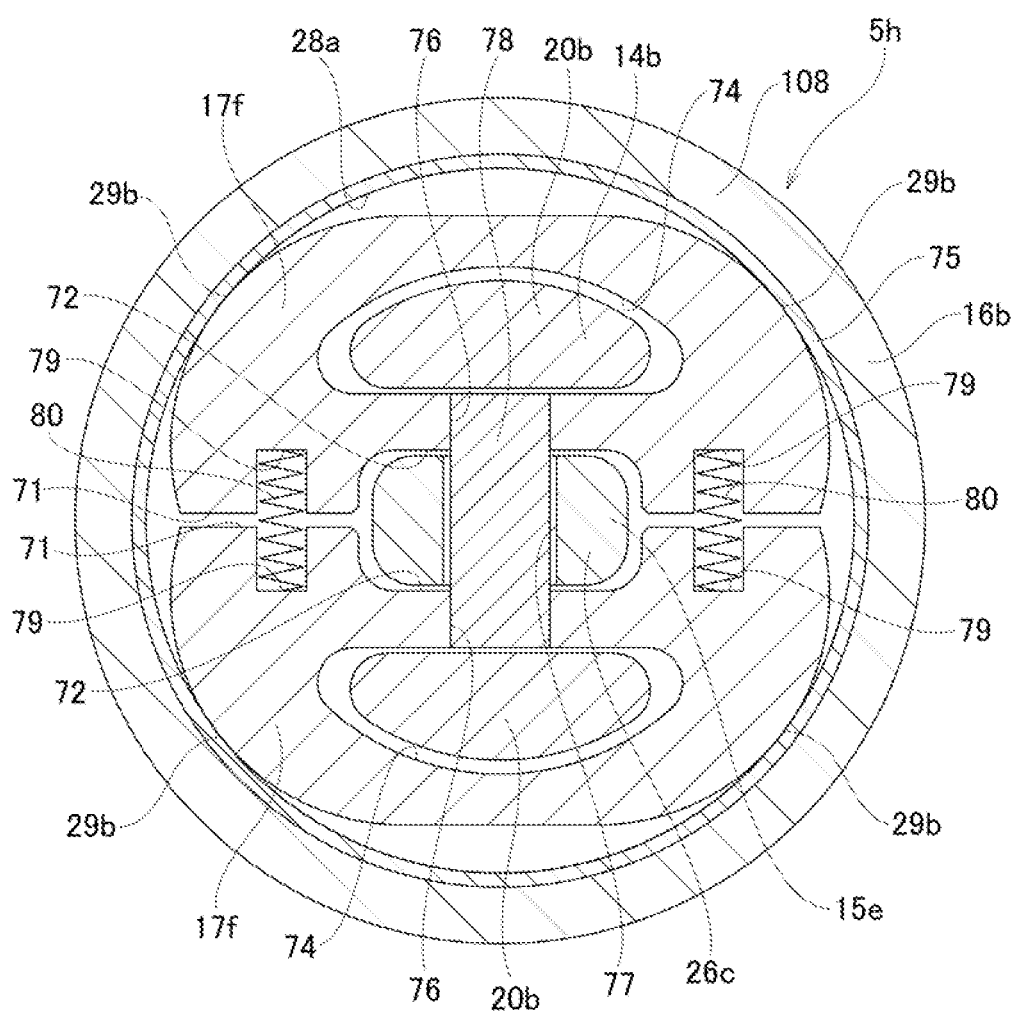
FIG. 39 is a view illustrating a reverse input blocking clutch of a third example of an embodiment of the third aspect.

A third example of an embodiment of the third aspect of the present invention will be described with reference to FIG. 39.

This example is a modified example of the second example (see FIG. 38) of an embodiment of the third aspect.

In the reverse input blocking clutch 5h of this example, two portions separated in the circumferential direction of the outer side surface in the radial direction of each of the pair of engaging members 17f are pressing surfaces 29b that are pressed against the pressed surface 28a, and the intermediate portion in the circumferential direction that is located between these pressing surfaces 29b is a flat surface that is not able to be pressed against the pressed surface 28a. Each of the pressing surfaces 29b is a cylindrical convex surface having a radius of curvature smaller than the radius of curvature of the pressed surface 28a. In this example having such a configuration, when rotational torque is reversely inputted to the output member 15e and the engaging members 17f are pressed against the pressed surface 28a by the output engaging portion 26c, a wedge effect is generated, and it is possible to increase the frictional engagement force between the pressed surface 28a and the pressing surfaces 29b. Therefore, the brake torque T' acting on the engaging members 17f may be increased. Therefore, the diameter dimension of the reverse input blocking clutch 5h for obtaining the required brake torque T' may be reduced. Other configurations and operations are the same as in the second example of an embodiment of the third aspect.

Fourth Example of Embodiment of Third Aspect

Figure 40:
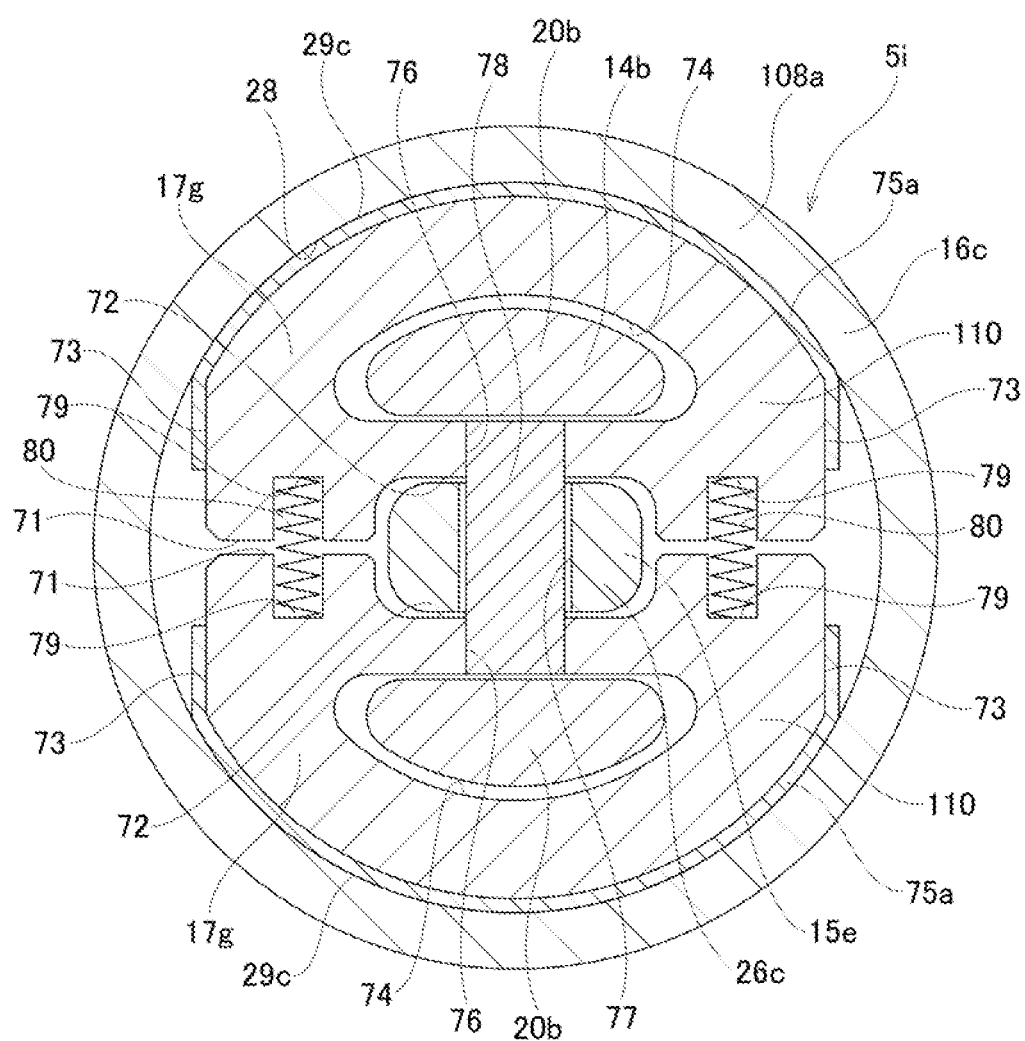
FIG. 40 is a view illustrating a reverse input blocking clutch according to a fourth example of an embodiment of the third aspect.

A fourth example of an embodiment of the third aspect of the present invention will be described with reference to FIG. 40.

This example is a modified example of the second example (see FIG. 38) of an embodiment of the third aspect. In the reverse input blocking clutch 5i of this example, the pressed member 16c is composed of only the pressed member main body 108a, and the pressed surface 28 is provided on the inner circumferential surface of the pressed member main body 108a. Moreover, in this example, each engaging member 17g of the pair of engaging members 17g is configured by combining an engaging member main body 110 and the gap adjusting member 75a. The engaging member main body 110 has the same configuration as the engaging member 17e of the second example of an embodiment of the third aspect; however, the outer side surface in the radial direction that is a partially cylindrical convex surface and that was the pressing surfaces 29 in the engaging members 17e does not function as a pressing surface. The gap adjusting member 75a has a substantially semi-cylindrical shape capable of covering a continuous range of the outer side surface in the radial direction and the outer side portion in the radial direction of a pair of side surfaces 73 on the outer circumferential surface of the engaging member main body 110. The gap adjusting member 75a is fixed to the engaging member main body 110 in a state of covering the above range. Note that as the method for fixing the gap adjusting member 75a to the engaging member main body 110, the same means as the means for fixing the gap adjusting material 75 described in the first example of an embodiment of the third aspect may be adopted. The gap adjusting member 75a includes a pressing surface 29c on the outer side surface in the radial direction of the portion covering the outer side surface in the radial direction of the engaging member main body 110 having a radius of curvature equal to or less than the radius of curvature of the pressed surface 28.

In this example, each engaging member 17g has a gap adjusting member 75a, so for each of the engaging members 17g, the gap between the pressed member 16b serving as the mating member and it and the gaps between the input member 14b and the output member 15e and it can be individually adjusted. Therefore, it is possible to further reduce the backlash in the direction of rotation between the input member 14b and the output member 15e as compared with the cases of the first to third examples of an embodiment of the third aspect. Other configurations and operations are the same as in the second example of an embodiment of the third aspect.

Fifth Example of Embodiment of Third Aspect

Figure 41:
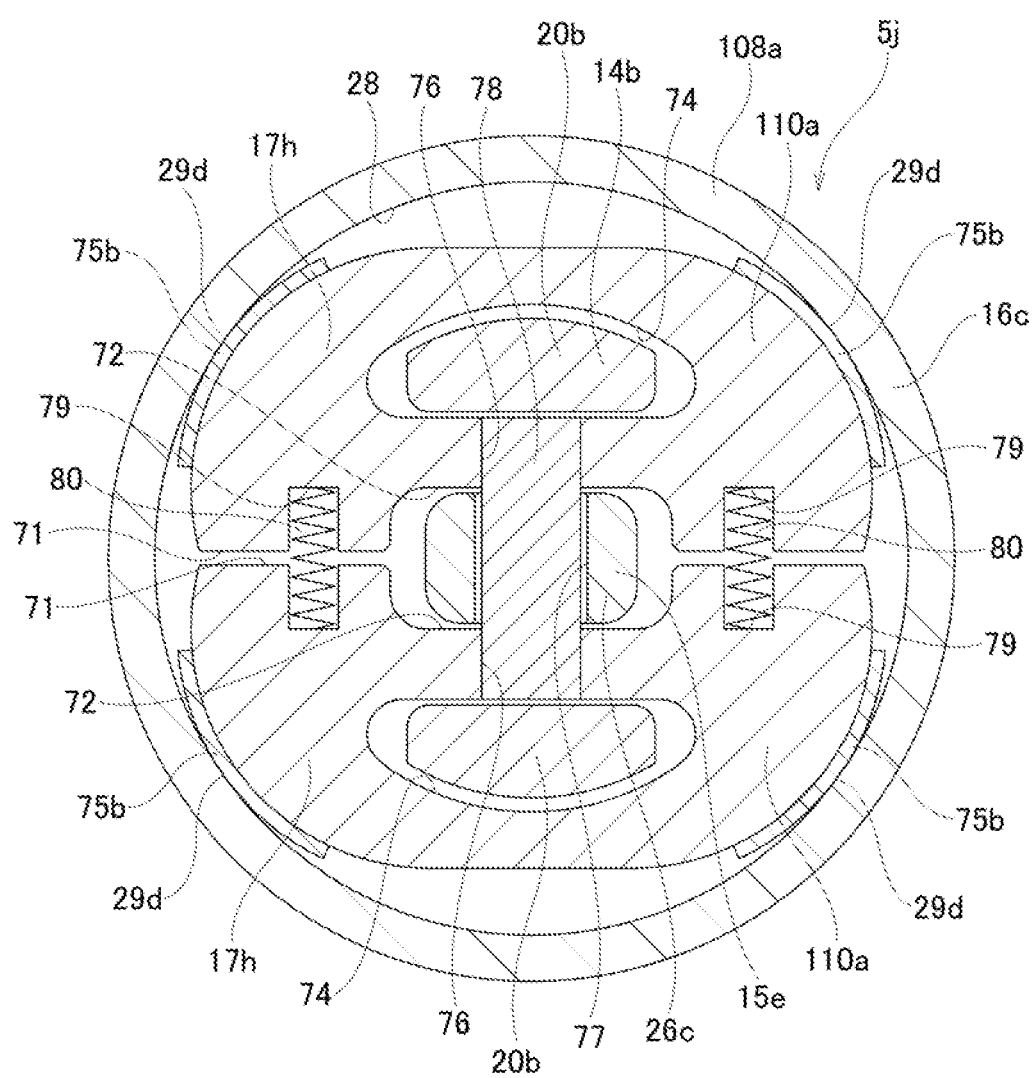
FIG. 41 is a view illustrating a reverse input blocking clutch of a fifth example of an embodiment of the third aspect.

A fifth example of an embodiment of the third aspect of the present invention will be described with reference to FIG. 41.

This example is a modified example of the fourth example (see FIG. 40) of an embodiment of the third aspect. In the reverse input blocking clutch 5j of this example, each engaging member 17h of the pair of engaging members 17h is configured by combining the engaging member main body 110a and the pair of gap adjusting members 75b. The engaging member main body 110a has the same configuration as the engaging member 17f of the third example (see FIG. 39) of an embodiment of the third aspect; however, the two portions of the engaging member 17f that are the pressing surfaces 29b and are separated from each other in the circumferential direction of the outer side surface in the radial direction do not function as the pressing surface. The pair of gap adjusting members 75b respectively has a substantially semi-cylindrical shape and is capable of covering portions at two locations of the outer side surface in the radial direction of the engaging member main body 110a that are separated in the circumferential direction. The pair of gap adjusting members 75b is fixed to the engaging member main body 110a in a state of covering these two portions. Each of the pair of gap adjusting members 75b includes a pressing surface 29d on the outer side surface in the radial direction having a radius of curvature smaller than the radius of curvature of the pressed surface 28. Other configurations and operations are the same as in the third and fourth examples of an embodiment of the third aspect.

Sixth Example of Embodiment of Third Aspect

Figure 42:
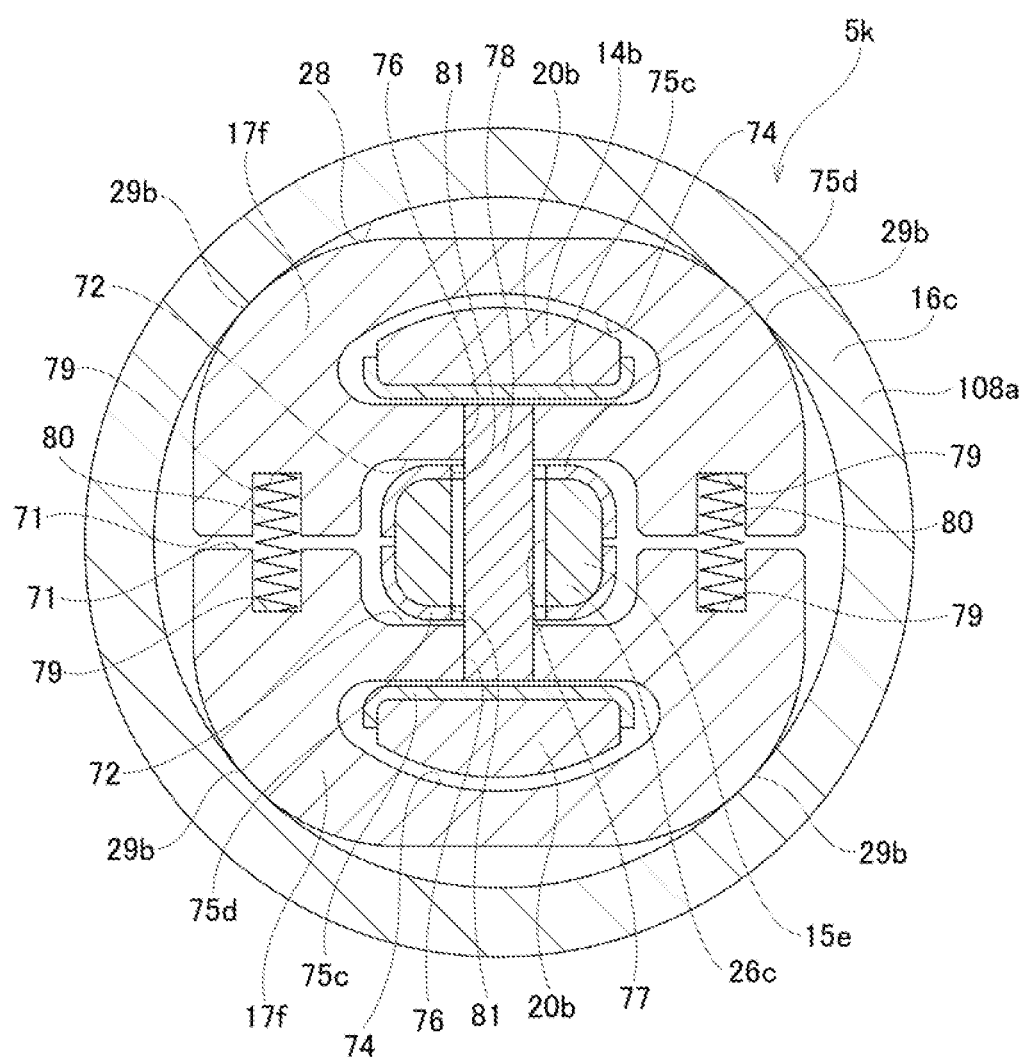
FIG. 42 is a view illustrating a reverse input blocking clutch of a sixth example of an embodiment of the third aspect.

A sixth example of an embodiment of the third aspect of the present invention will be described with reference to FIG. 42.

This example is a modified example of the third example (see FIG. 39) of an embodiment of the third aspect. In the reverse input blocking clutch 5k of this example, the pressed member 16c is composed of only the pressed member main body 108a, and the pressed surface 28 is provided on the inner circumferential surface of the pressed member main body 108a. Moreover, in this example, in regard to each engaging member 17f of the pair of engaging members 17f, a gap adjusting material 75c is arranged at a location between the inner surface of the engaging member side input engaging portion 74 and the input engaging portion 20b, and a gap adjusting member 75d is arranged at a location between the inner surface of the engaging member side output engaging portion 72 and the output engaging portion 26c.

The gap adjusting member 75c has a U-shaped plate shape capable of covering a continuous range between the inner side surface in the radial direction and the inner side portions in the radial direction of both side surfaces in the circumferential direction of the input engaging portion 20b of the input member 14b. The gap adjusting member 75c is fixed to the input engaging portion 20*b* in a state of covering this range. Note that as the method for fixing the gap adjusting member 75*c* to the input engaging portion 20*b*, the same means as the means for fixing the gap adjusting member 75 described in the first example of an embodiment of the third aspect may be adopted.

The gap adjusting member 75*d* has a U-shaped plate shape capable of covering the outer surface of the half portion in the lateral direction of the output engaging portion 26*c* of the output member 15*e*, or in other words, a continuous range of the side surface in the lateral direction and half in the lateral direction of both side surfaces in the longitudinal direction of the output member 15*e*. The gap adjusting member 75*d* is fixed to the output engaging portion 26*c* in a state of covering this range. In this state, the gap adjusting member 75*d* has a through hole 81 at a location that is aligned with the opening of the insertion hole 77. The guide shaft 78 is loosely inserted through the through hole 81. Note that as the method for fixing the gap adjusting member 75*d* to the output engaging portion 26*c*, the same means as the means for fixing the gap adjusting material 75 described in the first example of an embodiment of the third aspect may be adopted.

In this example, when a rotational torque is inputted to the input member 14*b*, the engaging members 17*f* move inward in the radial direction due to engagement between the input engaging portions 20*b* and inner surfaces of the engaging member side input engaging portions 74 via the gap adjusting members 75*c*, and transmit rotational torque that is inputted to the input member 14*b* to the output member 15*e* by the bottom portions of the engaging member side output engaging portions 72 engaging with the output engaging portion 26*b* via the gap adjusting members 75*d*. Moreover, when a rotational torque is reversely inputted to the output member 15*e*, the engaging members 17*f* move outward in the radial direction due to engagement between the output engaging portion 26*c* and the engaging member side output engaging portions 72 via the gap adjusting members 75*d*, causing the pressing surfaces 29*b* to frictionally engage with the pressed surface 28.

In this example, for each of the engaging members 17*f*, gap adjusting materials 75*c* are arranged between the inner surfaces of the engaging member side input engaging portions 74 and the input engaging portions 20*b*, and gap adjusting members 75*d* are arranged between the inner surfaces of the engaging member side output engaging portions 72 and the output engaging portion 26*c*. Therefore, the gaps between the inner surfaces of the engaging member side input engaging portions 74 and the input engaging portions 20*b*, and the gaps between the inner surfaces of the engaging member side output engaging portions 72 and the output engaging portion 26*c* may be individually adjusted for each of the engaging members 17*f*. Therefore, compared with the cases of the first to fifth examples of an embodiment of the third aspect, the backlash in the direction of rotation between the input member 14*b* and the output member 15*e* may be further reduced.

Note that in a case of implementing the present invention, it is also possible to adopt a configuration having only one of the gap adjusting members 75*c* arranged between the inner surfaces of the engaging member side input engaging portions 74 and the input engaging portions 20*b*, and the gap adjusting materials 75*d* arranged between the inner surfaces of the engaging member side output engaging portions 72 and the output engaging portion 26*c*. Such a configuration is also included in the scope of the present invention. Other configurations and operations are the same as in the third example of an embodiment of the third aspect.

Seventh Example of Embodiment of Third Aspect

Figure 43:
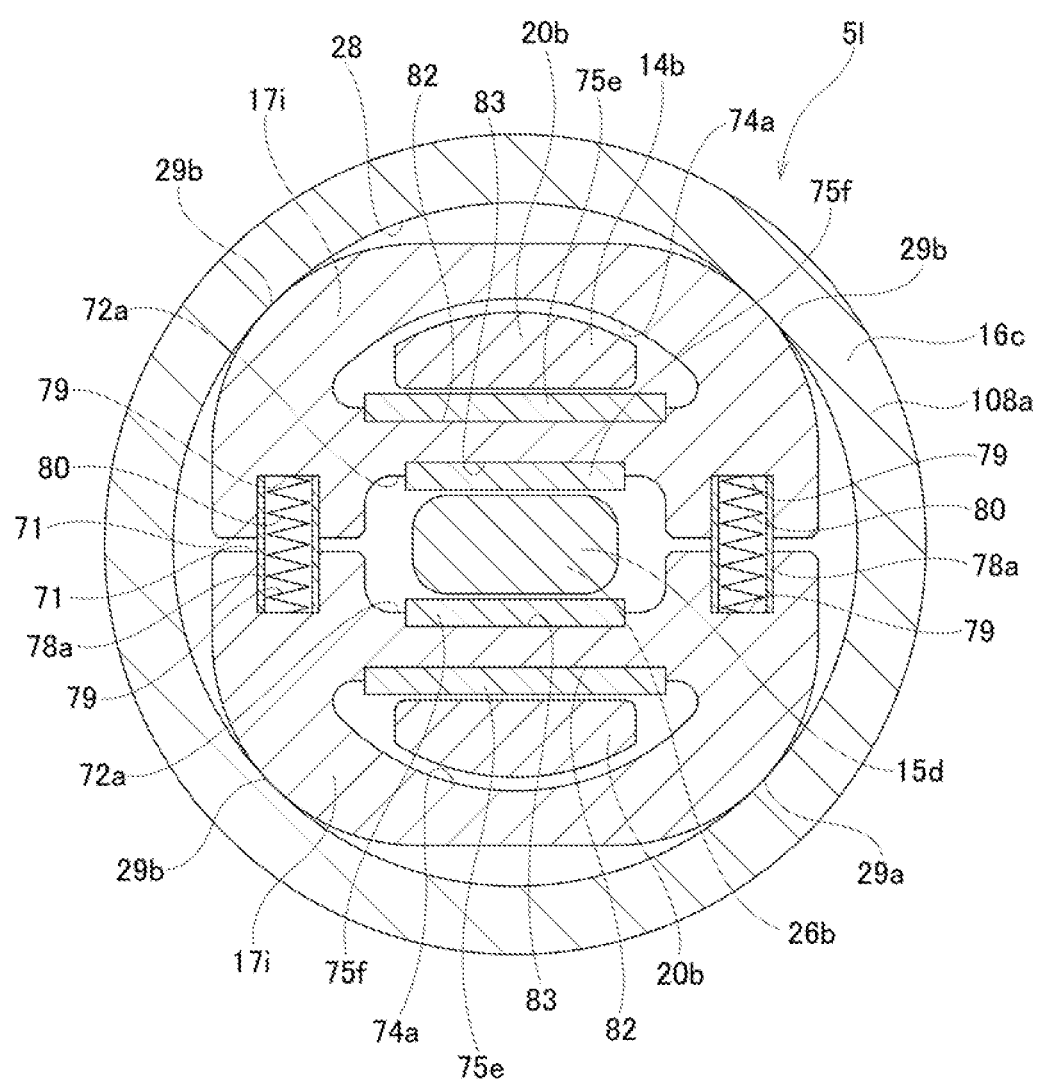
FIG. 43 is a view illustrating a reverse input blocking clutch according to a seventh example of an embodiment of the third aspect.

A seventh example of an embodiment of the third aspect of the present invention will be described with reference to FIG. 43.

This example is a modified example of the sixth example (see FIG. 42) of an embodiment of the third aspect. In the sixth example of an embodiment of the third aspect, a guide shaft 78 was arranged in the center. However, in the reverse input blocking clutch 5*l* of this example, cylindrical-shaped guide shafts 78*a* are arranged on both side portions in the width direction of the pair of engaging members 17*i*. In other words, both side portions in the axial direction of the guide shafts 78*a* are inserted inside the set of guide recess portions 79 arranged on the same straight line on both side portions in the width direction of the pair of engaging members 17*i* so that there is no looseness in the radial direction, and so that movement in the axial direction is not possible. In this example, springs 80 are arranged on the inner side in the radial direction of the guide shafts 78*a*.

In this example, the gap adjusting members 75*e* that are arranged between the input engaging portions 20*b* and the inner surfaces of the engaging member side input engaging portions 74*a* are fixed to the engaging members 17*i*. Each of the engaging members 17*i* has a holding recess portion 82 that is recessed inward in the radial direction in the intermediate portion in the width direction of a portion positioned on the inner side in the radial direction of the inner surface of the engaging member side input engaging portion 74*a*. The bottom portion of the holding recess portion 82 is a flat surface orthogonal to the radial direction of each engaging member 17*i*. On the other hand, the gap adjusting member 75*e* is formed into a flat plate shape, and is fixed to each of the engaging members 17*i* in a state where a half portion in the thickness direction is held inside the holding recess portion 82 without a gap. Note that as the means for fixing a gap adjusting member 75*e* to each engaging member 17*i*, the same means as the means for fixing the gap adjusting member 75 described in the first example of an embodiment of the third aspect may be adopted.

In this example, the gap adjusting members 75*f* that are arranged between the output engaging portion 26*b* and the inner surfaces of the engaging member side output engaging portion 72*a* are fixed to the engaging members 17*i*. Each of the engaging members 17*i* has a holding recess portion 83 in the intermediate portion in the width direction of the bottom portion of the engaging member side output engaging portion 72*a* that is recessed outward in the radial direction. The bottom portion of the holding recess portion 83 is a flat surface orthogonal to the radial direction of each engaging member 17*i*. On the other hand, the gap adjusting member 75*f* is formed into a flat plate shape, and is fixed to each of the engaging members 17*i* in a state where a half portion in the thickness direction is held inside the holding recess portion 83 without a gap. Note that as the means for fixing a gap adjusting member 75*f* to each engaging member 17*i*, the same means as the means for fixing the gap adjusting member 75 described in the first example of an embodiment of the third aspect may be adopted.

In the reverse input blocking clutch 5*l* of this example, gap adjustment may be performed in a smaller number of steps as compared with the sixth example of an embodiment the third aspect. In other words, in the sixth example of an embodiment of the third aspect, gap adjustment must be performed in a total of two steps: a step of fixing the gap adjusting members 75c to the input engaging portions 20b and a step of fixing the gap adjusting members 75d to the output engaging portion 26c. On the other hand, in this example, gap adjustment may be performed only in one step of fixing the gap adjusting members 75e and 75f to the engaging members 17i. Other configurations and operations are the same as in the sixth example of an embodiment of the third aspect.

Eighth Example of Embodiment of Third Aspect

Figure 44:
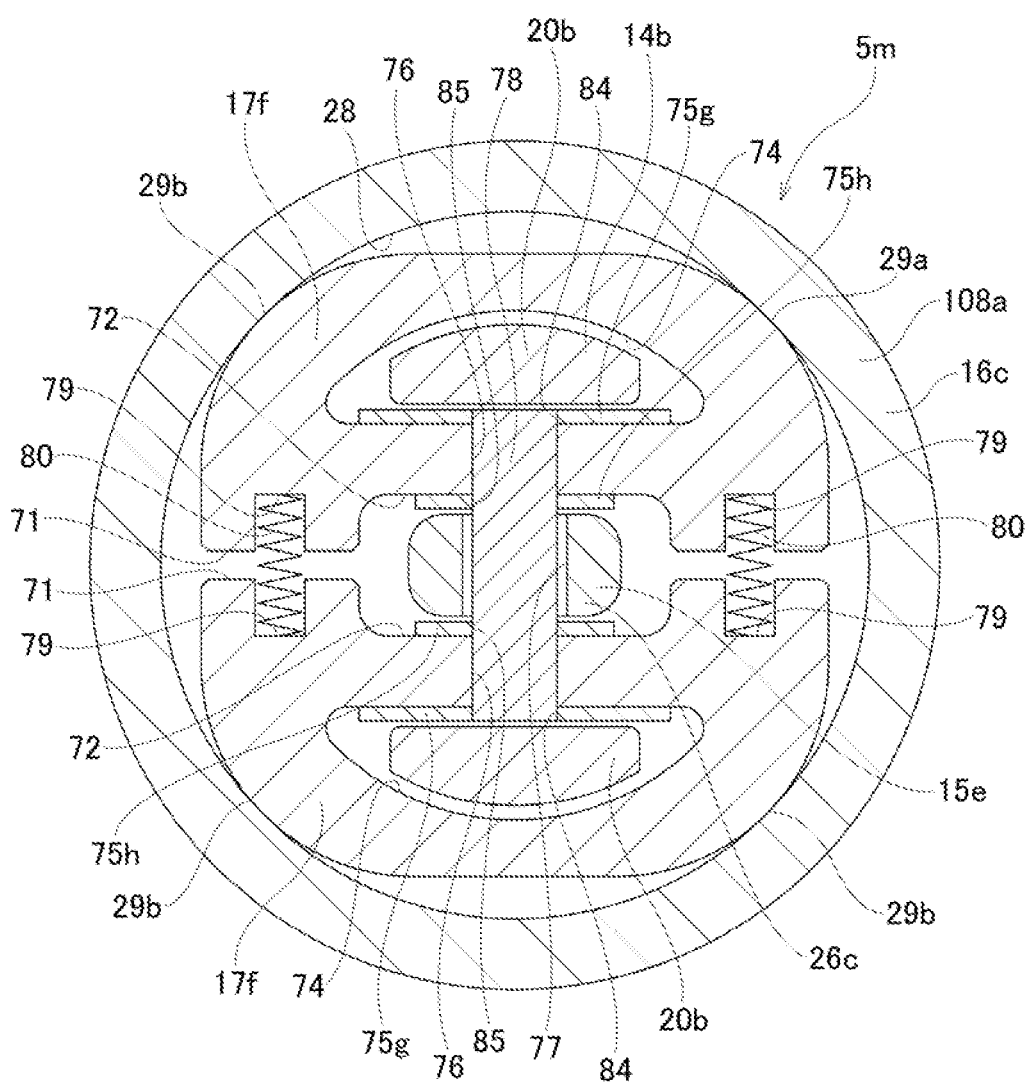
FIG. 44 is a view illustrating a reverse input blocking clutch of an eighth example of an embodiment of the third aspect.

An eighth example of an embodiment of the third aspect of the present invention will be described with reference to FIG. 44.

This example is a modified example of the sixth example (see FIG. 42) of an embodiment of the third aspect. In the reverse input blocking clutch 5m of this example, the gap adjusting members 75g arranged between the input engaging portions 20b and the inner surfaces of the engaging member side input engaging portions 74 are held by the guide shaft 78. In other words, the gap adjusting members 75g are formed in a flat plate shape, and are arranged between the inner side surface in the radial direction the input engaging portions 20b and the portions positioned on the inner side in the radial direction of the inner surface of the engaging member side input engaging portions 74. Moreover, the gap adjusting members 75g have a through hole 84 in the thickness direction in the center portion. The end portions in the axial direction of the guide shaft 78 are inserted inside the through holes 84 so there is looseness in the radial direction of the guide shaft 78 and so that movement in the axial direction of the guide shaft 78 is possible. In other words, due to the engagement of end portions in the axial direction of the guide shaft 78 in the through holes 84, the gap adjusting members 75g are held by the guide shaft 78 so as not to fall off from between the inner side surfaces in the radial direction of the input engaging portions 20b and the inner surfaces of the engaging member side input engaging portions 74.

In this example, the gap adjusting members 75h arranged between the output engaging portion 26c and the inner surface of the engaging member side output engaging portions 72 are held by the guide shaft 78. The gap adjusting members 75h are formed in a flat plate shape, and are arranged between the side surfaces in the lateral direction of the output engaging portion 26c and the bottom portions of the engaging member side output engaging portions 72. Moreover, the gap adjusting members 75h have a through hole 85 in the thickness direction in the center portion. Intermediate portions in the axial direction of the guide shaft 78 are inserted through the through holes 85 so there is looseness in the radial direction of the guide shaft 78 and so that movement in the axial direction of the guide shaft 78 is possible. In other words, due to the engagement of intermediate portions in the axial direction of the guide shaft 78 in the through holes 85, the gap adjusting members 75h are held by the guide shaft 78 so as not to fall off from between the inner side surfaces in the lateral direction of the output engaging portion 26c and the bottom portions of the engaging member side output engaging portions 72.

In the reverse input blocking clutch 5m of this example, the gap adjusting members 75g and 75h may be held by the guide shaft 78 by inserting the guide shaft 78 though the through holes 84 and 85, respectively. Therefore, the work of installing the gap adjusting members 75g and 75h may be easily performed. Other configurations and operations are the same as in the sixth example of an embodiment of the third aspect.

Ninth Example of Embodiment of Third Aspect

Figure 45:
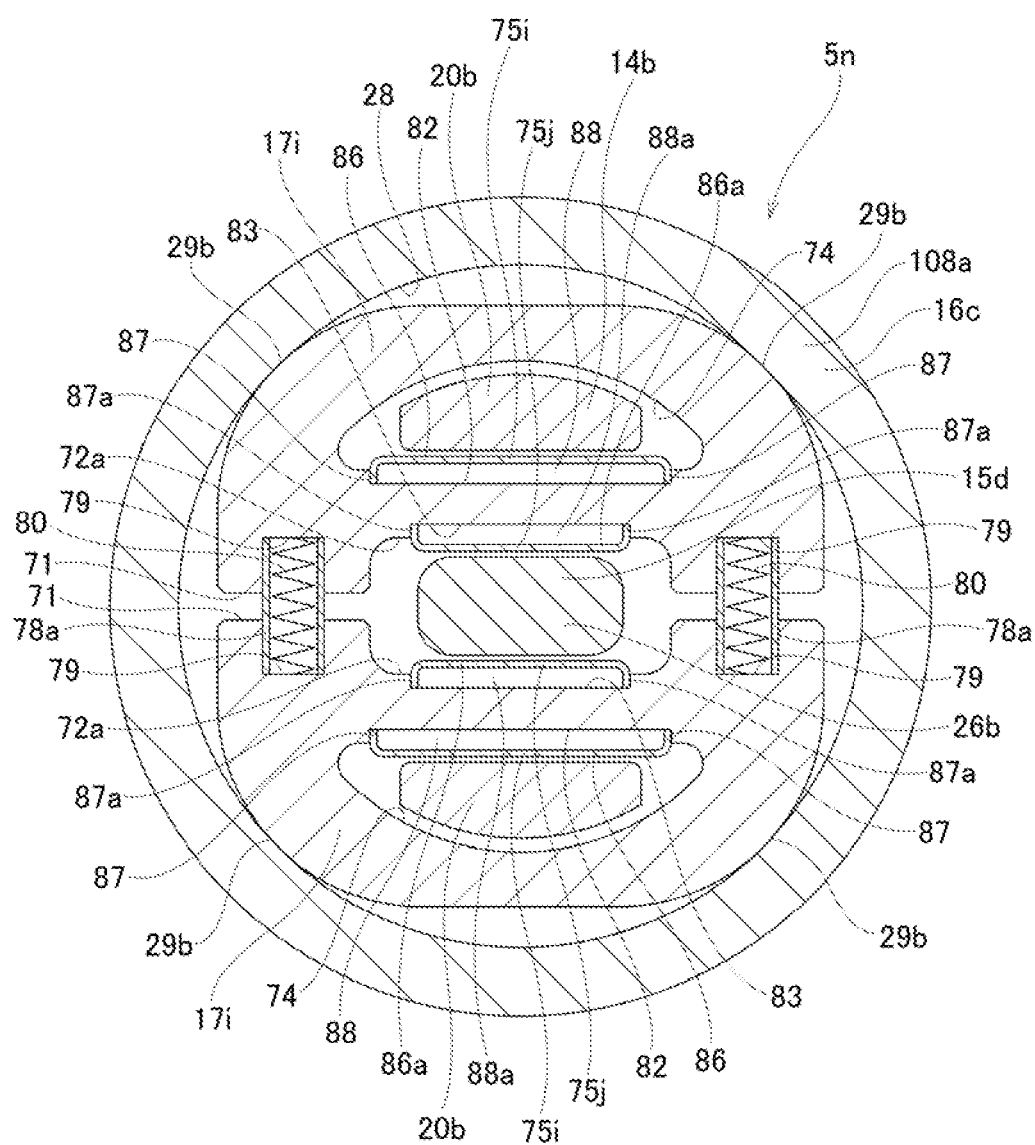
FIG. 45 is a view illustrating a reverse input blocking clutch according to a ninth example of an embodiment of the third aspect.
Figure 46:
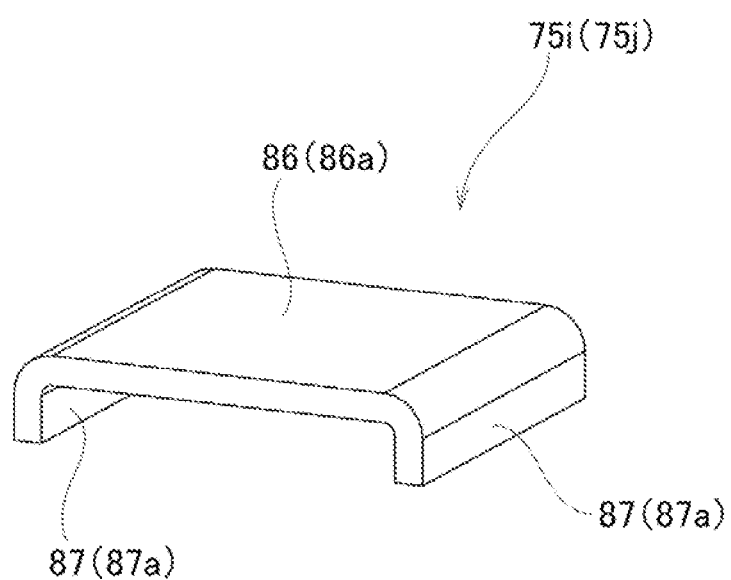
FIG. 46 is a perspective view of a gap adjusting member (leaf spring) incorporated in the reverse input blocking clutch of the ninth example of an embodiment of the third aspect.

A ninth example of an embodiment of the third aspect of the present invention will be described with reference to FIG. 45 and FIG. 46.

This example is a modified example of the seventh example (see FIG. 43) of an embodiment of the third aspect. In the reverse input blocking clutch 5n of this example, the gap adjusting members 75i that are arranged between the input engaging portions 20b and the inner surfaces of the engaging member side input engaging portions 74 are leaf springs made of steel. In other words, the gap adjusting members 75i have a flat plate-shaped contact plate portion 86, and a pair of fixing plate portions 87 formed so as to bend at right angles in the same direction as each other in the thickness direction of the contact plate portion 86 from both side portions in the width direction (horizontal direction in FIGS. 45 and 46) of the contact plate portion 86. The gap adjusting members 75i are fixed to the engaging members 17i in a state that the pair of fixing plate portions 87 of the gap adjusting members 75i fit inside holding recesses 82 in the engaging members 17i with no looseness in the width direction, and that the portions surrounded on all sides by the pair of fixing plate portions 87, the contact plate portions 86, and the bottom portions of the holding recess portions 82 are space portions 88.

In this example, the gap adjusting members 75j that are arranged between the output engaging portion 26b and the inner surfaces of the engaging member side output engaging portions 72a are also leaf springs made of steel having the same configuration as the gap adjusting members 75i. In other words, the gap adjusting members 75j have a flat plate-shaped contact plate portion 86a, and a pair of fixing plate portions 87a formed so as to bend at right angles in the same direction as each other in the thickness direction of the contact plate portion 86a from both side portions in the width direction (horizontal direction in FIGS. 45 and 46) of the contact plate portion 86a. The gap adjusting members 75i are fixed to the engaging members 17i in a state that the pair of fixing plate portions 87a of the gap adjusting members 75j fit inside holding recesses 83 in the engaging members 17i with no looseness in the width direction, and that the portions surrounded on all sides by the pair of fixing plate portions 87a, the contact plate portions 86a, and the bottom portions of the holding recess portions 83 are space portions 88a.

In this example, when rotational torque is inputted to the input member 14b, the input engaging portions 20b press the contact plate portions 86 of the gap adjusting members 75i, and the output engaging portion 26b is pressed by the contact plate portions 86a of the gap adjusting members 75j. At this time, the contact plate portions 86, 86a elastically bend toward the space portions 88, 88a, so the impact acting between the input engaging portions 20b and the output engaging portion 26c and the respective engaging members 17i may be alleviated. Moreover, in a case where rotational torque is reversely inputted to the output member 15d, the output engaging portion 26b presses the contact plate portions 86a of the gap adjusting members 75j. At this time as well, the contact plate portions 86a elastically bend toward the space portions 88a, so the impact acting between the output engaging portion 26c and the pressed member 16b and the respective engaging members 17i may be alleviated.

Other configurations and operations are the same as in the seventh example of an embodiment of the third aspect.

Tenth Example of Embodiment of Third Aspect

Figure 47:
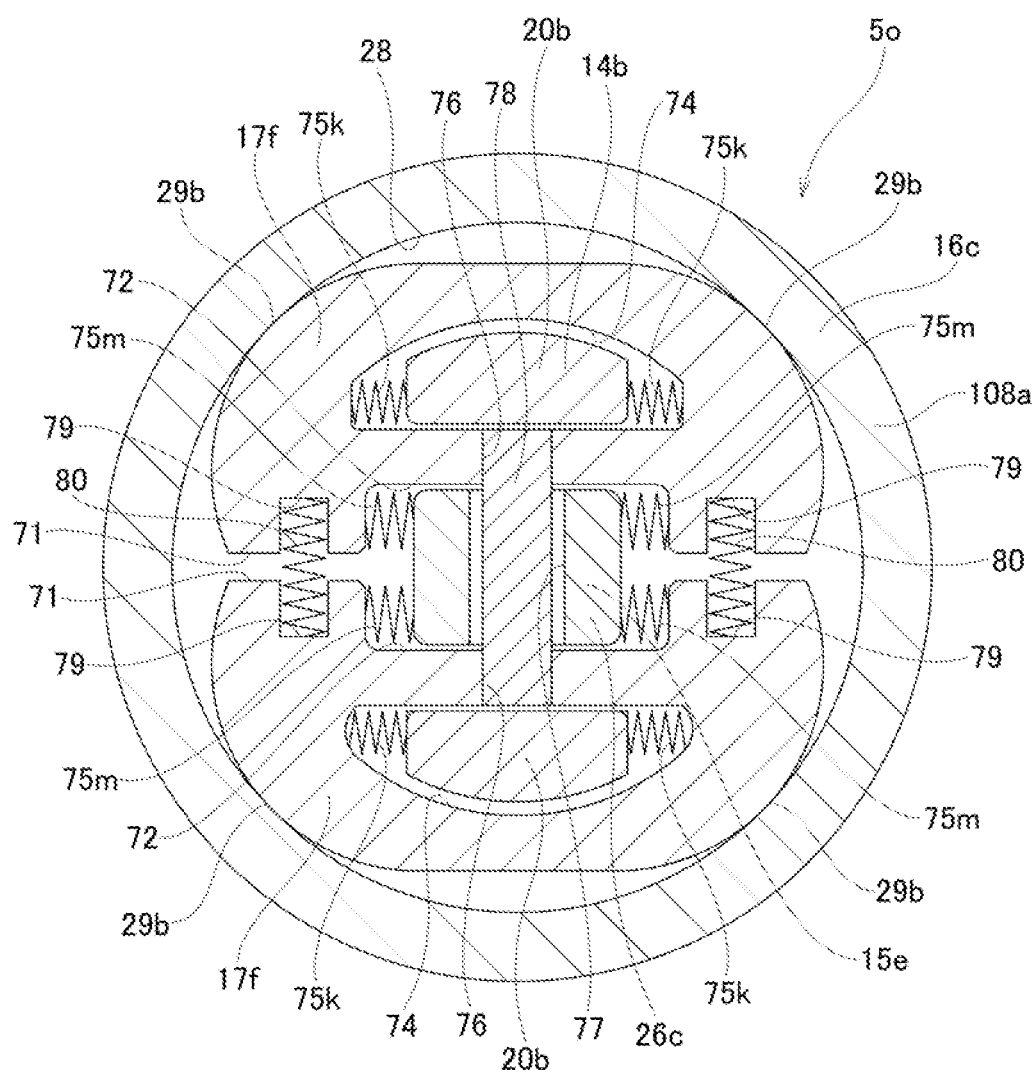
FIG. 47 is a view illustrating a reverse input blocking clutch according to a tenth example of an embodiment of the third aspect.

A tenth example of an embodiment of the third aspect of the present invention will be described with reference to FIG. 47.

This example is a modified example of the sixth example (see FIG. 42) of an embodiment of the third aspect. In the reverse input blocking clutch 5o of this example, the gap adjusting members 75k that are arranged between the input engaging portions 20b and the inner surfaces of the engaging member side input engaging portions 74 are composed of a coil-shaped spring. For each of the engaging members 17f, one gap adjusting member 75k is arranged on each side of the input engaging portion 20b in the circumferential direction. More specifically, each of the gap adjusting members 75k is arranged so as to span the side surfaces in the circumferential direction of the input engaging portion 20b and the end portions in the circumferential direction of the inner surface of the engaging member side input engaging portion 74.

In this example, the gap adjusting members 75m arranged between the output engaging portion 26c and the inner surfaces of the engaging member side output engaging portions 72 are also composed of coil-shaped springs. For each of the engaging members 17f, one gap adjusting member 75m is arranged on both sides in the longitudinal direction of a half portion in the lateral direction of the output engaging portion 26c. More specifically, each of the gap adjusting members 75m is arranged so as to span between the side surface in the longitudinal direction of a half portion in the lateral direction of the output engaging portion 26c and the inner side surface of the inner surface of the engaging member side output engaging portion 72.

In the reverse input blocking clutch 5o of this example, in a no-load state in which no rotational torque is applied to the input member 14b or the output member 15e, it is possible to suppress looseness in the direction of rotation between the input engaging portions 20b and the respective engaging members 17f due to the elastic force of the gap adjusting members 75k arranged between the input engaging portions 20b and the inner surfaces of the engaging member side input engaging portions 74. Moreover, in the no-load state, it is possible to suppress looseness in the direction of rotation between the output engaging portion 26c and the engaging members 17f due to the elastic force of the gap adjusting members 75m that are arranged between the output engaging portion 26c and the inner surfaces of the engaging member side output engaging portions 72. Furthermore, in the no-load state, it is possible to return the positional relationship in the direction of rotation between the input member 14b and the output member 15e to the neutral position by the elastic force of the gap adjusting members 75k, 75m.

In this example, in a case where rotational torque is inputted to the input member 14b or in a case where rotational torque is reversely inputted to the output member 15e, the gap adjusting members 75k are not strongly held between the inner side surfaces in the radial direction of the input engaging portions 20b and the inner surface of the engaging member side input engaging portions 74, and the gap adjusting members 75m are not strongly held between the corner portions of the output engaging portion 26c and the bottom portions of the engaging member side output engaging portions 72. Therefore, the backlash between the input member 14b and the output member 15e does not change over time due to the wear of the gap adjusting members 75k and 75m.

In this example, in a case where rotational torque is inputted to the input member 14b, the gap adjusting members 75k and 75m each deforms elastically, so it is possible to alleviate impact acting between the input engaging portions 20b and the output engaging portion 26c, and the respective engaging members 17f. Furthermore, in a case where rotational torque is reversely inputted to the output member 15e, the gap adjusting members 75m elastically deform, so it is possible to alleviate impact acting between the output engaging portion 26c and the pressed member 16b, and the respective engaging members 17f. In this example, the loads on the gap adjusting members 75k and 75m are only the stresses caused by the elastic deformation. Therefore, the strengths of the gap adjusting members 75k and 75m need only be determined in consideration of the stress alone, and the gap adjusting members 75k and 75m have high durability. Other configurations and operations are the same as in the sixth example of an embodiment of the third aspect.

Eleventh Example of Embodiment of Third Aspect

Figure 48:
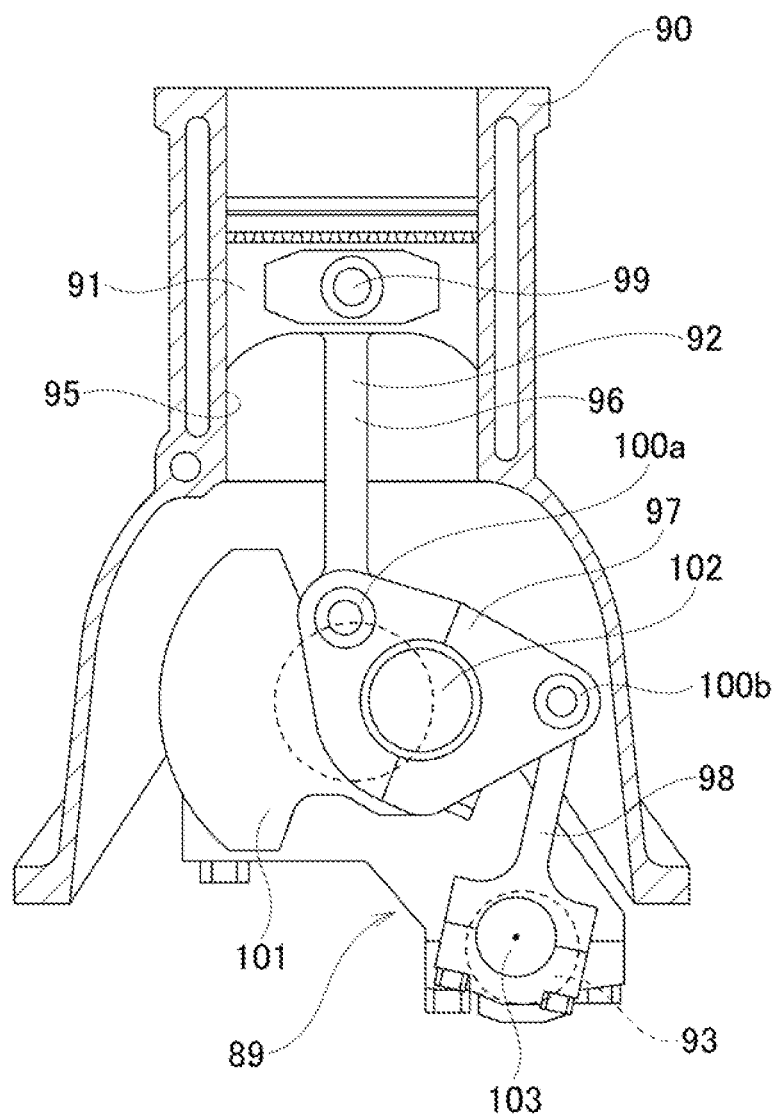
FIG. 48 is a cross-sectional view illustrating a variable compression ratio device of an eleventh example of an embodiment of the third aspect.
Figure 49:
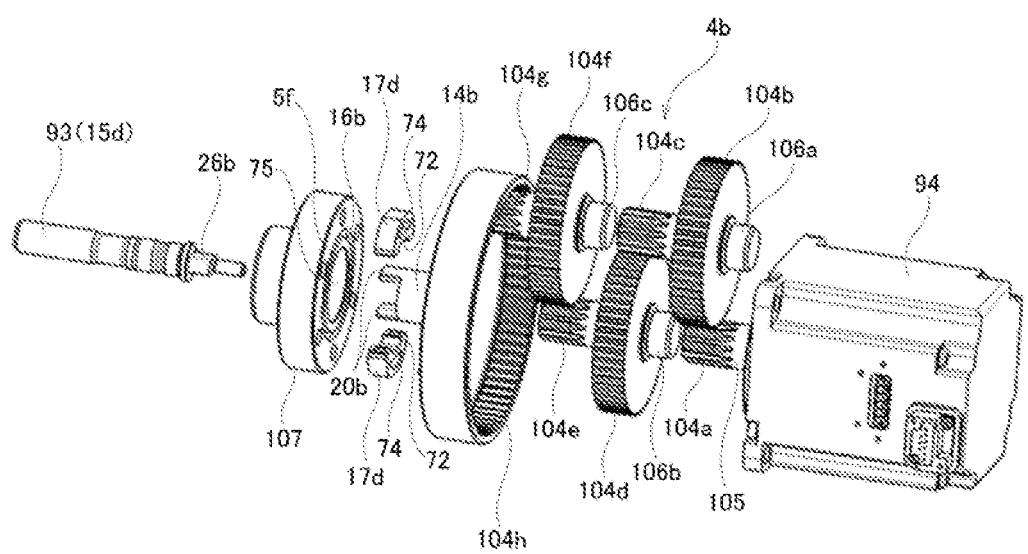
FIG. 49 is a partial perspective view illustrating the main parts of the variable compression ratio device of the eleventh example of an embodiment of the third aspect.

An eleventh example of an embodiment of the third aspect of the present invention will be described with reference to FIGS. 48 and 49. A feature of this example is that the reverse input blocking clutch 5f is applied to a variable compression ratio device 89. Hereinafter, the variable compression ratio device 89 of this example will be described in detail.

The variable compression ratio device 89 is incorporated in an internal combustion engine (engine) 90, and the engine compression ratio may be changed by changing the top dead center position and the bottom dead center position of the piston 91. The variable compression ratio device 89 of this example includes a link mechanism 92, a control shaft 93, an electric motor 94, a reduction mechanism 4b, and a reverse input blocking clutch 5f described in the first example of an embodiment of the third aspect.

The link mechanism 92 is connected to the piston 91 arranged in a cylinder 95 of the internal combustion engine 90 to move the piston 91 in the vertical direction, and has an upper link 96, a lower link 97, and a control link 98. The upper link 96 is connected to the piston 91 via a piston pin 99 and is connected to the lower link 97 via a first connecting pin 100a. The lower link 97 is rotatably attached to a crank pin 102 of a crankshaft 101 and is connected to the control link 98 via a second connecting pin 100b. The control link 98 is supported by an eccentric shaft portion 103 provided on the control shaft 93. The posture of the link mechanism 92 having such a configuration is changed by rotating the control shaft 93, which changes the top dead center position and the bottom dead center position of the piston 91. Note that the number of upper links 96, lower links 97, and control links 98 of the link mechanism 92 is the same as that of the cylinder 95.

The control shaft 93 is arranged parallel to the crankshaft 101 and is rotatably supported by bearings (not illustrated). The control shaft 93 is rotationally driven by the electric motor 94, and by changing the rotation phase thereof, the top dead center position and the bottom dead center position of the piston 91 are changed.

In this example, the reduction mechanism 4b and the reverse input blocking clutch 5f are arranged between the electric motor 94 and the control shaft 93. In the illustrated example, the reduction mechanism 4b is a high-efficiency parallel shaft gear reduction mechanism, and includes a plurality of (eight in the illustrated example) gears 104a to 104h that reduce and output the rotation of the electric motor 94. More specifically, the reduction mechanism 4b includes a first gear 104a as an input gear, a second gear 104b, a third gear 104c, a fourth gear 104d, a fifth gear 104e, a sixth gear 104f, and a seventh gear 104g as intermediate gears, and an eighth gear 104h as an output gear. The first gear 104a to the seventh gear 104g are external gears having teeth on the outer circumferential surface, and the eighth gear 104h is an internal gear having teeth on the inner circumferential surface.

The first gear 104a, which is an input gear, is provided at the tip end portion of the output shaft 105 of the electric motor 94. The second gear 104b and the third gear 104c are provided on a first intermediate shaft 106a arranged in parallel with the output shaft 105 of the electric motor 94. The fourth gear 104d and the fifth gear 104e are provided on a second intermediate shaft 106b arranged coaxially with the output shaft 105 of the electric motor 94. The sixth gear 104f and the seventh gear 104g are provided on a third intermediate shaft 106c arranged in parallel with the output shaft 105 of the electric motor 94. The eighth gear 104h is arranged coaxially with the output shaft 105 of the electric motor 94. The reduction mechanism 4b reduces the rotational movement of the output shaft 105 of the electric motor 94 in four stages by the first gear 104a and the second gear 104b, the third gear 104c and the fourth gear 104d, the fifth gear 104e and the sixth gear 104f, and the seventh gear 104g and the eighth gear 104h engaging with each other. As a result, the reduction mechanism 4b is able to have a large reduction ratio, so the electric motor 94 used in combination with the speed reduction mechanism 4b may be smaller.

In this example, the reverse input blocking clutch 5f is arranged between the reduction mechanism 4b connected to the electric motor 94 and the control shaft 93. The basic configuration of the reverse input blocking clutch 5f is the same as the structure of the first example of an embodiment of the third aspect. In particular, in this example, the input member 14b of the reverse input blocking clutch 5f is coaxially fixed to the eighth gear 104h, which is the output gear of the reduction mechanism 4b. As a result, the input member 14b is arranged coaxially with the output shaft 105 of the electric motor 94 so as to rotate in synchronization with the eighth gear 104h. Moreover, the output member 15d of the reverse input blocking clutch 5f is integrally formed with the control shaft 93. The output engaging portion 26b is provided at the base end portion of the control shaft 93. The rotation of the annular-shaped pressed member 16b of the reverse input blocking clutch 5f is restricted via the support bracket 107 arranged around the pressed member 16b. A pair of engaging members 17d are arranged between the output engaging portion 26b and the pressed surface 28a formed on the inner circumferential surface of the pressed member 16b so as to hold the output engaging portion 26b from both sides in the radial direction. Furthermore, the input engaging portions 20b that are provided on the tip end portion of the input member 14b are loosely inserted into the inner side of engaging member side input engaging portions 74 formed in intermediate portions in the radial direction of the engaging members 17d.

The variable compression ratio device 89 of this example reduces the rotation of the electric motor 94 by the reduction mechanism 4b and transmits the rotation to the input member 14b of the reverse input blocking clutch 5f. At this time, the output of the electric motor 94 is amplified by the reduction mechanism 4b. When a rotational torque is inputted to the input member 14b, the pair of engaging members 17d move toward the inner side in the radial direction so as to approach each other due to engagement between the engaging member side input engaging portions 74 and the input engaging portions 20b, an by the output engaging portion 26b engaging with the pair of engaging member side output engaging portions 72, transmit mostly all of the rotational torque inputted to the input member 14b to the control shaft 93 (output member 15d). By controlling the rotation phase of the control shaft 93, the posture of the link mechanism 92 is changed to a posture corresponding to the rotation phase of the control shaft 93. As a result, it becomes possible to change the top dead center position and the bottom dead center position of the piston 91 and change the engine compression ratio according to the performance required for the internal combustion engine 90. In this example, a high-efficiency parallel shaft gear reduction mechanism is used as the reduction mechanism 4b, so it is possible to finely control the rotation phase of the control shaft 93 and finely adjust the posture of the link mechanism 92.

When rotational torque is reversely inputted from the control shaft 93 to the reverse input blocking clutch 5f, the variable compression ratio device 89 of this example, transmits only a part of the reversely inputted rotational torque to the electric motor 94 via the input member 14b and the reduction mechanism 4b and blocks the remaining part. In other words, the remaining part of the rotational torque is consumed by sliding the pressing surfaces 29 with respect to the pressed surface 28a. Therefore, the energy consumption (electric energy) required for the electric motor 94 is reduced as compared with the case where the rotational torque reversely inputted from the control shaft 93 is held only by the electric motor 94 without providing the reverse input blocking clutch 5f. Accordingly, the operating cost of the variable compression ratio device 89 may be reduced. Even in a case where the electric motor 94 fails, when an assist torque due to the combustion load is reversely inputted to the control shaft 93, the reverse input blocking clutch 5f may allow a part of the assist torque to pass, so the control shaft 93 is allowed to rotate, and the rotation phase of the control shaft 93 may be changed. Therefore, when engine operation is continued, it becomes possible to automatically change the engine compression ratio to the low compression ratio side, and abnormal combustion such as knocking or the like may be prevented from occurring.

In the reverse input blocking clutch 5f incorporated in the variable compression ratio device 89 of this example, the backlash between the input member 14b and the output member 15d is kept small by the gap adjusting members 75 of the pressed member 16b. The reverse input blocking clutch 5f is able to transmit the reverse operation of the direction of rotation of the electric motor 94 to the control shaft 93 with high responsiveness. Therefore, the rotation phase of the control shaft 93 may be controlled, or in other words, the change of the engine compression ratio may be controlled with high responsiveness. Accordingly, when the engine compression ratio is shifted from the high compression ratio side to the low compression ratio side, for example, when the vehicle is suddenly accelerated or the like, it is possible to prevent the electric motor 94 from delaying the shift to the low compression ratio side with respect to the increase in the output of the internal combustion engine 90. As a result, transient knocking due to such a delay is prevented.

In this example, an example in which a parallel shaft gear reduction mechanism provided with an external gear and an internal gear is used as the reduction mechanism 4b is described; however, the reduction mechanism 4b is not limited to such a parallel shaft gear reduction mechanism, and in addition to such a parallel shaft gear reduction mechanism, a reduction mechanism having various known structures such as a parallel shaft gear reduction mechanism provided with helical gears, a planetary gear reduction mechanism, a cycloidal reduction mechanism, and a harmonic drive (registered trademark) reduction mechanism or the like may be used. If the output torque (output power) of the electric motor 94 has a margin, the reduction mechanism 4b may be omitted and the electric motor 94 and the reverse input blocking clutch 5f may be directly connected. Further, it is also possible to change only one of the top dead center position and the bottom dead center position of the piston 91 according to the performance required for the internal combustion engine 90. Other configurations and operations are the same as in the first example of an embodiment of the third aspect. Note that in regard to the reverse input blocking clutch to be incorporated in the variable compression ratio device, the structures of the second to tenth examples of the embodiment of the third aspect may be additionally or alternately applied.

The structures of the examples of an embodiment of this third aspect may be appropriately combined and implemented as long as technical inconsistencies do not occur.

First Example of Embodiment of Fourth Aspect

Figure 50:
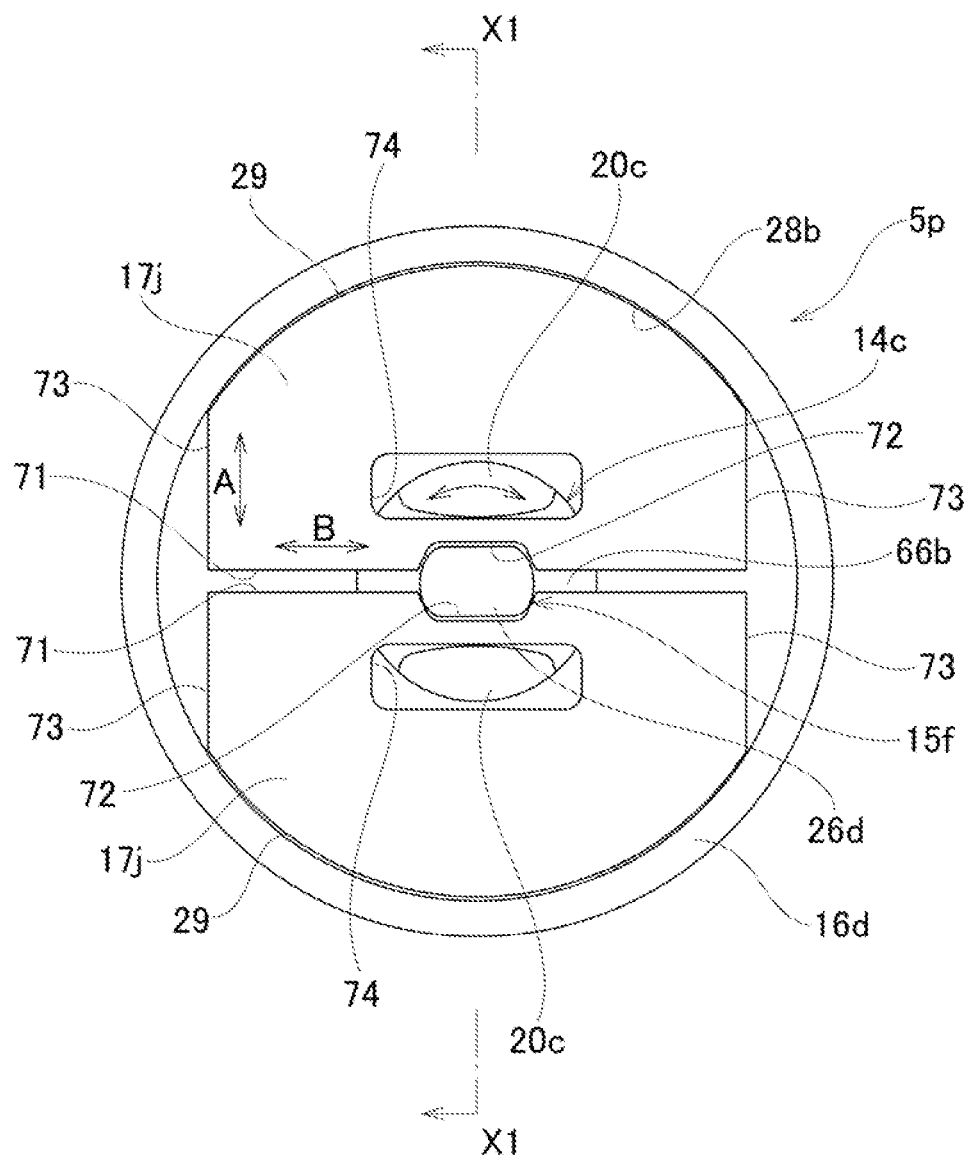
FIG. 50 is a view illustrating a reverse input blocking clutch according to a first example of an embodiment of a fourth aspect of the present invention.
Figure 58:
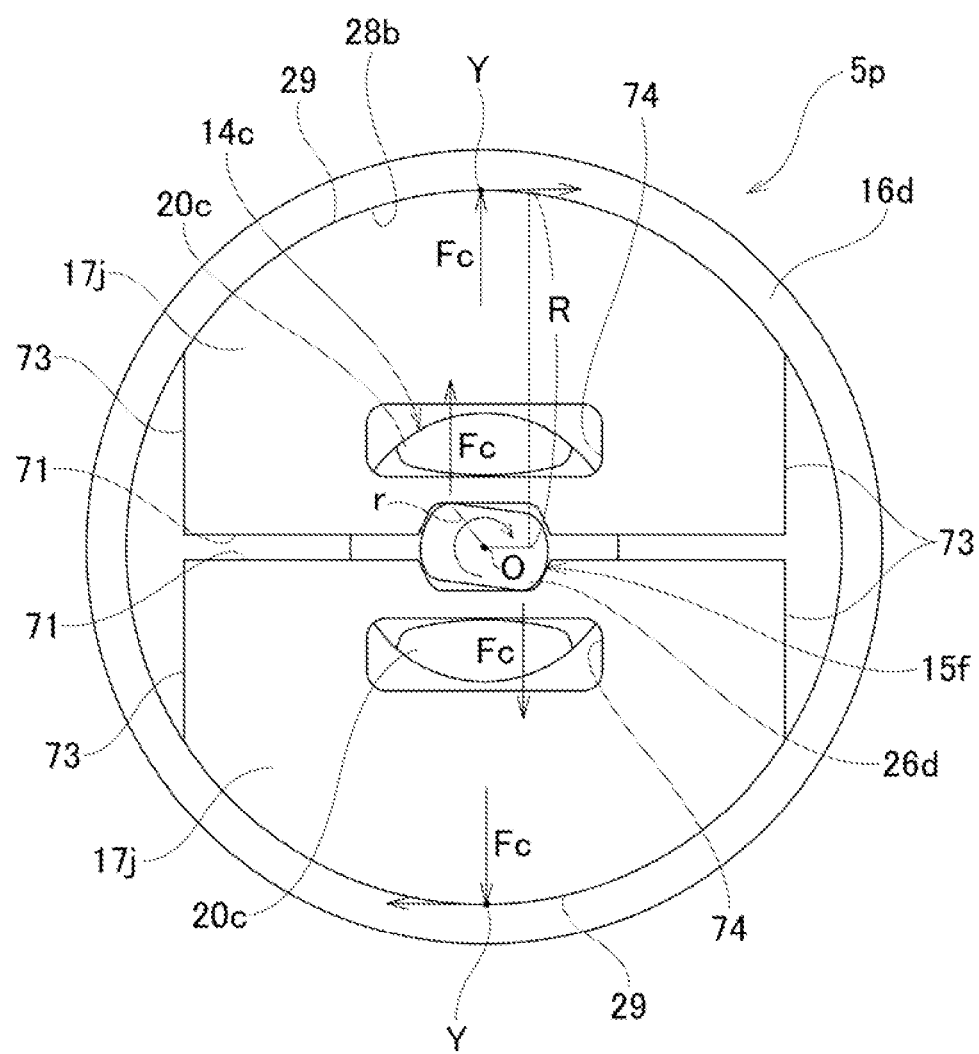
FIG. 58 is a diagram for explaining a condition in which the output member is locked or half-locked when rotational torque is reversely inputted to the output member.

A first example of an embodiment of a fourth aspect of the present invention will be described with reference to FIGS. 50 and 58.

The reverse input blocking clutch 5p of this first example of an embodiment of the fourth aspect of the present invention includes:

a pressed member 16d having a pressed surface 28b;
an input member 14c having a center axis of rotation O and at least one input engaging portion 20c;
an output member 15f having a center axis of rotation O that is coaxial with the center axis of rotation O of the input member 14c and an output engaging portion 26d; and
at least one engaging member 17j having at least one pressing surface 29 that faces the pressed surface 28b, an engaging member side input engaging portion 74 that engages with the input engaging portion 20c, and an engaging member side output engaging portion 72 that engages with the output engaging portion 26b.

The reverse input blocking clutch 5p of this first example of an embodiment of the fourth aspect is configured so that when a rotational torque is inputted to the input member 14c, the engaging members 17j displace so as to cause the pressing surfaces 29 to separate from the pressed surface 28b due to the engagement between the input engaging portions 20c and the engaging member side input engaging portions 74, and by the engaging member side output engaging portions 72 engaging with the output engaging portion 26d, transmits the rotational torque that is inputted to the input member 14c to the output member 15f; and when a rotational torque is reversely inputted to the output member 15f, the engaging members 17j displace so as to press the pressed surfaces 29 against the pressed surface 28b due to the engagement between the output engaging portion 26d and the engaging member side output engaging portions 72, causing friction engagement between the pressing surfaces 29 and the pressed surface 28b.

In particular, in the reverse input blocking clutch 5p of this first example of an embodiment of the fourth aspect, an intermediate member is arranged at least in one of the portion between the engaging member 17d and the pressed member 16b, the portion between the input engaging portion 20b and the engaging member side input engaging portions 74, and the portion between the output engaging portion 26b and the engaging member side output engaging portions 72.

In the reverse input blocking clutch 5p of the first example of an embodiment of the fourth aspect, a lubricant for lubricating the contact portions between the pressed surface 28b and the pressing surfaces 29, particularly traction oil or traction grease, is used as an intermediate member. Hereinafter, the reverse input blocking clutch 5p of the first example of an embodiment of the fourth aspect will be described in detail.

The reverse input blocking clutch 5p of this example is a lock type reverse input blocking clutch, and includes an input member 14c, an output member 15f, a pressed member 16d, and a pair of engaging members 17j.

Figure 51:
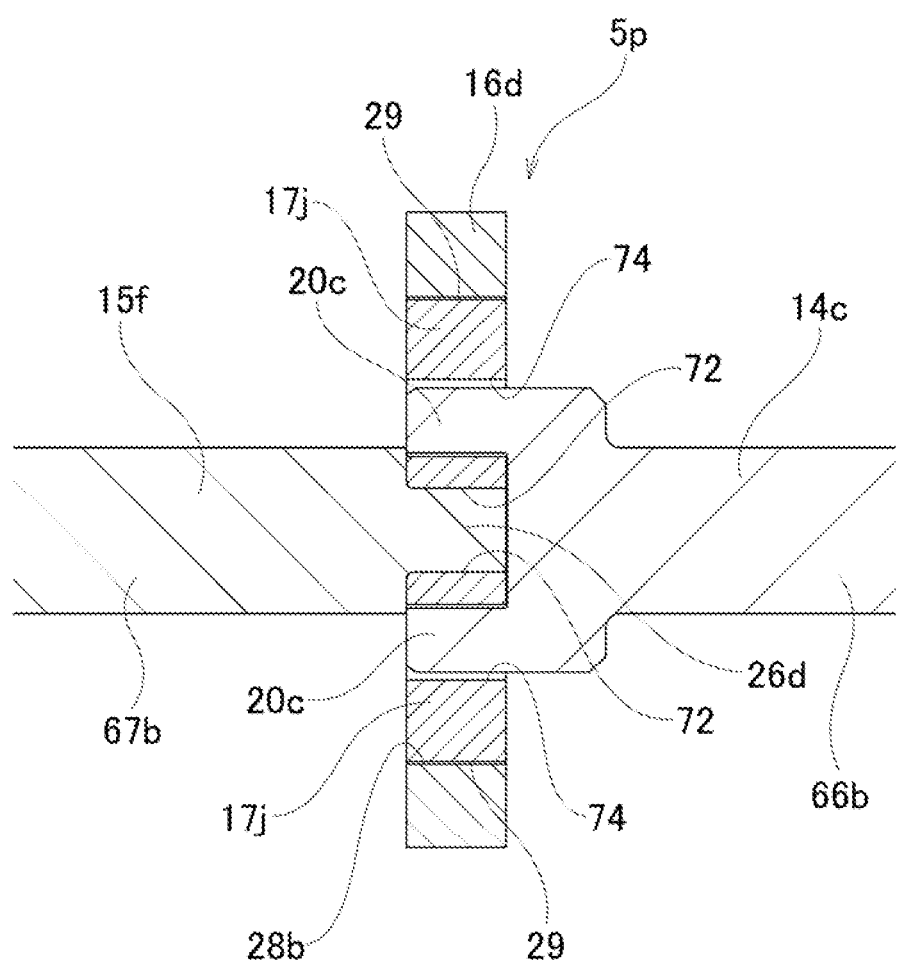
FIG. 51 is a cross-sectional view taken along the line X1-X1 of FIG. 50.
Figure 53:
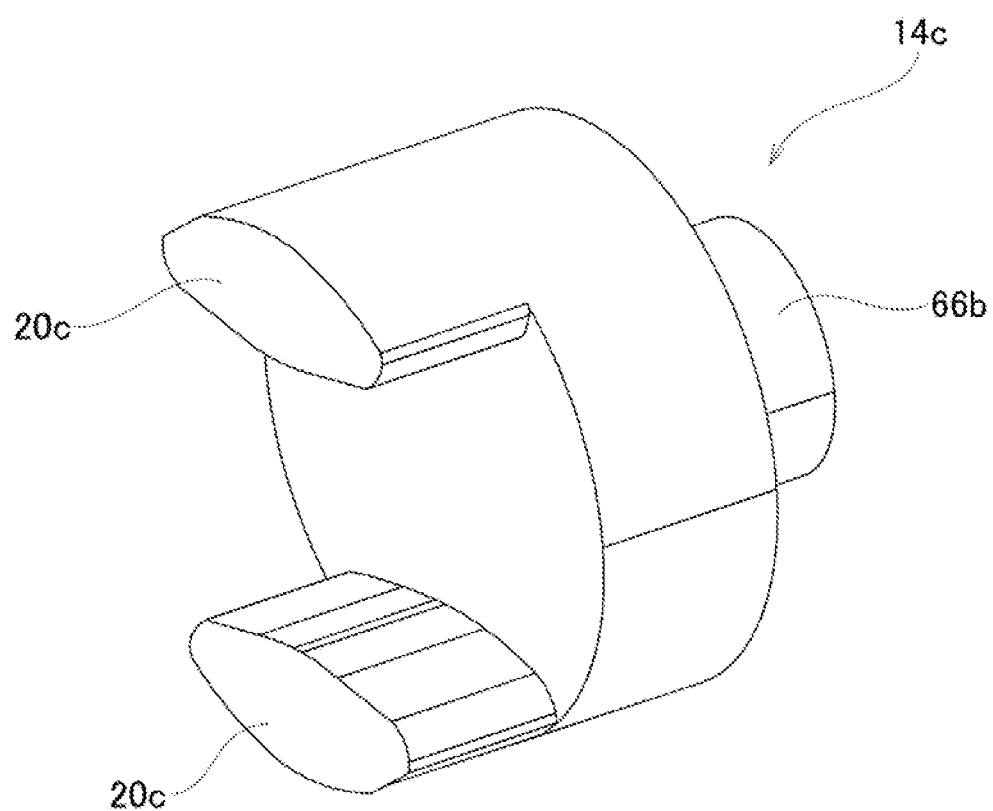
FIG. 53 is a perspective view illustrating a part of an input member removed from the reverse input blocking clutch of the first example of an embodiment of the fourth aspect.

The input member 14c is connected to an input side mechanism such as an electric motor or the like, and rotational torque is inputted thereto. As illustrated in FIGS. 51 and 53, the input member 14c has an input shaft portion 66b and a pair of input engaging portions 20c. The input shaft portion 66b has a stepped columnar shape, and the base end portion thereof is connected to the output portion of the input side mechanism or is provided integrally with the output portion of the input side mechanism so as to be able to transmit torque. The pair of input engaging portions 20c has a substantially elliptical columnar shape, and is composed of convex portions extending in the axial direction from two positions on opposite sides in the diametrical direction of the tip end surface of the input shaft portion 66b. Each input engaging portion 20c of the pair of input engaging portions 20c is separated from each other in the diametrical direction of the input member 14c. Each of the input engaging portions 20c is arranged on a portion of the tip end surface of the input shaft portion 66b that is separated toward the outside in the radial direction from the center axis of rotation O. Each input engaging portion 20c is configured so that the outer side surface in the radial direction thereof has the same cylindrical contour shape as the outer circumferential surface of the tip end portion of the input shaft portion 66b, and the inner side surface in the radial direction thereof is an arc-shaped convex surface, the central portion in the circumferential direction protruding inward in the radial direction.

Figure 54:
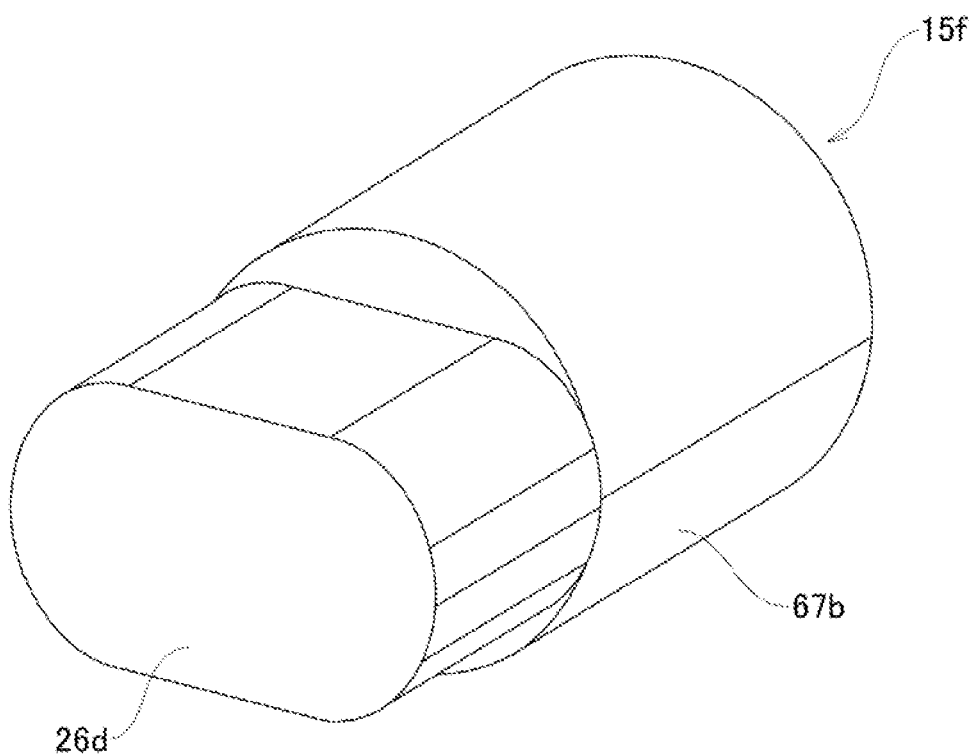
FIG. 54 is a perspective view illustrating a part of an output member removed from the reverse input blocking clutch of the first example of an embodiment of the fourth aspect.
Figure 55:
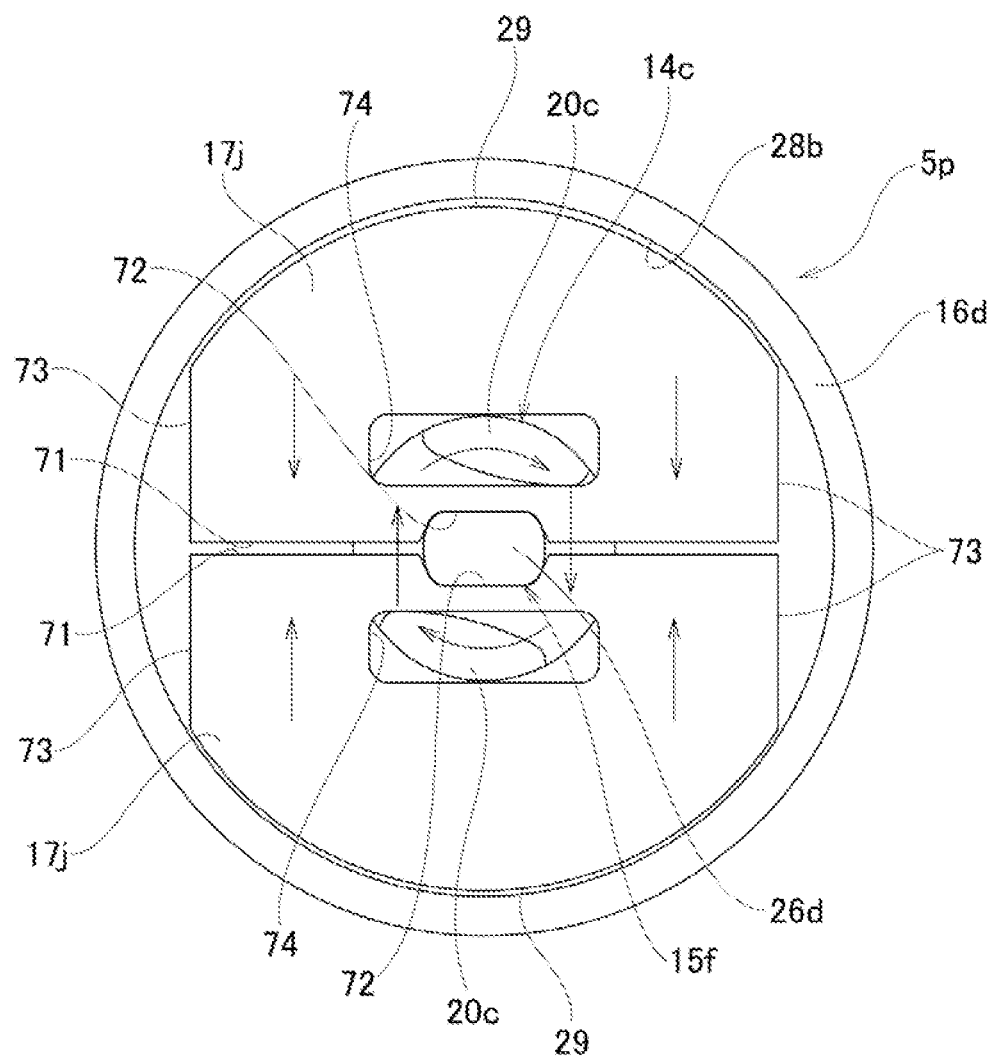
FIG. 55 relates to the reverse input blocking clutch according to the first example of an embodiment of the fourth aspect, and illustrates a state in which rotational torque is inputted to the input member.
Figure 56:
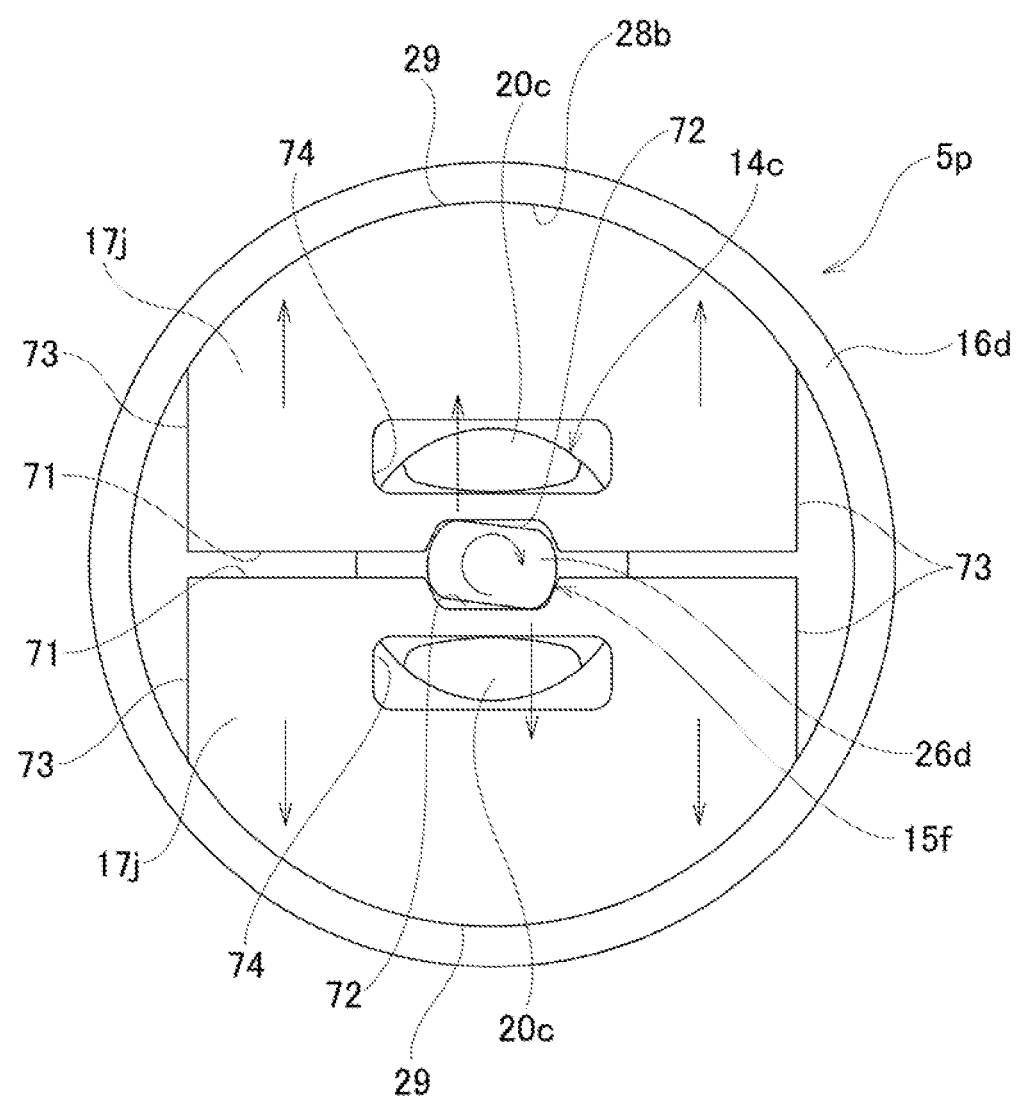
FIG. 56 relates to the reverse input blocking clutch according to the first example of an embodiment of the fourth aspect, and illustrates a state in which rotational torque is inputted to the output member.
Figure 57:
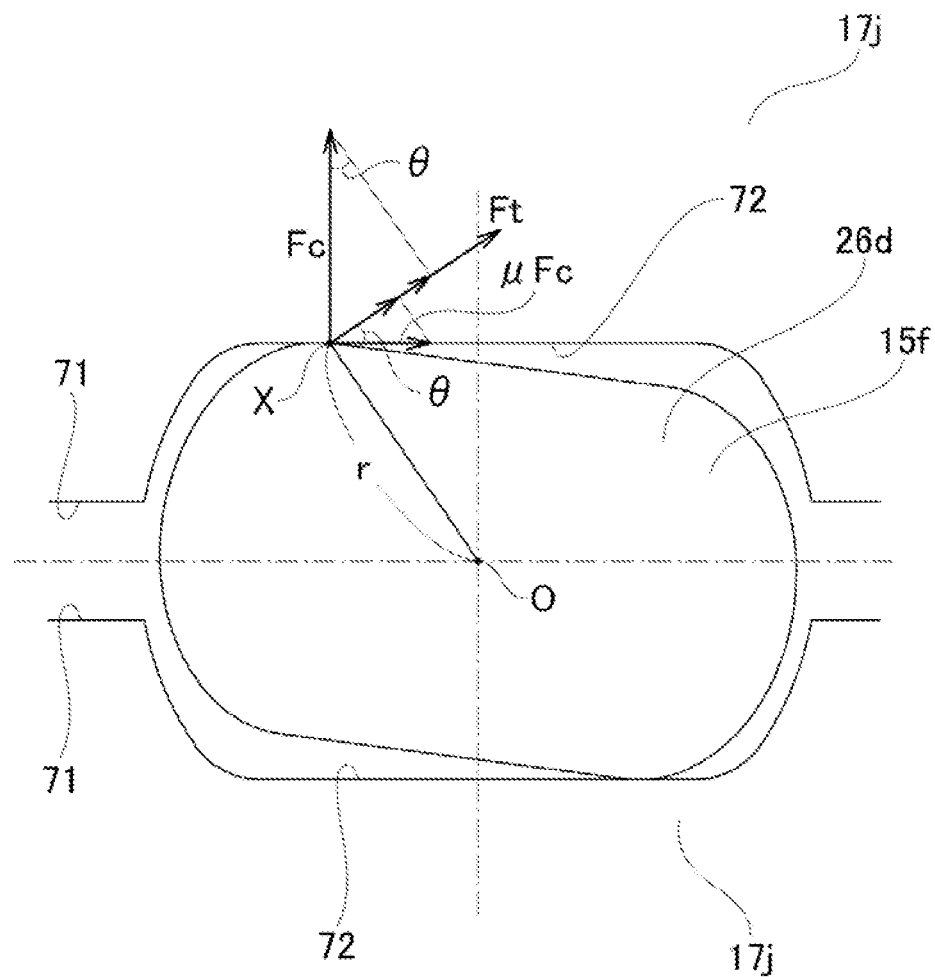
FIG. 57 is a partial enlarged view of FIG. 56 and illustrates the relationship with the force acting on the engaging member from the output member when the rotational torque is reversely inputted to the output member.

The output member 15f is connected to an output side mechanism such as a reduction mechanism or the like and outputs rotational torque. The output member 15f is arranged coaxially with the input member 14c, and as illustrated in FIGS. 51 and 54, has an output shaft portion 67b and an output engaging portion 26d. The output shaft portion 67b is cylindrical, and its tip end portion thereof is connected to the input portion of the output side mechanism or is provided integrally with the input portion of the output side mechanism so as to be able to transmit torque. The output engaging portion 26d has a cam function. Therefore, the distance from the center axis of rotation O of the output member 15f to the outer circumferential surface of the output engaging portion 26d is not constant in the circumferential direction. In this example, the output engaging portion 26d has a substantially elongated columnar shape and extends in the axial direction from the central portion of the base end surface of the output shaft portion 67b. The outer circumferential surface of the output engaging portion 26d is composed of a pair of flat surfaces parallel to each other and a pair of arc-shaped convex surfaces. Therefore, the distance from the center axis of rotation O of the output engaging portion 26d to the outer circumferential surface is not constant in the circumferential direction. The output engaging portion 26d is arranged in a portion between the pair of input engaging portions 20c.

Figure 52:
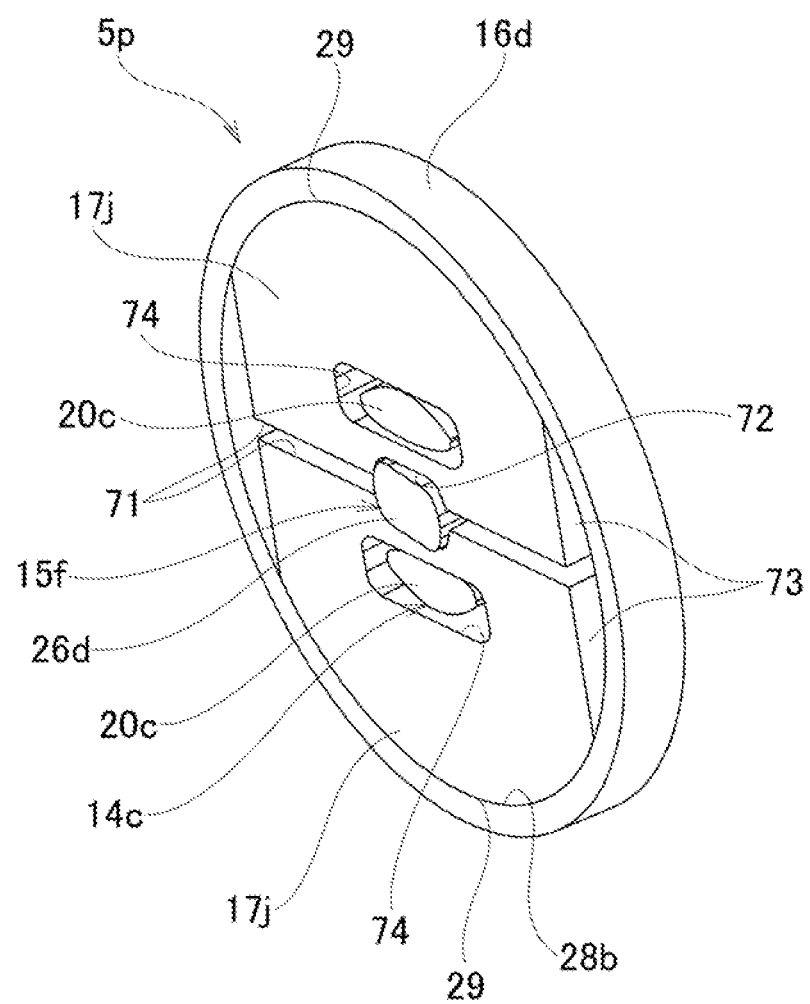
FIG. 52 is a perspective view of the reverse input blocking clutch of the first example of an embodiment of the fourth aspect.

As illustrated in FIGS. 51 and 52, the pressed member 16d has a thin-walled annular shape, is fixed to another member (not illustrated) such as a housing or the like, and the rotation thereof is restricted. The pressed member 16d is arranged coaxially with the input member 14c and the output member 15f, and is arranged further on the outer side in the radial direction than the input member 14c and the output member 15f. More specifically, in the assembled state of the reverse input blocking clutch 5p, the pair of input engaging portions 20c and the output engaging portion 26d are arranged on the inner side in the radial direction of the pressed member 16d. The pressed member 16d has a pressed surface 28b on the inner circumferential surface thereof that is a cylindrical concave surface.

The pair of engaging members 17j are formed in a substantially semicircular plate shape, and are arranged on the inner side in the radial direction of the pressed member 16d. Of each of the engaging members of the pair of engaging members 17j, the outer side surface in the radial direction that is pressed against the pressed surface 28b is a pressing surface 29 that is a cylindrical convex surface, and the inner side surface in the radial direction thereof is composed of a bottom surface 71 that is flat except for the portion where the engaging member side output engaging portion 72 is formed. Both sides of each engaging member 17j in the width direction are composed of flat surface-shaped side surfaces 73 that are perpendicular to the bottom surface 71. Note that the radial direction of the engage member 17j means a direction perpendicular to the bottom surface 71 indicated by the arrow A in FIG. 50, and the width direction of the engaging member 17j is a direction parallel to the bottom surface 71 indicated by the arrow B in FIG. 50. The radius of curvature of the pressing surface 29 is equal to or less than the radius of curvature of the pressed surface 28b. The pressing surface 29 has a surface texture having a larger coefficient of friction than the other parts of the engaging member 17j. The pressing surface 29 may be directly formed by the surface of the engaging member 17j, or may be formed of a friction material fixed to the engaging member 17j by sticking, adhesion or the like.

In this example, the pressing surfaces 29 of the engaging members 17d are directed to opposite sides in the radial direction of the pressed member 16d, and the bottom surfaces 71 of the engaging members 17j face each other. In a state in which the pair of engaging members 17f are arranged on the inner side in the radial direction of the pressed member 16d, the inner diameter dimension of the pressed member 16d and the radial dimension of engaging members 17j are regulated so that there is a gap in at least one of the portions between the pressed surface 28a and the pressing surfaces 29 and the portion between the bottom surfaces 71.

The engaging member 17j has an engaging member side input engaging portion 74 and an engaging member side output engaging portion 72. The engaging member side input engaging portion 74 is composed of a through hole that penetrates in the axial direction through the intermediate portion in the radial direction of the engaging member 17j, and is a long rectangular shaped hole that is long in the width direction. The engaging member side input engaging portion 74 has a size so as to be able to be loosely inserted through the input engaging portion 20c. More specifically, in a state in which the input engaging portion 20c of the input member 14c is inserted through the inner side of the engaging member side input engaging portion 74, there are gaps in the width direction and the radial direction of the engaging member 17j between the input engaging portion 20c and the inner surface of the engaging member side input engaging portion 74. Therefore, the input engaging portion 20c may be displaced with respect to the engaging member side input engaging portion 74 (engaging member 17j) in the direction of rotation of the input member 14c, and the engaging member side input engaging portion 74 may be displaced in the radial direction of the engaging member 17j with respect to the input engaging portion 20c.

The engaging member side output engaging portion 72 is composed of a rectangular shaped recess portion that is recessed outward in the radial direction from the central portion in the width direction of the bottom surface 71 of each engaging member 17j of the pair of engaging members 17j. The engaging member side output engaging portion 72 has a size and a shape so that the half portion of the output engaging portion 26d of the output member 15f in the minor axis direction can be arranged without looseness inside the engaging member side output engaging portion 72. More specifically, the engaging member side output engaging portion 72 has an opening width having substantially the same (same or slightly larger) dimension in the longitudinal direction as the output engaging portion 26d, and has a depth in the radial direction that is slightly smaller than ½ of the diameter of the output engaging portion 26d in the minor axis direction. The bottom portion of the engaging member side output engaging portion 72 is a flat surface parallel to the bottom surface 71.

In the assembled state of the reverse input blocking clutch 5p of this example, the pair of input engaging portions 20c of the input member 14c arranged on one side in the axial direction are inserted in the axial direction into the engaging member side input engaging portions 74 of the pair of engaging members 17j, and the output engaging portion 26d of the output member 15f arranged on the other side in the axial direction is inserted in the axial direction between the pair of engaging member side output engaging portions 72. In other words, the pair of engaging members 17j are arranged so as to sandwich the output engaging portion 26d from the outside in the radial direction by the engaging member side output engaging portions 72 of each of the engaging members 17j. In this example, the axial dimension of the input engaging portion 20c, the axial dimension of the output engaging portion 26d, the axial dimension of the pressed member 16d, and the axial dimension of the engaging member s17j are mostly the same.

In this example, traction oil or traction grease is used as the lubricant for the reverse input blocking clutch 5p. Traction grease is a grease that uses traction oil as a base oil. Therefore, the mutual contact portion between the input member 14c, the output member 15e, the pressed member 16d, and the pair of engaging members 17j becomes a contact portion via an oil film of traction oil. Note that as the traction oil, it is preferable to use a traction oil having a traction coefficient of 0.1 or more, and examples thereof include naphthenic lubricating oil, paraffinic lubricating oil or the like.

The operation and function of the reverse input blocking clutch 5p of this example are illustrated in FIGS. 55 to 58; however, basically the operation and function are that same as that of the reverse input blocking clutch 5 in the first example of an embodiment of the first aspect, so the description here is omitted.

In this example, traction oil or traction grease is used as the lubricant for the reverse input blocking clutch 5p. Traction oil (base oil of traction grease) has a viscosity higher than that of ordinary lubricating oil when it is interposed as an oil film between members and the contact pressure between members (pressure of the oil film) is high. Therefore, in a case where a rotational torque is inputted to the input member 14c, a thick oil film of traction oil is formed in the contact portions between the input engaging portions 20c and the engaging member side input engaging portions 74, and in the contact portions between the engaging member side output engaging portions 72 and the output engaging portion 26d. Moreover, in a case where rotational torque is reversely inputted to the output member 15f, a thick oil film of traction oil is formed in the contact portions between the output engaging portion 26d and the engaging member side output engaging portions 72, and in the contact portions between the pressing surfaces 29 and the pressed surface 28b (and in the semi-locked state, in the contact portions between the input engaging portions 20c and the engaging member side input engaging portions 74). Therefore, the wear of these contact portions may be reduced, and the durability of the reverse input blocking clutch 5p may be improved.

In the reverse input blocking clutch 5p of this example, the coefficient of friction $\mu'$ between the pressing surfaces 29 and the pressed surface 28b when the output member 15f is locked or semi-locked is the traction coefficient of the traction oil that is not easily affected by temperature and deterioration. Therefore, the switching operation between the locked or semi-locked state and the released locked or semi-unlocked state can be performed more stably.

In the reverse input blocking clutch 5p of this example, traction oil or traction grease is used as the lubricant, so the coefficient of friction $\mu'$ between the pressing surfaces 29 and the pressed surface 28b may be increased as compared with a case in which ordinary lubricating oil is used as the lubricant. Therefore, as long as the distance R is the same, a larger brake torque T' may be obtained than when a normal lubricating oil is used as the lubricant. As a result, for example, the safety factor against slipping between the pressed surface 28b and the pressing surface 29a may be increased as compared with the case where ordinary lubricating oil is used as the lubricant. Moreover, in the reverse input blocking clutch 5p of this example, the distance R required to obtain a brake torque T' having the same magnitude as when ordinary lubricating oil is used as a lubricant may be reduced, so the reverse input blocking clutch 5p can be made smaller. The other configurations and operations are the same as those of the first example of an embodiment of the first aspect and the first example of an embodiment of the third aspect.

In a case of implementing the present invention, at least one surface of the pressed surface of the pressed member and the pressing surfaces of the engaging members may be configured by a fine uneven shape in which a large number of fine grooves, dimples, or the like are formed (texture processed portion). In this case, the contact area between the pressed surface and the pressing surface may be reduced by the amount of the concave portions of this uneven shape, and it is possible to increase the contact surface pressure between the pressed surface and the pressing surface, so a larger brake torque may be obtained by increasing the traction coefficient between the pressed surface and the pressing surface. Furthermore, the traction oil can be easily held in the concave portions of the unevenly shaped portion.

In this example, traction oil or traction grease is applied as the lubricant; however, the reverse input blocking clutch of the present invention may be implemented using a lubricant other than traction oil or traction grease such as ordinary lubricating oil or the like, and may be implemented without the use of a lubricant.

The reverse input blocking clutch of this fourth aspect may be used in an actuator using an electric motor as a drive source, by being incorporated between the electric motor and a driven portion driven by the electric motor. In this case, the driven portion may be driven with high efficiency by an electric motor, however, in a case where the rotational torque is reversely inputted from the driven portion side, by locking the reverse input blocking clutch, the position of the driven portion may be maintained without requiring power to be consumed by the electric motor. Therefore, it is possible to achieve an actuator having high efficiency and low power consumption.

In addition, the reverse input blocking clutch of the present invention may be used by being incorporated in a variable compression ratio device that changes the piston process of an internal combustion engine of an automobile to make the engine compression ratio variable, an electric brake device, an electric door device, a steering device or the like.

Second Example of Embodiment of Fourth Aspect

Figure 59:
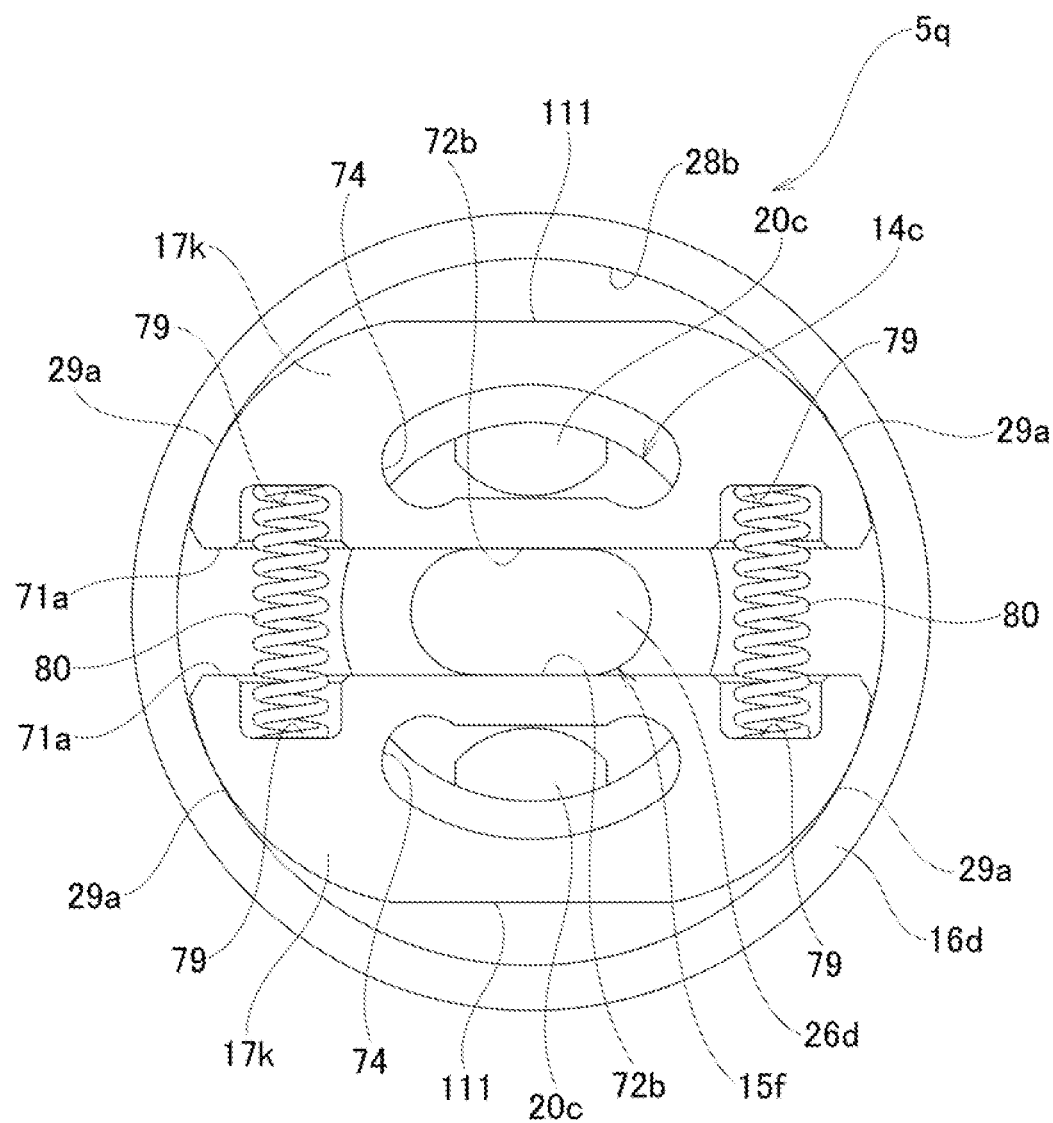
FIG. 59 is a view illustrating a reverse input blocking clutch according to a second example of an embodiment of the fourth aspect.
Figure 60:
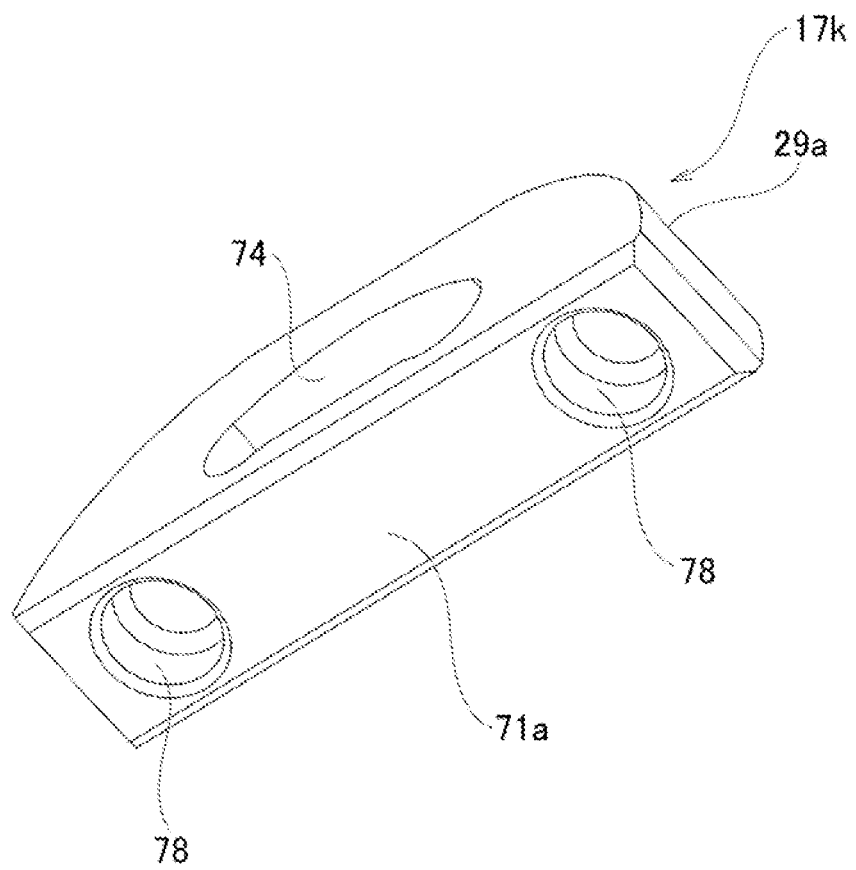
FIG. 60 is a perspective view illustrating only one engaging member that is removed from the reverse input blocking clutch of the second example of an embodiment of the fourth aspect.

A second example of an embodiment of the fourth aspect of the present invention will be described with reference to FIGS. 59 to 61.

Figure 61:
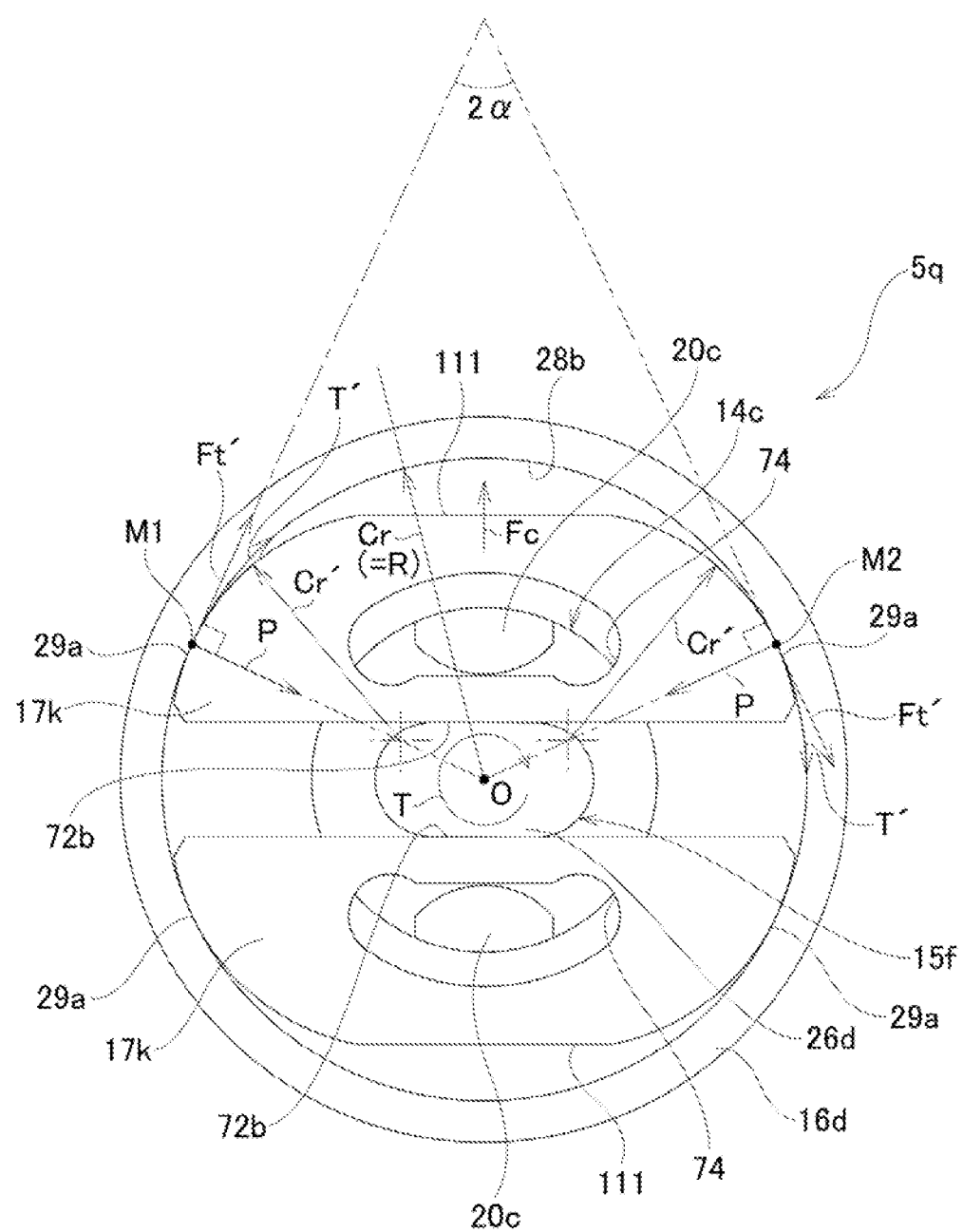
FIG. 61 relates to the reverse input blocking clutch according to the second example of an embodiment of the fourth aspect, and illustrates a relationship with the force that acts when rotational torque is inputted to the output member.

In the reverse input blocking clutch 5q of this example, each of the engaging members 17k of the pair of engagement elements 17k has a columnar guide recess 79 on both side portions in the width direction of the bottom surface 71a that recessed in a direction perpendicular to the bottom surface 71a (not illustrated in FIG. 61). Then, in a state in which the bottom surfaces 71a of the engaging members 17k face each other, a coiled spring 80 (not illustrated in FIG. 61) as an elastic member is arranged inside each of the two sets of guide recesses 79 existing on the same straight line so as to span the guide recesses 79 of each set. The elastic force exerted by the pair of coiled springs 80 causes the engaging members 17k to be biased toward the pressed surface 28b. As a result, the posture of the respective engaging members 17k are stabilized while being synchronized, so the movement in the radial direction of the engaging members 17k may be accurately performed. In this example, the inner side surface in the radial direction of each of the engaging member 17k is composed of a flat bottom surface 71a as a whole except for a portion where the guide recesses 79 are located, and the engaging member side output engaging portion 72b is provided at the center portion in the width direction of the bottom surface 71a.

In this example, each engaging member 17k has pressing surfaces 29a that are pressed against the pressed surface 28b at two positions on the outer side surface in the radial direction that are separated in the circumferential direction. Each of the pressing surfaces 29a is a cylindrical convex surface having a radius of curvature Cr' smaller than the radius of curvature Cr of the pressed surface 28b. Furthermore, each of the engaging members 17k has a flat-surface shape tip end surface 111 on the outer side surface in the radial direction in the center portion in the circumferential direction that is a portion between the pair of pressing surfaces 29a that is not pressed against the pressed surface 28b. In other words, there is always a gap between the tip end surface 111 and the pressed surface 28b.

In the reverse input blocking clutch 5q of this example, as illustrated in FIG. 61, when rotational torque is reversely inputted to the output member 15f and the normal force Fc acts on each of the engaging members 17k from the output engaging portion 26d, a pair of pressing surfaces 29a existing on the outer side surface in the radial direction of the engaging members 17k are pressed against the pressed surface 28b. Here, the radius of curvature Cr' of the pressing surfaces 29a is smaller than the radius of curvature Cr of the pressed surface 28b, each pressing surface 29a and the pressed surface 28b come into contact with each other at one point (via an oil film of traction oil). Therefore, the engaging member 17k having the two pressing surfaces 29a and the pressed member 16d come into contact with each other at a total of two points.

At this time, the center of curvature of each pressing surface 29a exists on a virtual connecting line running between the central axis O of the pressed member 16d (=the center axis of rotation O of the input member 14c and the output member 15f) and the contact portions M1, M2 of the pressing surfaces 29a and the pressed surface 28b. Moreover, presuming that the wedge angle between the tangent lines of the contact portions M1, M2 is $2\alpha$, and presuming that the coefficient of friction (traction coefficient) between the pressing surfaces 29a and the pressed surface 28b is the normal force P acting on the contact portions M1, M2 is expressed by the following Equation (10).

$$P = Fc/2(\sin \alpha + \mu' \cdot \cos \alpha) \quad (10)$$

The tangential forces Ft' acting on the contact portions M1, M2 that generate the braking force on the engaging members 17b is represented by the following Equation (11).

$$Ft' = \mu' P \quad (11)$$

Presuming that the distance from the center axis of rotation O of the output member 15f to the contact portions M1, M2 between the pressing surfaces 29 and the pressed surface 28 is R, the size of the brake torque T' acting on the engaging member 17b is expressed by the following Equation (16).

$$T' = 2Ft'R \quad (16)$$

From Equations (10), (11), and (16) above, the size of the brake torque T' is expressed by the Equation (17) using the coefficient of friction $\mu'$ the distance R (clutch size), the normal force Fc, and the wedge angle $\alpha$.

$$T' = \mu' RFc/(\sin \alpha + \mu' \cdot \cos \alpha) \quad (17)$$

Here, in regard to the structure of the first example of an embodiment of the fourth aspect, the size of the brake torque T' is represented by the Equation (4): $T' = \mu' RFc$.

Therefore, in order to obtain a larger brake torque T', even in a case of the reverse input blocking clutch 5q of this example, it can be seen that the coefficient of friction $\mu'$, the distance R, and the normal force Fc may be increased as in the case of the reverse input blocking clutch 5p of the first example of an embodiment of the fourth aspect. Moreover, in order to make the brake torque T' larger by utilizing the wedge effect that is a feature of this example, the wedge angle $\alpha$ should be made as small as possible.

For example, it is presumed that the coefficient of friction $\mu'$ is 0.1, the distance R is 15 mm, the wedge angle $\alpha$ is 25 degrees, and the normal force Fc is 1000 N. In this case, the brake torque T' obtained by the reverse input blocking clutch 5p of the first example of an embodiment of the fourth aspect is 1.5 Nm, whereas the brake torque T' obtained by the reverse input blocking clutch 5q of this example is 2.9 Nm. By utilizing the wedge effect in this way, the reverse input blocking clutch 5q of this example is able to obtain a brake torque T' that is approximately twice as large as that of the reverse input blocking clutch 5p. In other words, the reverse input blocking clutch 5q of this example is able to obtain a brake torque T' having the same size as that of the reverse input blocking clutch 5p even in a case where the distance R is halved.

As described above, as long as the distance R is the same, the reverse input blocking clutch 5q of this example is able to obtain a brake torque T' that is larger than that in the case of the structure of the first example of an embodiment of the fourth aspect. In other words, as long as the brake torque T' is the same, the distance R may be made smaller than that in the case of the structure of the first example of an embodiment of the fourth aspect, and the size may be reduced. Other configurations and operations are the same as in the first example of an embodiment of the fourth aspect.

Third Example of Embodiment of Fourth Aspect

Figure 62:
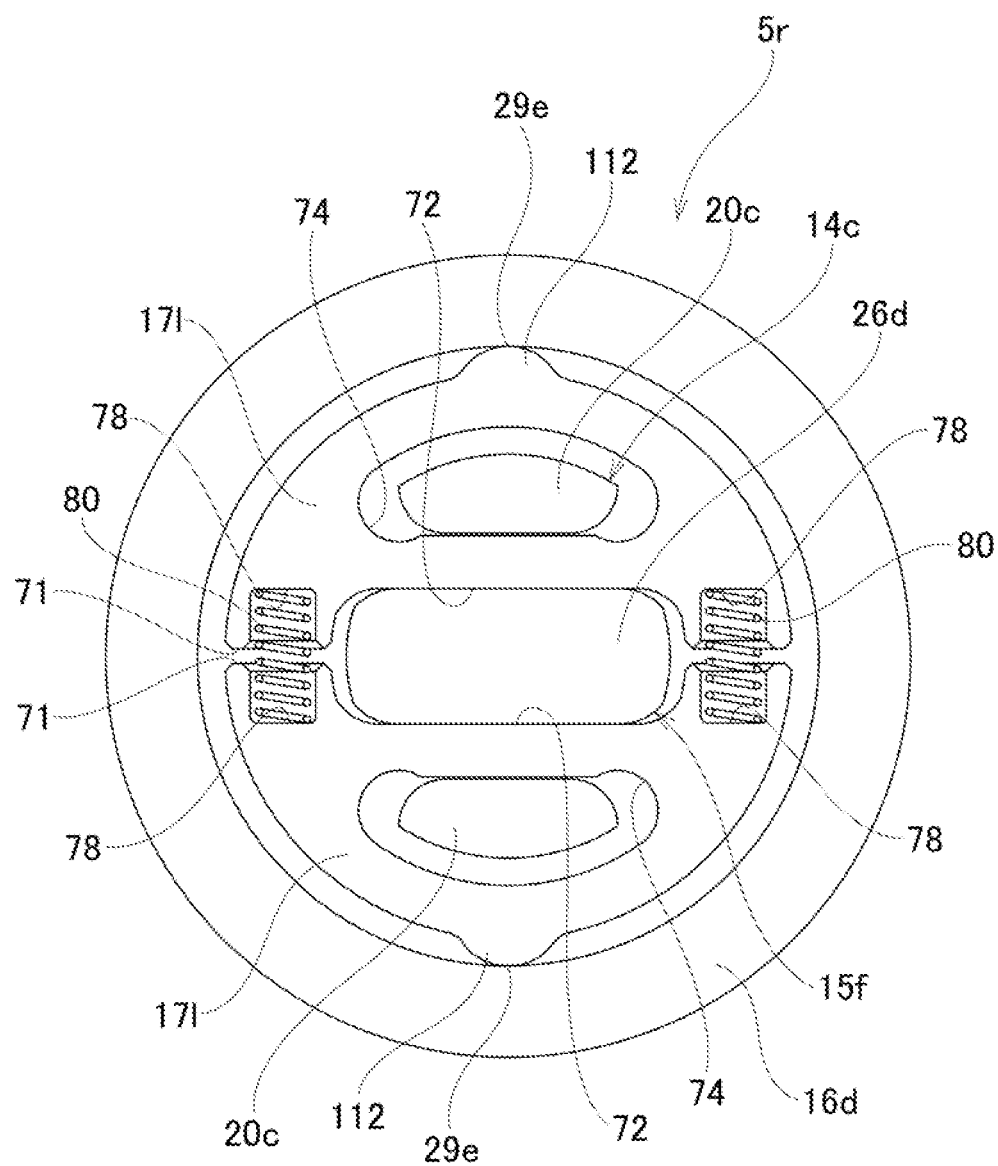
FIG. 62 is a view illustrating a reverse input blocking clutch according to a third example of an embodiment of the fourth aspect.
Figure 63:
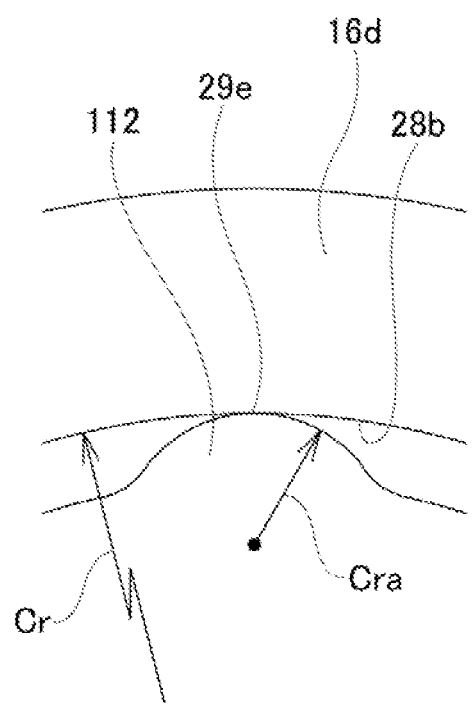
FIG. 63 is a partial enlarged view of FIG. 62.

A third example of an embodiment of the fourth aspect of the present invention will be described with reference to FIG. 62 and FIG. 63.

In the reverse input blocking clutch 5r of this example, a convex portion 112 protruding outward in the radial direction compared to the adjacent portions on both sides in the circumferential direction is provided as an intermediate member in the central portion in the circumferential direction of each engaging member 17l. The outer side surface in the radial direction of the convex portion 112 constitutes a pressing surface 29e that is pressed against the pressed surface 28b. The pressing surface 29e is formed of a cylindrical convex surface having an arc shape when viewed from the axial direction. Therefore, in this example, the contact between the pressed surface 28b and the pressing surface 29e is a line contact. Furthermore, the radius of curvature Cra of the pressing surface 29e is smaller than the radius of curvature of the pressing surface 29 in the structure of the first example of an embodiment of the fourth aspect (see FIG. 50). In this example, specifically, the radius of curvature Cra of the pressing surface 29e is 30% or less, is preferably 20% or less, and is even more preferably 10% or less that of the radius of curvature Cr of the pressed surface 28b. In this example, of the outer side surface in the radial direction of each of the engaging members 17l, the portions separated in the circumferential direction from the convex portion 112 (pressing surface 29e) are composed of a cylindrical convex surface that is not pressed against the pressed surface 28b. In other words, there is always a gap between the pressed surface 28b and the portions separated in the circumferential direction from the convex portion 112 (pressing surface 29e) of the outer side surface in the radial direction of each of the engaging members 17l.

In this example, the convex portion 112 is arranged in a part (central portion) in the circumferential direction of the outer side portion in the radial direction of each engaging member 17l, and by making that outer side surface in the radial direction of the convex portion 112 a pressing surface 29e, the radius of curvature Cra of the pressing surface 29e is made sufficiently smaller than the radius of curvature of the pressing surface 29 in the structure of the first example of an embodiment of the fourth aspect. Therefore, in the structure of this example, the contact area between the pressed surface 28b and the pressing surface 29e may be made smaller than that in the structure of the first example of an embodiment of the fourth aspect. Therefore, when rotational torque is reversely inputted to the output member 15f, the contact surface pressure between the pressed surface 28b and the pressing surface 29e may be further increased. As a result, the viscosity of the traction oil existing between the pressed surface 28b and the pressing surface 29e may be increased, and the coefficient of friction (traction coefficient) μ' between the pressed surface 28b and the pressing surface 29e may be increased. Therefore, as long as the distance R is the same, a brake torque T' that is larger than that in the structure of the first example of an embodiment of the fourth aspect may be obtained. In other words, as long as the brake torque T' is the same, the distance R may be made smaller than that in the case of the structure of the first example of an embodiment of the fourth aspect, and the size may be reduced. Note that in a case of implementing the present invention, by making the generatrix shape of the pressing surface, which is the outer side surface in the radial direction of the convex portion of each engaging member, a crowning shape such as convex arc shape or the like, and by bringing the contact between the pressing surface and the pressed surface 28b closer to being point contact, it is also possible to obtain a larger brake torque T' by increasing the contact surface pressure between the pressing surface and the pressed surface 28b.

Moreover, in the structure of this example, as compared with the structure of the first example of an embodiment of the fourth aspect, it becomes easy to make the radius of curvature Cra of the pressing surface 29e sufficiently smaller than the radius of curvature Cr of the pressed surface 28b while ensuring the width dimension of the engaging member 17k in order to stabilize the behavior of each engaging member 17k.

Furthermore, in the structure of this example, it is not necessary to perform finishing, heat treatment or the like on the portions of the outer side surface in the radial direction of each engaging member 17l other than the outer side surface in the radial direction of the convex portion 112. Therefore, the manufacturing cost may be suppressed accordingly. Other configurations and operations are the same as in the first example of an embodiment of the fourth aspect.

In this example, traction oil or traction grease is applied as the lubricant; however, the reverse input blocking clutch of the present invention may be implemented using a lubricant other than traction oil or traction grease such as ordinary lubricating oil or the like, and may be implemented without the use of a lubricant. Even in this case, it is possible to obtain an advantageous effect in that a finishing process and heat treatment performed for each engaging member only need to be performed locally. Note that in this example, both the lubricant made of traction oil or traction grease and the convex portion 112 are provided as the intermediate member; however, it is possible to provide only the convex portion 112 as the intermediate member, and this configuration is also included in the scope of the present invention.

Fourth Example of Embodiment of Fourth Aspect

Figure 64:
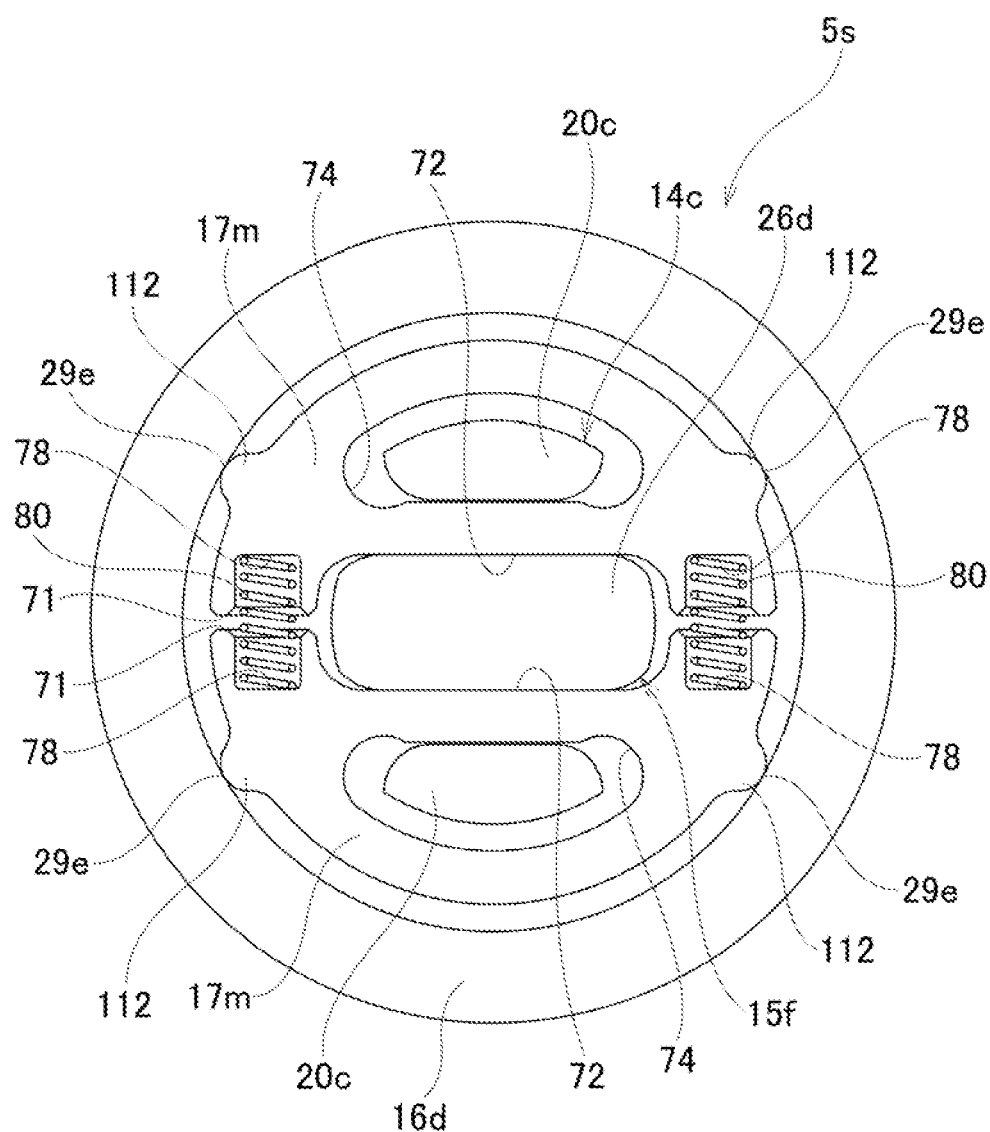
FIG. 64 is a diagram illustrating a reverse input blocking clutch of a fourth example of an embodiment of the fourth aspect.

A fourth example of an embodiment of the fourth aspect of the present invention will be described with reference to FIG. 64.

In the structure of the third example of an embodiment of the fourth aspect (see FIG. 62), the position in the circumferential direction of the convex portion 112 arranged on an outer side portion in the radial direction of each engaging member 17l is at one location in the center in the circumferential direction. On the other hand, in the reverse input blocking clutch 5s of this example, the positions in the circumferential direction of the convex portions 112 formed on the outer side portion in the radial direction of each engaging member 17m are at two locations separated in the circumferential direction. As a result, in a case where rotational torque is reversely inputted to the output member 15e, only the pressing surfaces 29e composed of the outer side surface in the radial direction of the two convex portions 112 separated in the circumferential direction on the outer side surface in the radial direction of the engaging member 17m are pressed against the pressed surface 28b. Therefore, it is easy to secure a large brake torque T' by the wedge effect similar to the case of the structure of the second example of an embodiment of the fourth aspect (see FIG. 59). In particular, in the structure of this example, the radius of curvature Cra of each of the two pressing surfaces 29e separated in the circumferential direction is smaller than the radius of curvature Cr' of the pressing surfaces 29a of the structure of the second example of an embodiment of the fourth aspect, and sufficiently smaller than the radius of curvature Cr of the pressed surface 28b. Therefore, for the same reason as in the case of the structure of the third example of an embodiment of the fourth aspect, a larger brake torque T' may be obtained as compared with the case of the structure of the second example of an embodiment of the fourth aspect. In other words, as long as the brake torque T' is the same, the distance R may be made smaller than that of the structure of the second example of an embodiment of the fourth aspect, and the size may be reduced. Other configurations and operations are the same as in the second and third examples of an embodiment of the fourth aspect.

Fifth Example of Embodiment of Fourth Aspect

Figure 65:
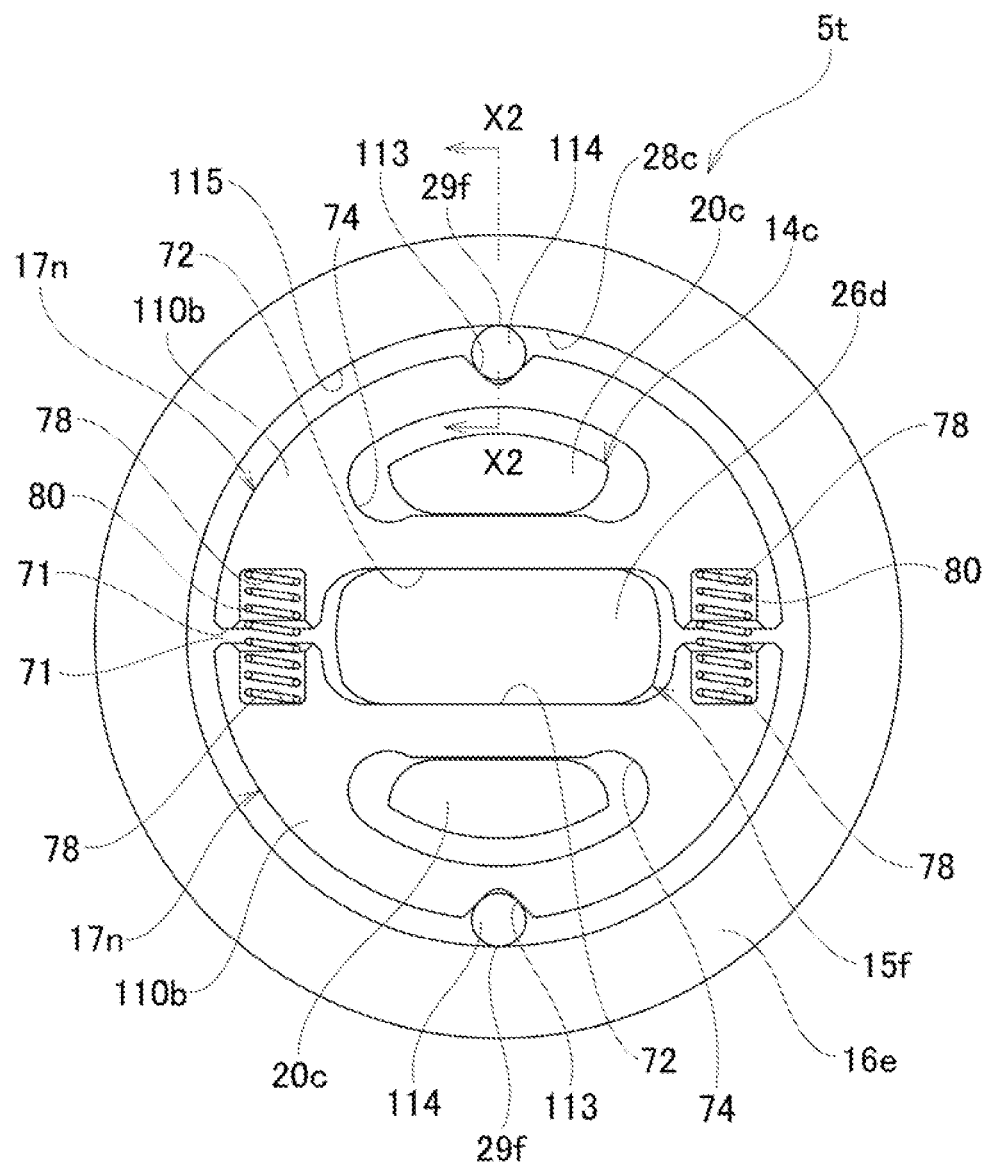
FIG. 65 is a view illustrating a reverse input blocking clutch according to a fifth example of an embodiment of the fourth aspect.
Figure 66:
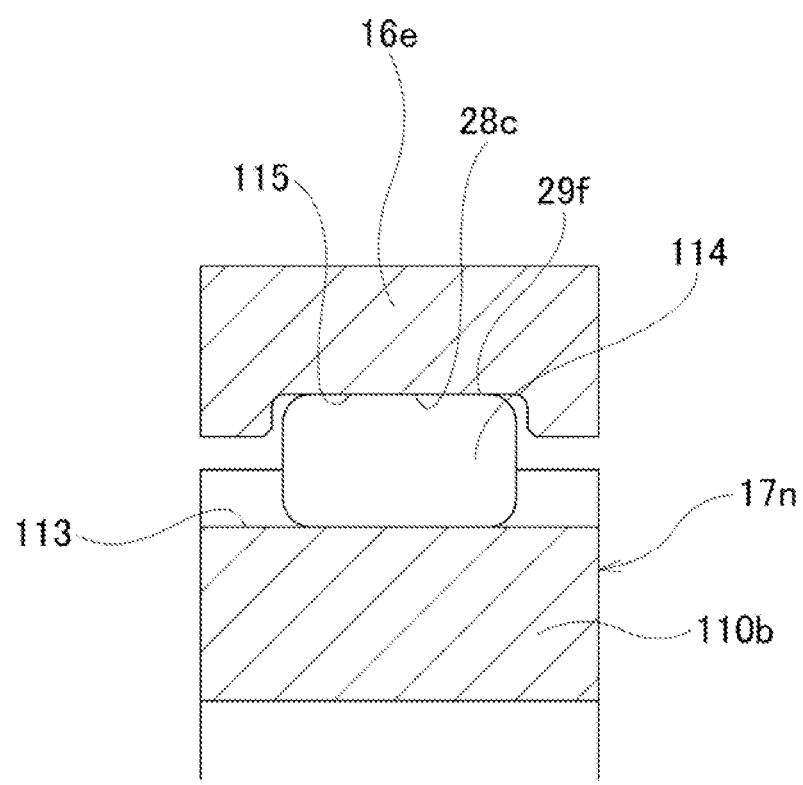
FIG. 66 is a cross-sectional view taken along the line X2-X2 of FIG. 65.

A fifth example of an embodiment of the fourth aspect of the present invention will be described with reference to FIG. 65 and FIG. 66.

In the reverse input blocking clutch 5t of this example, each of the engaging members 17n includes an engaging member main body 110b having an engaging member side input engaging portion 74 and an engaging member side output engaging portion 72, and one roller 114 as an intermediate member that is a pressing body having a pressing surface 29f. The engaging member main body 110b has a holding recess portion 113 that opens to the outer side in the radial direction at one location in the center in the circumferential direction of the outer side portion in the radial direction. The roller 114 is held in the holding recess portion 113. In the illustrated example, the holding recess portion 113 is a V-shaped groove (V-groove) when viewed from the axial direction, and is formed over the entire length in the axial direction of the outer side portion in the radial direction of the engaging member main body 110b. Moreover, the roller 114 has a cylindrical shape as a whole, and the outer circumferential surface of the roller 114 constitutes a cylindrical pressing surface 29f. The radius of curvature of the pressing surface 29f is sufficiently smaller than the radius of curvature of the pressing surface 29 in the structure of the first example of an embodiment of the fourth aspect (see FIG. 50). Furthermore, the diameter of the roller 114 (the diameter of the pressing surface 29f) is larger than the depth of the holding recess portion 113, and the dimension in the axial direction of the roller 114 is smaller than the dimension in the axial direction of the engaging member main body 110b. In a state in which the roller 114 is held by the holding recess portion 113, only the inner side portion of the roller 114 in the radial direction of the engaging member main body 110b is arranged inside the holding recess portion 113, and the outer side portion of the roller 114 in the radial direction of the engaging member main body 110b is arranged outside of the holding recess portion 113.

The pressed member 16e has a guide groove 115 having a rectangular cross-sectional shape over the entire circumference on the inner circumferential surface of the intermediate portion in the axial direction. The outer side portion of the roller 114 in the radial direction of the engaging member main body 110b is arranged in the guide groove 115. As a result, the roller 114 is prevented from falling off in the axial direction from between the outer side surface in the radial direction of the engaging member main body 110b and the inner circumferential surface of the pressed member 16e. The bottom surface of the guide groove 115 constitutes a cylindrical pressed surface 28c. Therefore, in this example, the contact between the pressed surface 28b and the pressing surface 29f is a line contact.

In this example, in a case where rotational torque is reversely inputted to the output member 15f, the pressing surface 29f formed of the outer circumferential surface of the roller 114 is pressed against the pressed surface 28c that is the bottom surface of the guide groove 115. In other words, the pressing surface 29f and the inner surface of the holding recess portion 113 are in strong contact with each other via an oil film of traction oil, and the pressing surface 29f and the pressed surface 28c are in strong contact with each other via an oil film of traction oil. As a result, the viscosity of these oil films increases, and a brake torque T' is generated at the contact portion between the pressing surface 29f and the pressed surface 28c. In particular, in this example, the radius of curvature of the pressing surface 29f is sufficiently smaller than the radius of curvature of the pressing surface 29 of the structure of the first example of an embodiment of the fourth aspect. Therefore, as compared with the structure of the first example of an embodiment of the fourth aspect, the contact area between the pressed surface 28c and the pressing surface 29f may be made smaller, and the contact surface pressure between the pressed surface 28c and the pressing surface 29f may be increased. As a result, the viscosity of the traction oil existing between the pressed surface 28c and the pressing surface 29f may be increased, and the coefficient of friction (traction coefficient) μ' between the pressed surface 28c and the pressing surface 29f may be increased. Therefore, as long as the distance R is the same, a brake torque T' that is larger than that in the structure of the first example of an embodiment of the fourth aspect may be obtained. In other words, as long as the brake torque T' is the same, the distance R may be made smaller than that in the case of the structure of the first example of an embodiment of the fourth aspect, and the size may be reduced.

In this example, when a rotational torque is inputted to the input member 14c and the input member 14c, the output member 15f, and the pair of engaging members 17n rotate synchronously with respect to the pressed member 16e, even in a case where misalignment occurs between the non-rotating side (pressed member 16e) and the rotating side (input member 14c, output member 15f, pair of engaging members 17n), the rotation on the rotating side may be stabilized by bringing the pressing surface 29f formed of the outer circumferential surface of the roller 114 into rolling contact and/or sliding contact with the pressed surface 28c.

In this example, when assembling the reverse input blocking clutch 5t, the internal gap of the reverse input blocking clutch 5t may be adjusted by selecting the size of the roller 114, and the internal gap can be kept within an appropriate range.

In this example, each engaging member 17n is divided into two parts, the engaging member main body 110b and the roller 114; and the pressing surface 29f is formed by the outer circumferential surface of the roller 114. Therefore, it is not necessary to perform finishing, heat treatment or the like on the outer side portion in the radial direction of the engaging member main body 110b. Therefore, the manufacturing cost may be suppressed accordingly. Note that, in this example, the engaging member 17n is configured by the engaging member main body 110b and the roller 114; however, in this case, the engaging member main body 110b may be interpreted as being an engaging member and the rollers 114 as being an intermediate member. Note that in this example, both the lubricant made of traction oil or traction grease and the roller 114 are both provided as intermediate members; however, it is possible to provide only the pressing body composed of the roller 114 as the intermediate member, and this configuration is also included in the scope of the present invention.

As the roller 114, for example, a mass-produced product for bearings (hardness HRC61 to 67) may be used; and more specifically, a cylindrical roller having a diameter of 3 mm to 40 mm and an axial length of 3 mm to 65 mm, a rod-shaped roller having a diameter of 5.5 mm to 15 mm and an axial length of 18 mm to 90 mm, a needle-shaped roller having a diameter of 1 mm to 5 mm and an axial length of 5.8 mm to 49.8 mm, and the like may be used. However, the size of the roller 114 is determined in consideration of the relationship with the size of the surrounding members. Other configurations and operations are the same as in the first example of an embodiment of the fourth aspect.

Sixth Example of Embodiment of Fourth Aspect

Figure 67:
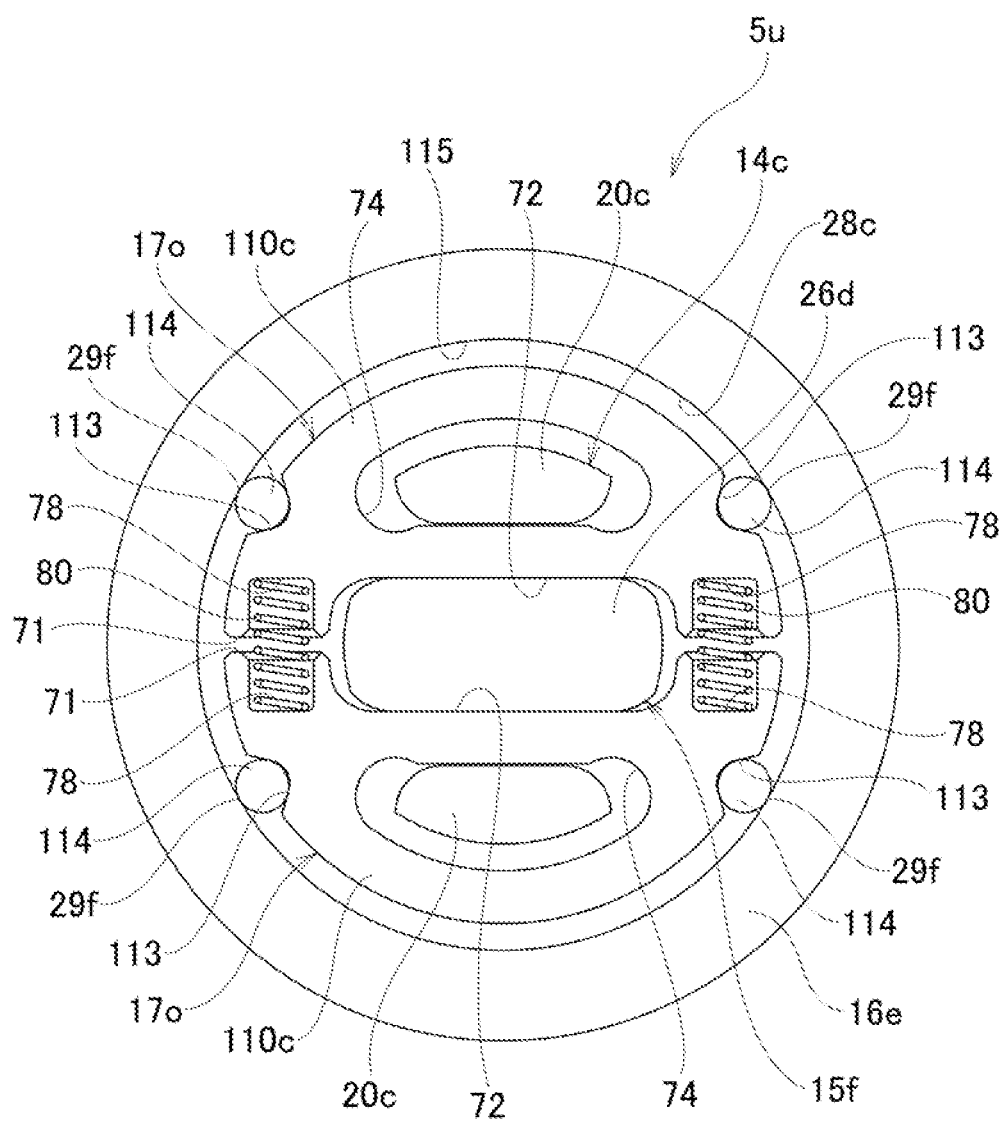
FIG. 67 is a view illustrating a reverse input blocking clutch according to a sixth example of an embodiment of the fourth aspect.

A sixth example of an embodiment of the fourth aspect of the present invention will be described with reference to FIG. 67.

In the structure of the fifth example of an embodiment of the fourth aspect (see FIG. 65), the position in the circumferential direction of the holding recess portion 113 that holds the roller 114 is located in one location in the center in the circumferential direction of the outer side portion in the radial direction of the engaging member main body 110b of the engaging member 17n. On the other hand, in the reverse input blocking clutch 5u of this example, the positions in the circumferential direction of the holding recess portions 113 that hold the rollers 114 are located in two locations that are separated in the circumferential direction of the outer side portion in the radial direction of the engaging member main body 110c of the engaging member 17o. As a result, in a case where rotational torque is reversely inputted to the output member 15f, the pressing surfaces 29f, which are the outer circumferential surfaces of the rollers 114 at two locations separated in the circumferential direction, are pressed against the pressed surface 28c. In doing so, it is easy to secure a large brake torque T' by the wedge effect similar to the case of the structure of the second example of an embodiment of the fourth aspect (see FIG. 59). In particular, in the structure of this example, the radius of curvature of the pressing surfaces 29f, which are the outer circumferential surfaces of the rollers 114, is smaller than the radius of curvature Cr' of the pressing surfaces 29a in the structure of the second example of an embodiment of the fourth aspect. Therefore, for the same reason as in the case of the structure of the fifth example of an embodiment of the fourth aspect, a larger brake torque T' may be obtained as compared with the case of the structure of the second example of an embodiment of the fourth aspect. In other words, as long as the brake torque T' is the same, the distance R may be made smaller than that of the structure of the second example of an embodiment of the fourth aspect, and the size may be reduced. Other configurations and operations are the same as in the second and fifth examples of an embodiment of the fourth aspect.

Seventh Example of Embodiment of Fourth Aspect

Figure 68:
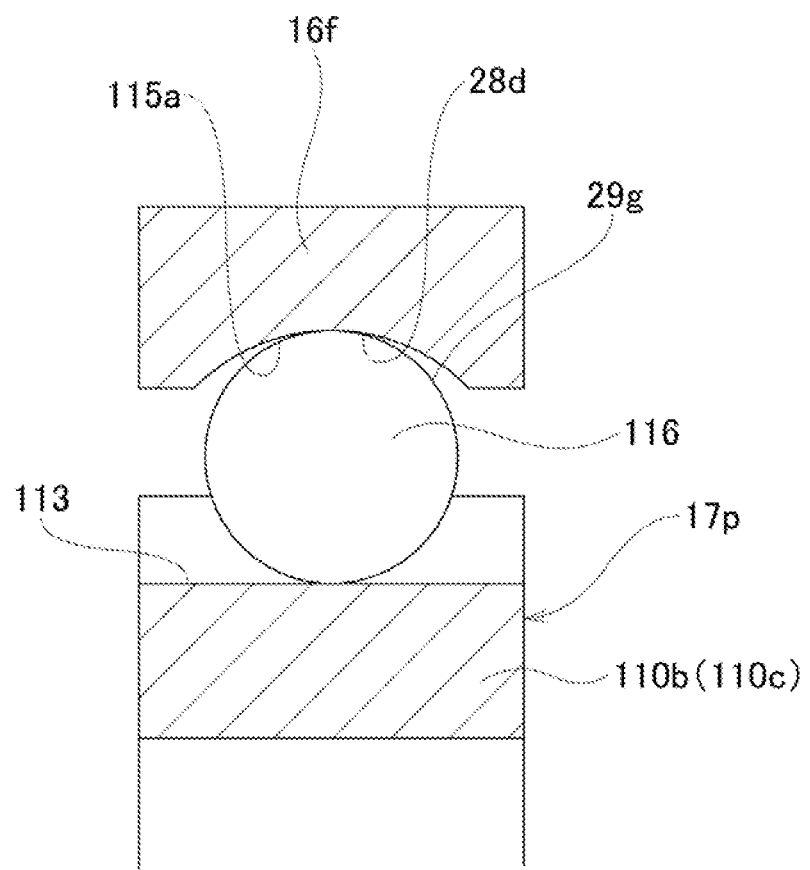
FIG. 68 relates to a seventh example of an embodiment of the fourth aspect, and corresponds to FIG. 66.

A seventh example of an embodiment of the fourth aspect of the present invention will be described with reference to FIG. 68.

In the structures of the fifth example (see FIG. 65) and the sixth example (see FIG. 67) of an embodiment of the fourth aspect, the rollers 114 are used as the pressing bodies of the engaging members 17n and 17o, respectively. On the other hand, in the reverse input blocking clutch of this example, a ball 116 is used as the pressing body of each of the engaging members 17p. The surface of the ball 116 constitutes the pressing surface 29g. In addition, the cross-sectional shape of the pressed surface 28d, which is the inner surface of a guide groove 115a formed on the inner circumferential surface of the pressed member 16f, is an arc shape having a radius of curvature that is larger than the radius of curvature of the pressing surface 29g on the surface of the ball 116.

With the reverse input blocking clutch of this example, the contact between the pressing surface 29g, which is the surface of the ball 116, the inner surface of the holding recess portion 113, and the pressed surface 28d is a point contact, so the contact area between these surfaces may be made smaller, and the contact surface pressure between these surfaces may be made higher. Therefore, the coefficient of friction (traction coefficient) µ' between these surfaces may be further increased. As a result, as long as the distance R is the same, a brake torque T' that is larger than that in the structure of the fifth example and sixth example of an embodiment of the fourth aspect may be obtained. In other words, as long as the brake torque T' is the same, the distance R may be made smaller than that of the structure of the fifth example and sixth example of an embodiment of the fourth aspect, and the size may be reduced.

As the ball 116, for example, a mass-produced product for bearings (hardness HRC61 to 67, diameter 0.3 mm to 101.6 mm) may be used. However, the size of the ball 116 is determined in consideration of the relationship with the size of the surrounding members. Other configurations and operations are the same as in the fifth and sixth examples of an embodiment of the fourth aspect.

In a case of implementing the present invention, the holding recess portion for holding the roller 114 (or ball 116) is not limited to a V groove, and it is possible to adopt various shaped of grooves such as an R groove having an arc shape when viewed from the axial direction, a circular arc groove, a Gothic arc groove and the like. When an R groove, a circular arc groove, or a Gothic arc groove is used as the holding recess portion, the contact surface pressure with the inner surface of the holding recess portion 114 and the outer circumferential surface of the roller 114 (or the surface of the ball 116) may be reduced, so wear may be suppressed. Moreover, when a circular arc groove or a Gothic arc groove is adopted as the holding recess portion, the impact resistance performance with the inner surface of the holding recess portion 114 and the outer circumferential surface of the roller 114 (or the surface of the ball 116) may be improved. Note that such impact resistance is higher in the Gothic arc groove than in the circular arc groove.

In a case of implementing the present invention, the holding recess portions for holding the rollers 114 (or balls 116) may be closed without opening both ends in the axial direction. In this case, since the rollers 114 (or balls 116) may be prevented from coming out of the holding recess portions in the axial direction, the guide groove formed on the inner circumferential surface of the pressed member may be omitted. Furthermore, even when both ends of the holding recess portions for holding the rollers 114 (or balls 116) in the axial direction are opened in the axial direction, for example, in a case where members that are adjacently arranged in the axial direction to the holding recess portions are able to prevent the rollers 114 (or balls 116) from coming out of the holding recess portions in the axial direction, the guide groove formed on the inner circumferential surface of the pressed member can be omitted.

Eighth Example of Embodiment of Fourth Aspect

Figure 69:
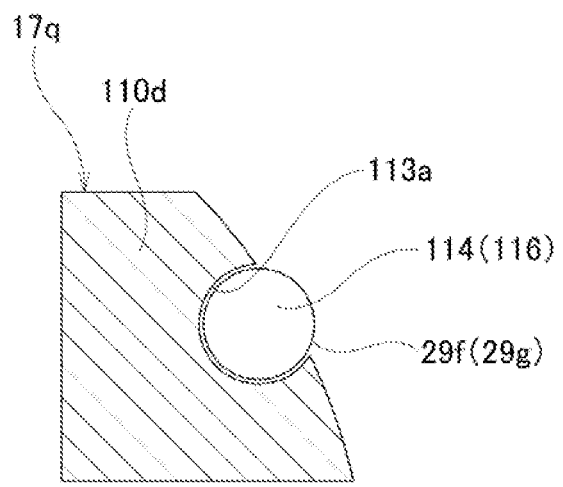
FIG. 69 is a cross-sectional view illustrating a holding recess portion and a roller (or ball) of an engaging member and a peripheral portion thereof constituting the reverse input blocking clutch of an eighth example of an embodiment of the fourth aspect.

An eighth example of an embodiment of the fourth aspect of the present invention will be described with reference to FIG. 69.

In the reverse input blocking clutch of this example, the holding recess portion 113a of the engaging member main body 110c constituting each engaging member 17q is formed by a C-shaped R groove having a single arc shape when viewed from the axial direction. Moreover, both ends in the axial direction of the holding recess portion 113a are open in the axial direction. In addition, in this example, a portion that is part of the roller 114 (or ball 116) and more than half of the roller 114 (or ball 116) is arranged inside the holding recess portion 113a. Together with this, the width of the opening on the outer side in the radial direction of the holding recess portion 113a is smaller than the diameter of the roller 114 (or ball 116). This prevents the rollers 114 (or balls 116) from completely coming out through the opening portion on the outer side in the radial direction of the holding recess portion 113a. In this example, the work of inserting the roller 114 (or ball 116) inside the holding recess portion 113a may be performed from the opening portion in the axial direction of the holding recess portion 113a. Moreover, in this example, by making the diameter of the roller 114 (or the ball 116) slightly smaller than the inner diameter of the holding recess portion 113a, a gap is provided between the pressing surface 29f (29g) composed of the outer circumferential surface of the roller 114 (or the surface of the ball 116) and the inner surface of the holding recess portion 113a. As a result, in a case where a rotational torque is inputted to the input member, or in other words, in a case where the input member, the output member, and the pair of engaging members 17p rotate synchronously with respect to the pressed member, and in a case where the pressing surface 29f (29g), that is the outer circumferential surface of the roller 114 (or the surface of the ball 116) comes into contact with the pressed surface, the roller 114 (or the ball 116) rolls easily. Other configurations and operations are the same as in the fifth to seventh examples of an embodiment of the fourth aspect.

Ninth Example of Embodiment of Fourth Aspect

Figure 70:
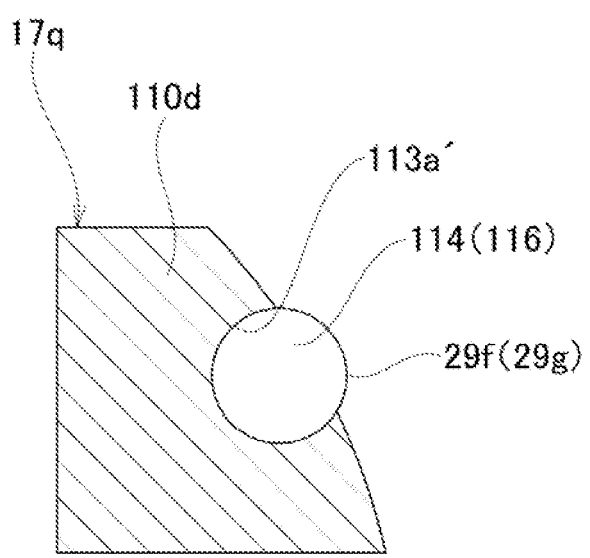
FIG. 70 relates to a ninth example of an embodiment of the fourth aspect, and corresponds to FIG. 69.

A ninth example of an embodiment of the fourth aspect of the present invention will be described with reference to FIG. 70.

In the reverse input blocking clutch of this example, the gap between the pressing surface 29f (29g) composed of the outer circumferential surface of the roller 114 (or the surface of the ball 116) and the inner surface of the holding recess portion 113a' is a sufficiently small gap, is a zero gap or negative gap due to press fitting. As a result, in a case where a rotational torque is inputted to the input member, or in other words, in a case where the input member, the output member, and the pair of engaging members 17p rotate synchronously with respect to the pressed member, and in a case where the pressing surface 29f (29g), that is the outer circumferential surface of the roller 114 (or the surface of the ball 116) comes into contact with the pressed surface, the contact is sliding contact and the roller 114 (or ball 116) does not roll. Other configurations and operations are the same as in the eighth example of an embodiment of the fourth aspect.

Tenth Example of Embodiment of Fourth Aspect

Figure 71:
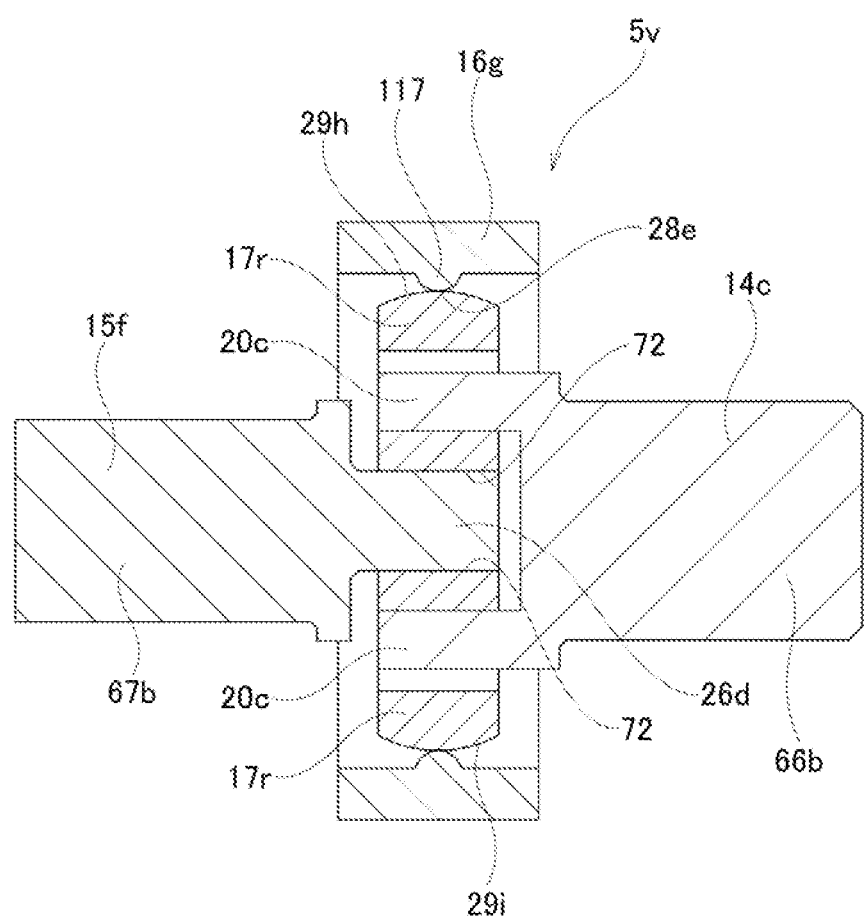
FIG. 71 relates to a tenth example of an embodiment of the fourth aspect, and corresponds to FIG. 51.
Figure 72:
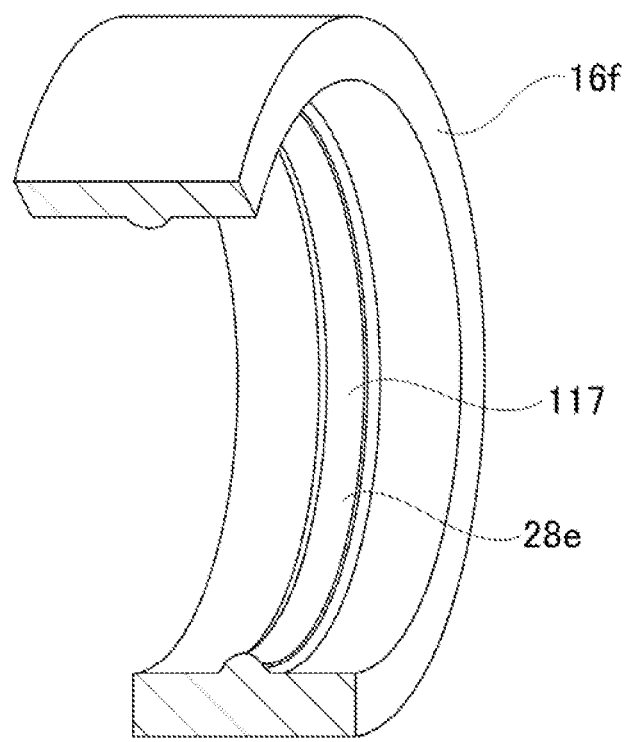
FIG. 72 is a perspective view illustrating a cut part of the pressed member of the reverse input blocking clutch of the tenth example of an embodiment of the fourth aspect.

A tenth example of an embodiment of the fourth aspect of the present invention will be described with reference to FIG. 71 and FIG. 72.

In the reverse input blocking clutch 5v of this example, in order to improve the contact surface pressure between the pressed surface 28e and the pressing surface 29h when rotational torque is reversely inputted to the output member 15f, the generatrix shape of the pressing surface 29h provided on the outer side surface in the radial direction of the engaging member 17r is a convex arc shape that is a crowning shape. Furthermore, in this example, a ridge 117 is provided as an intermediate member in an intermediate portion in the axial direction on the inner circumferential surface of the pressed member 16g, and a pressed surface 28e is provided on the inner side surface in the radial direction of the ridge 117. The pressed surface 28e is a convex surface having an arc-shaped cross-sectional shape. With the structure of this kind of example, in a case where rotational torque is reversely inputted to the output member 15f, it is possible to make the contact between the pressed surface 28e and the pressing surface 29h a point contact, so a larger brake torque T' may be obtained by increasing the contact surface pressure between the pressed surface 28e and the pressing surface 29h. Other configurations and operations are the same as in the first example of an embodiment of the fourth aspect.

The structures of the respective embodiments of the fourth aspect may be implemented in appropriate combinations as long as there is no contradiction.

REFERENCE SIGNS LIST

1 Actuator
2 Housing
3 Electric motor
4, 4a, 4b Reduction mechanism
5, 5a to 5v Reverse input blocking clutch
6, 6a Ball screw mechanism
7 Screw shaft
8, 8a Nut
9 Ball
10 Male-side spiral groove
11 Female-side spiral groove
12 Circulation path
13 First Bearing
14, 14a, to 14c Input member
15, 15a to 15f Output member
16, 16a to 16f Pressed member
17, 17a to 17r, 17z Engaging member
18 Input cylinder portion
19 Input ring portion
20, 20a to 20c Input engaging portion
21 Output cylinder portion
22, 22a Offset cylinder portion
23 Large-diameter inner circumferential surface portion
24 Small-diameter inner circumferential surface portion
25 Small diameter cylinder portion
26, 26a to 26d Output engaging portion
27 Cam surface
28, 28a to 28e Pressed surface
29, 29a to 29h Pressing surface
30 Output engaging surface
31 Input engaging hole
32 Input engaging surface
33 Second bearing
34 Collar portion
35 Bolt
36 Through hole
37 Screw hole
38 Inner ring
39 Outer ring
40 Collar portion
41 Stepped surface
42 Retaining ring
43 First spacer
44 Second spacer
45 Retaining ring
46 Bolt
47 Through hole
48 Screw hole
49 Input gear
50 Output gear
51 Drive shaft
52, 52a to 52d Locking mechanism
53 Support
54 Planetary roller screw mechanism
55 Screw shaft
56 Nut
57 Planetary roller
58 Ring gear
59 Cage
60 Male screw portion
61 Female screw portion
62 Roller screw portion
63 Gear portion
64 Gear portion
65 Support hole
66, 66a, 66b Input shaft portion
67, 67a, 67b Output shaft portion
68 First portion
69 Second portion
70 Third portion
71, 71a Bottom surface
72, 72a, 72b Engaging member side output engaging portion
73 Side surface
74, 74a Engaging member side input engaging portion
75, 75a to 75m Gap adjusting member
76 Guide hole
77 Insertion hole
78, 78a Guide shaft
79 Guide recess portion
80 Spring
81 Through hole
82 Holding recess portion 83 Holding recess portion
84 Through hole
85 Through hole
86, 86a Contact plate portion
87, 87a Fixing plate portion
88, 88a Space portion
89 Variable compression ratio device
90 Internal combustion engine
91 Piston
92 Link mechanism
93 Control shaft
94 Electric motor
95 Cylinder
96 Upper link
97 Lower link
98 Control link
99 Piston pin
100a First connecting pin
100b Second connecting pin
101 Crankshaft
102 Crank pin
103 Eccentric shaft portion
104a to 104h First gear to Eighth gear
105 Output shaft
106a to 106c First intermediate shaft to Third intermediate shaft
107 Support bracket
108, 108a Pressed member main body
109 Bent piece
110, 110a to 110d Engaging member main body
111 Tip end surface
112 Convex portion
113, 113a, 113a' Holding recess portion
114 Roller
115, 115a Guide groove
116 Ball
117 Protrusion

The invention claimed is:

1. An actuator comprising
a rotational linear motion conversion mechanism, and
a reverse input blocking clutch having a locking mechanism; wherein
the rotational linear motion conversion mechanism comprises a screw shaft having a male-side engaging portion on an outer circumferential surface thereof and a nut having a female-side engaging portion on an inner circumferential surface thereof, and the male-side engaging portion and the female-side engaging portion are engaged with each other directly or via a plurality of intermediate engaging members;
the locking mechanism comprises a pressed member, an input engaging portion, an output engaging portion, and an engaging member;
the pressed member has a cylindrical pressed surface on the inner circumferential surface thereof;
the input engaging portion has a center axis of rotation that is coaxial with the center axis of the pressed surface, and is arranged on the inner side in the radial direction of the pressed surface;
the output engaging portion has a center axis of rotation that is coaxial with the center axis of the pressed surface, and is arranged on the inner side in the radial direction of the pressed surface and further on the inner side in the radial direction than the input engaging portion;
the engaging member is arranged on the inner side in the radial direction of the pressed surface, and when a rotational torque is inputted to the input engaging portion, moves in a direction away from the pressed surface due to the engagement with the input engaging portion and transmits the rotational torque inputted to the input engaging portion to the output engaging portion due to engagement with the output engaging portion; whereas, when rotational torque is reversely inputted to the output engaging portion, the engaging member moves in a direction close to the pressed surface due to engagement with the output engaging portion, and by being pressed against the pressed surface, does not transmit the rotational torque that is reversely inputted to the output engaging portion to the input engaging portion, or transmits part of the rotational torque that is reversely inputted to the output engaging portion due to the engagement with the input engaging portion and blocks the remaining part;
the locking mechanism is arranged at a portion where the output engaging portion is connected to the nut so as to be able to transmit torque, and is arranged around the screw shaft in a portion separated in the axial direction from the female-side engaging portion; and
the inner diameter dimension of the output engaging portion is smaller than the outer diameter dimension of a range in the axial direction in which the female-side engaging portion exists in the nut.

2. The actuator according to claim 1, wherein
the engaging member is configured by a pair of engaging members, and the output engaging portion is arranged so as to be sandwiched from both sides in the radial direction by the pair of engaging members.

3. The actuator according to claim 1, wherein
the engaging member has a pressing surface that is pressed against the pressed surface, and the pressing surface has a radius of curvature that is smaller than that of the pressed surface and is configured by a pair of arc-shaped convex surfaces separated from each other in the circumferential direction.

4. The actuator according to claim 1, wherein
a reduction mechanism for increasing the rotational torque inputted to the input engaging portion is provided.

5. The actuator according to claim 4, wherein
the output unit of the reduction mechanism is connected to the input engaging portion so as to be able to transmit torque; and
the reduction mechanism and the locking mechanism are arranged around the screw shaft so as to be adjacent to each other in the axial direction.

6. The actuator according to claim 1, wherein
an electric motor that is a generating source of rotational torque that is inputted to the input engaging portion is provided.

7. The actuator according to claim 1, wherein
the rotational linear motion conversion mechanism is a ball screw mechanism;
the male-side engaging portion is a male-side spiral groove;
the female-side engaging portion is a female-side spiral groove;
each of the intermediate engaging members is a ball; and
by arranging each of the balls between the male-side spiral groove and the female-side spiral groove, the male-side spiral groove and the female-side spiral groove engage with each other via each of the balls.

8. The actuator according to claim 1, wherein
the rotational linear motion conversion mechanism is a planetary roller screw mechanism;
the male-side engaging portion is a male screw portion;
the female-side engaging portion is a female screw portion;
each of the intermediate engaging members is a planetary roller having a roller screw portion on the outer circumferential surface thereof; and
by each roller screw portion of the planetary roller engaging with both the male screw portion and the female screw portion, the male threaded portion and the female threaded portion engage with each other via each of the planetary rollers.

9. A reverse input blocking clutch, comprising:
a pressed member having a cylindrical concave-shaped pressed surface having a center axis;
an input member having an input engaging portion arranged on an inner side in a radial direction of the pressed surface and having a center axis of rotation that is coaxial with the central axis of the pressed surface;
an output member having an output engaging portion arranged further on the inner side in the radial direction of the pressed surface than the input engaging portion and having a center axis of rotation that is coaxial with the pressed surface; and
an engaging member having a first portion arranged on the inner side in the radial direction of the pressed surface at a position located in the radial direction between the input engaging portion and the output engaging portion, and a pair of second portions arranged at positions on both sides in a circumferential direction from the position located in the radial direction between the input engaging portion and the output engaging portion;
wherein
the engaging member is configured so that in a case where rotational torque is inputted to the input member, the engaging members moves in a direction away from the pressed surface due to the input engaging portion engaging with the first portion, and by the first portion engaging with the output engaging portion, transmits the rotational torque that is inputted to the input member to the output member; and in a case where rotational torque is reversely inputted to the output member, the engaging member moves in a direction toward the pressed surface due to the output engaging portion engaging with the first portion, and by the pair of second portions being pressed against the pressed surface, does not transmit the rotational torque that is reversely inputted to the output member to the input member, or transmits a part of the rotational torque that is reversely inputted to the output member, to the input member, and blocks a remaining part thereof;
in a case where rotational torque is reversely inputted to the output member, a pair of contact portions where the pair of second portions and the pressed surface come in contact are positioned on sides closer to the center axis of the pressed surface than a specified portion with respect to a direction of a bisector of tangent lines of the pressed surface at each contact portion of the pair of contact portions, and the specified portion is a portion of the first portion with which the input engaging portion engage when a rotational torque is input to the input member, and
an intermediate member is arranged in a portion between the pair of second portions and the pressed member, the intermediate member being composed of a gap adjusting member that is held by the pressed member, and has the pressed surface.

10. The reverse input blocking clutch according to claim 9, wherein
the specified portion is a portion of the first portion with which the output engaging portion engages when a rotational torque is reversely inputted to the output member.

11. The reverse input blocking clutch according to claim 9, wherein
the engaging member, on the inner side in the radial direction of the pressed surface, does not have a portion arranged on the outer side in the radial direction of the input engaging portion.

12. The reverse input blocking clutch according to claim 9, wherein
the pressed surface has a diametrical direction; the input engaging portion is configured by a pair of input engaging portions arranged at two positions on opposite sides in the diametrical direction of the pressed surface; the engaging member is configured by a pair of engaging members; and the output engaging portion is arranged so as to be sandwiched from both sides in the radial direction by the pair of input engaging portions and the pair of engaging members.

13. The reverse input blocking clutch according to claim 9, wherein
each portion of the pair of second portions has a pressing surface that is a part of the pair of contact portions and that is pressed against the pressed surface, and the pressing surface is composed of an arc-shaped convex surface having a radius of curvature smaller than that of the pressed surface.

14. The reverse input blocking clutch according to claim 9, wherein
the intermediate member is composed of a gap adjusting member that is arranged in a portion between the pair of second portions and the pressed member and is held by the pair of second portions of the engaging member.

15. The reverse input blocking clutch according to claim 9, wherein
the intermediate member is composed of a gap adjusting member that is arranged in at least one of a portion between the input engaging portion and the first portion of the engaging member and a portion between the output engaging portion and the first portion of the engaging member.

16. The reverse input blocking clutch according to claim 15, wherein
the gap adjusting member is held by any one of the input engaging portion, the output engaging portion, and the engaging member.

17. The reverse input blocking clutch according to claim 16, wherein
a guide member for guiding displacement of the engaging member is provided, and the gap adjusting member is held by the guide member.

18. The reverse input blocking clutch according to claim 16, wherein
the gap adjusting member is composed of a coiled spring.

19. The reverse input blocking clutch according to claim 9, wherein
the gap adjusting member is composed of at least one material selected from metal, ceramic, synthetic resin, and rubber.

20. The reverse input blocking clutch according to claim 9, wherein
the gap adjusting member is composed of a coating material.

21. An actuator comprising a rotational linear motion conversion mechanism, and a reverse input blocking clutch according to claim 9, wherein
the rotational linear motion conversion mechanism comprises a screw shaft having a male-side engaging portion on an outer circumferential surface thereof and a nut having a female-side engaging portion on an inner circumferential surface thereof, and the male-side engaging portion and the female-side engaging portion are engaged with each other directly or via a plurality of intermediate engaging members;
the output engaging portion is connected to the nut so as to be able to transmit torque, and is arranged around the screw shaft at a portion separated in an axial direction from the female-side engaging portion; and
the inner diameter dimension of the output engaging portion is smaller than the outer diameter dimension of a range in the axial direction in which the female-side engaging portion exists in the nut.

22. The actuator according to claim 21, wherein
a reduction mechanism for increasing the rotational torque inputted to the input engaging portion is provided.

23. The actuator according to claim 22, wherein
an output portion of the reduction mechanism is connected to the input engaging portion so as to be able to transmit torque, and the reduction mechanism and the reverse input blocking clutch are arranged around the screw shaft so as to be adjacent to each other in the axial direction.

24. The actuator according to claim 21, wherein
an electric motor that is a generating source of rotational torque that is inputted to the input engaging portion is provided.

25. The actuator according to claim 21, wherein
the rotational linear motion conversion mechanism is a ball screw mechanism;
the male-side engaging portion is configured by a male-side spiral groove;
the female-side engaging portion is configured by a female-side spiral groove;
the intermediate engaging members are configured by balls; and
by arranging the balls between the male-side spiral groove and the female-side spiral groove, the male-side spiral groove and the female-side spiral groove engage with each other via the balls.

26. The actuator according to claim 21, wherein
the rotational linear motion conversion mechanism is a planetary roller screw mechanism;
the male-side engaging portion is configured by a male screw portion;
the female-side engaging portion is configured by a female screw portion;
the intermediate engaging members are configured by planetary rollers respectively having a roller screw portion on an outer circumferential surface thereof; and
by the roller screw portion of each of the planetary roller engaging with both the male screw portion and the female screw portion, the male screw portion and the female screw portion engage with each other via the planetary rollers.

27. A reverse input blocking clutch, comprising:
a pressed member having a cylindrical concave-shaped pressed surface having a center axis;
an input member having an input engaging portion arranged on an inner side in a radial direction of the pressed surface and having a center axis of rotation that is coaxial with the central axis of the pressed surface;
an output member having an output engaging portion arranged further on the inner side in the radial direction of the pressed surface than the input engaging portion and having a center axis of rotation that is coaxial with the pressed surface; and
an engaging member having a first portion arranged on the inner side in the radial direction of the pressed surface at a position located in the radial direction between the input engaging portion and the output engaging portion, and a pair of second portions arranged at positions on both sides in a circumferential direction from the position located in the radial direction between the input engaging portion and the output engaging portion;
wherein
the engaging member is configured so that in a case where rotational torque is inputted to the input member, the engaging members moves in a direction away from the pressed surface due to the input engaging portion engaging with the first portion, and by the first portion engaging with the output engaging portion, transmits the rotational torque that is inputted to the input member to the output member; and in a case where rotational torque is reversely inputted to the output member, the engaging member moves in a direction toward the pressed surface due to the output engaging portion engaging with the first portion, and by the pair of second portions being pressed against the pressed surface, does not transmit the rotational torque that is reversely inputted to the output member to the input member, or transmits a part of the rotational torque that is reversely inputted to the output member, to the input member, and blocks a remaining part thereof;
in a case where rotational torque is reversely inputted to the output member, a pair of contact portions where the pair of second portions and the pressed surface come in contact are positioned on sides closer to the center axis of the pressed surface than a specified portion with respect to a direction of a bisector of tangent lines of the pressed surface at each contact portion of the pair of contact portions, and the specified portion is a portion of the first portion with which the input engaging portion engage when a rotational torque is input to the input member, and
an intermediate member is arranged in a portion between the pair of second portions and the pressed member, the intermediate member being composed of a lubricant that lubricates contact portions between the pressed surface and the pair of second portions.

28. The reverse input blocking clutch according to claim 27, wherein
the lubricant consists of traction oil or traction grease.

29. The reverse input blocking clutch according to claim 27, wherein
each portion of the pair of second portions has a pressing surface that is a part of the pair of contact portions and that is pressed against the pressed surface, and the pressing surface is composed of an arc-shaped convex surface having a radius of curvature smaller than that of the pressed surface, and
at least one surface of the pressed surface and the pressing surface has a fine uneven shape.

30. An actuator comprising a rotational linear motion conversion mechanism, and a reverse input blocking clutch according to claim 27, wherein
the rotational linear motion conversion mechanism comprises a screw shaft having a male-side engaging portion on an outer circumferential surface thereof and a nut having a female-side engaging portion on an inner circumferential surface thereof, and the male-side engaging portion and the female-side engaging portion are engaged with each other directly or via a plurality of intermediate engaging members;
the output engaging portion is connected to the nut so as to be able to transmit torque, and is arranged around the screw shaft at a portion separated in an axial direction from the female-side engaging portion; and
the inner diameter dimension of the output engaging portion is smaller than the outer diameter dimension of a range in the axial direction in which the female-side engaging portion exists in the nut.

31. The actuator according to claim 30, wherein
a reduction mechanism for increasing the rotational torque inputted to the input engaging portion is provided.

32. The actuator according to claim 31, wherein
an output portion of the reduction mechanism is connected to the input engaging portion so as to be able to transmit torque, and the reduction mechanism and the reverse input blocking clutch are arranged around the screw shaft so as to be adjacent to each other in the axial direction.

33. The actuator according to claim 30, wherein
an electric motor that is a generating source of rotational torque that is inputted to the input engaging portion is provided.

34. The actuator according to claim 30, wherein
the rotational linear motion conversion mechanism is a ball screw mechanism;
the male-side engaging portion is configured by a male-side spiral groove;
the female-side engaging portion is configured by a female-side spiral groove;
the intermediate engaging members are configured by balls; and
by arranging the balls between the male-side spiral groove and the female-side spiral groove, the male-side spiral groove and the female-side spiral groove engage with each other via the balls.

35. The actuator according to claim 30, wherein
the rotational linear motion conversion mechanism is a planetary roller screw mechanism;
the male-side engaging portion is configured by a male screw portion;
the female-side engaging portion is configured by a female screw portion;
the intermediate engaging members are configured by planetary rollers respectively having a roller screw portion on an outer circumferential surface thereof; and
by the roller screw portion of each of the planetary roller engaging with both the male screw portion and the female screw portion, the male screw portion and the female screw portion engage with each other via the planetary rollers.

* * * * *